(12) United States Patent
Sakamoto

(10) Patent No.: US 12,333,644 B2
(45) Date of Patent: *Jun. 17, 2025

(54) IMAGE DISPLAY METHOD, DISPLAY CONTROL DEVICE, AND RECORDING MEDIUM FOR DISPLAYING SHAPE IMAGE OF SUBJECT AND COORDINATES ESTIMATED FROM TWO-DIMENSIONAL COORDINATES IN REFERENCE IMAGE PROJECTED THEREON

(71) Applicant: Evident Corporation, Nagano (JP)

(72) Inventor: Yohei Sakamoto, Hachioji (JP)

(73) Assignee: Evident Corporation, Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,072

(22) Filed: Feb. 20, 2024

(65) Prior Publication Data
US 2024/0193852 A1 Jun. 13, 2024

Related U.S. Application Data

(63) Continuation of application No. 17/504,930, filed on Oct. 19, 2021, now Pat. No. 11,941,749.

(30) Foreign Application Priority Data

Oct. 28, 2020 (JP) .................................. 2020-180445

(51) Int. Cl.
*G06T 15/20* (2011.01)
*G06T 7/70* (2017.01)
*F02C 7/00* (2006.01)

(52) U.S. Cl.
CPC .............. *G06T 15/205* (2013.01); *G06T 7/70* (2017.01); *F02C 7/00* (2013.01); *F05D 2260/80* (2013.01);

(Continued)

(58) Field of Classification Search
None
See application file for complete search history.

(56) References Cited

U.S. PATENT DOCUMENTS 10,699,123 B1 6/2020 Charlton et al.
2005/0024724 A1 2/2005 Kim et al.
(Continued)

FOREIGN PATENT DOCUMENTS

CN 106028903 A 10/2016
CN 111521127 A 8/2020
(Continued)

OTHER PUBLICATIONS

Kumar et al., "Stereoscopic visualization of laparoscope image using depth information from 3D model," Computer methods and programs in biomedicine, 113.3 (2014): 862-868 (Year: 2014).*

(Continued)

*Primary Examiner* — Anh-Tuan V Nguyen
(74) *Attorney, Agent, or Firm* — Scully, Scott, Murphy & Presser, P.C.

(57) ABSTRACT

A processor causes a storage medium to store three-dimensional data of a subject in a storage step. The processor selects a reference image in a first selection step. The processor selects a selected image that is a two-dimensional image used for generating the three-dimensional data on the basis of the reference image in a second selection step. The processor estimates a second camera coordinate regarding the reference image on the basis of a first camera coordinate regarding the selected image in an estimation step. The processor displays an image of the subject on a display in a display step. The image of the subject visualizes at least one of the second camera coordinate and a set of three-dimensional coordinates of one or more points of the subject calculated on the basis of the second camera coordinate.

33 Claims, 48 Drawing Sheets

(52) U.S. Cl.
CPC ............ *G06T 2207/10068* (2013.01); *G06T 2207/30108* (2013.01); *G06T 2207/30244* (2013.01)

(56) References Cited

U.S. PATENT DOCUMENTS

| | | |
|---|---|---|
| 2007/0132840 A1 | 6/2007 | Konomura |
| 2012/0155731 A1 | 6/2012 | Weersink et al. |
| 2014/0037140 A1 | 2/2014 | BenHimane et al. |
| 2015/0377613 A1 | 12/2015 | Small et al. |
| 2016/0353968 A1 | 12/2016 | Ikuma et al. |
| 2017/0046833 A1 | 2/2017 | Lurie et al. |
| 2017/0135655 A1 | 5/2017 | Wang et al. |
| 2018/0197324 A1 | 7/2018 | Hanamoto |
| 2018/0353836 A1 | 12/2018 | Li et al. |
| 2020/0245982 A1 | 8/2020 | Kopel et al. |
| 2020/0301126 A1 | 9/2020 | Sakamoto |
| 2021/0104052 A1 | 4/2021 | Hayashi |
| 2021/0272317 A1* | 9/2021 | Patel ............... G06F 18/2413 |
| 2022/0101617 A1 | 3/2022 | Wiemker et al. |
| 2023/0069480 A1 | 3/2023 | Nägeli et al. |

FOREIGN PATENT DOCUMENTS

| | | |
|---|---|---|
| CN | 111541841 A | 8/2020 |
| JP | 2011058806 A | 3/2011 |
| JP | 2012045419 A | 3/2012 |
| JP | 2014018430 A | 2/2014 |
| JP | 5451718 B2 | 3/2014 |
| JP | 2017-130049 A | 7/2017 |
| JP | 2019132664 A | 8/2019 |
| JP | 6608111 B2 | 11/2019 |
| JP | 2020067592 A | 4/2020 |
| JP | 2020126208 A | 8/2020 |
| JP | 2020154234 A | 9/2020 |
| WO | 2015190186 A1 | 12/2015 |

OTHER PUBLICATIONS

Notice of Allowance Issued for U.S. Appl. No. 17/504,930 on Nov. 17, 2023.

Chen et al., "SLAM-based dense surface reconstruction in monocular minimally invasive surgery and its application to augmented reality," Computer methods and programs in biomedicine 158 (2018): 135-146 (Year: 2018).

US Office Action dated Apr. 20, 2024 issued in U.S. Appl. No. 17/504,930.

Chinese Office Action with Search Report dated Nov. 9, 2024 received in 202111246740.X.

Japanese Office Action dated Feb. 25, 2025 received in 2021-135768.

* cited by examiner

IMAGE DISPLAY METHOD, DISPLAY CONTROL DEVICE, AND RECORDING MEDIUM FOR DISPLAYING SHAPE IMAGE OF SUBJECT AND COORDINATES ESTIMATED FROM TWO-DIMENSIONAL COORDINATES IN REFERENCE IMAGE PROJECTED THEREON

CROSS-REFERENCE TO RELATED APPLICATIONS

This application is a Continuation application of U.S. application Ser. No. 17/504,930, filed on Oct. 19, 2921, which claims priority on Japanese Patent Application No. 2020-180445, filed on Oct. 28, 2020, the content of each of which are incorporated herein by reference.

BACKGROUND OF THE INVENTION

Field of the Invention

The present invention relates to an image display method, a display control device, and a recording medium.

Description of Related Art

Industrial endoscope devices have been used for an inspection of internal abnormalities (damage, corrosion, and the like) of boilers, gas turbines, automobile engines, pipes, and the like. In an endoscopic inspection, an inspection worker records a still image during the inspection in order to record whether or not an abnormality has occurred or record the degree of an abnormality as proof of the inspection. In general, text indicating the state or the like of an abnormality seen in a recorded still image is attached to an inspection report along with the still image.

Position information is included in an additional item related to an abnormality. The position information indicates a position at which a recorded still image is acquired in an inspection target. The position information of a found abnormality is important when an abnormal portion is replaced or fixed, or when a next inspection is performed. An inspection worker reads a position from a mark printed on an insertion unit of a scope in order to obtain the position information. The mark indicates the length (insertion length) of the part of the insertion unit inserted into an inspection target. The worker takes notes of the position.

However, in the above-described inspection, it may be difficult for the worker to figure out position information of an abnormality due to the following four reasons and the like.

(1) The worker can understand an approximate position of a portion in a relatively simple structure such as a straight pipe. In a case in which a structure having a complicated shape is inspected (for example, a turbine inspection or the like), it is difficult for the worker to understand a position of an abnormal portion on the basis of only an insertion length.
(2) Even when a relatively simple structure such as a straight pipe is inspected, the action of taking notes of an insertion length is troublesome for the worker.
(3) In a severe inspection environment in which safety may be threatened, the worker may not have extra mental or physical strength for taking notes of an insertion length during an inspection.
(4) The worker forgets to take notes of an insertion length.

As a method of resolving the above-described problems, there is a method of associating a still image recorded during an inspection with three-dimensional data (3D data) indicating a three-dimensional shape (3D shape) of an inspection target and visualizing a position at which the still image is acquired. By using this method, the position of an inspection target at which a still image is acquired becomes clear.

For example, a method of associating a schema diagram and a still image with each other and visualizing the schema diagram and the still image is disclosed in Japanese Patent No. 5451718. The schema diagram schematically shows an internal structure of a living body. By collating a sound or a text which is associated with the schema diagram with a sound or a text which is associated with the still image, the position at which the still image is acquired is identified.

A method of associating a video of an inspection target and a three-dimensional image acquired by a computed tomography (CT) device or a magnetic-resonance-imaging (MRI) device with each other and visualizing the video or a still image is disclosed in Japanese Patent No. 6608111. A virtual image of an organ captured by an endoscope is generated. By collating the image with a frame of a video, the position of an inspection target corresponding to the frame of the video is identified.

A method of displaying a three-dimensional point cloud on a three-dimensional image (3D image) of an inspection target is disclosed in Japanese Unexamined Patent Application, First Publication No. 2017-130049. The three-dimensional point cloud corresponds to two or more two-dimensional images recorded during an inspection. The device disclosed in Japanese Unexamined Patent Application, First Publication No. 2017-130049 uses two or more still images or a video recorded during an inspection. The device reconfigures a 3D shape of an inspection target and displays a 3D image of the 3D shape. The device accepts any position on the 3D image from a user and extracts a region including the position. The device displays a still image in which the region is seen.

SUMMARY OF THE INVENTION

According to a first aspect of the present invention, an image display method includes a storage step, a first selection step, a second selection step, an estimation step, and a display step. A processor causes a storage medium to store three-dimensional data generated on the basis of two or more two-dimensional images of a subject in the storage step. The three-dimensional data include three-dimensional coordinates of two or more points of the subject and a first camera coordinate. The first camera coordinate indicates three-dimensional coordinates of a first camera that acquires each of the two or more two-dimensional images. The first camera coordinate is associated with each of the two or more two-dimensional images. The processor selects a reference image that is a two-dimensional image of the subject in the first selection step. The processor selects at least one of the two or more two-dimensional images as a selected image on the basis of the reference image in the second selection step. The processor estimates, on the basis of the first camera coordinate associated with the selected image, a second camera coordinate indicating three-dimensional coordinates of a second camera that acquires the reference image in the estimation step. The processor displays an image of the subject on a display in the display step. The image of the subject visualizes a position indicated by at least one of the second camera coordinate and a set of three-dimensional coordinates of one or more points of the subject calculated on the basis of the second camera coordinate.

According to a second aspect of the present invention, in the first aspect, the image of the subject may be a three-dimensional image. The three-dimensional image may visualize at least one of the second camera coordinate and the set of the three-dimensional coordinates of the one or more points of the subject calculated on the basis of the second camera coordinate and may visualize the three-dimensional coordinates of one or more of the two or more points.

According to a third aspect of the present invention, in the second aspect, the three-dimensional data may further include first posture information indicating a posture of the first camera. The first posture information may be associated with each of the two or more two-dimensional images. The processor may further estimate a posture of the second camera on the basis of the first posture information associated with the selected image and may further generate second posture information indicating the estimated posture in the estimation step. The processor may further estimate three-dimensional coordinates of one or more points of a region of the subject seen in the reference image on the basis of the second camera coordinate and the second posture information in the estimation step. The three-dimensional image may visualize the three-dimensional coordinates of the one or more points of the region.

According to a fourth aspect of the present invention, in the third aspect, the processor may further superimpose information indicating a position of the region on the three-dimensional image in the display step.

According to a fifth aspect of the present invention, in the third aspect, the image display method may further include a viewpoint change step in which the processor changes a viewpoint of the three-dimensional image after the three-dimensional image is displayed on the display.

According to a sixth aspect of the present invention, in the third aspect, the processor may select two or more of the reference images in the first selection step. The processor may further display information indicating a position of a region shared by the two or more of the reference images on the display in the display step.

According to a seventh aspect of the present invention, in the third aspect, the three-dimensional image may be an image of shape data indicating a three-dimensional shape of the subject. The image display method may further include an association step in which the processor associates the three-dimensional coordinates of the two or more points of the subject with the three-dimensional shape indicated by the shape data.

According to an eighth aspect of the present invention, in the third aspect, the processor may further display field-angle information indicating a field angle of the reference image on the display in the display step.

According to a ninth aspect of the present invention, in the third aspect, the processor may further display a three-dimensional distance between the region and a reference point included in the two or more points of the subject on the display in the display step.

According to a tenth aspect of the present invention, in the third aspect, the subject may include two or more partial regions that are periodically disposed. The processor may further display the number of at least some of the partial regions from a reference part to a part of interest on the display in the display step. The reference part is one of the two or more partial regions. The part of interest is different from the reference part and is one of the two or more partial regions. The part of interest corresponds to the region.

According to an eleventh aspect of the present invention, in the third aspect, the region may be the entire range seen in the reference image.

According to a twelfth aspect of the present invention, in the third aspect, the region may be part of a range seen in the reference image.

According to a thirteenth aspect of the present invention, in the third aspect, the processor may estimate three-dimensional coordinates of one or more points of a region of the subject seen in the reference image on the basis of the second camera coordinate, the second posture information, and the selected image in the estimation step. The one or more points of the region may be different from points having the three-dimensional coordinates included in the three-dimensional data. The three-dimensional image may visualize the three-dimensional coordinates of the one or more points of the region and may visualize three-dimensional coordinates of at least one point included in the region among the three-dimensional coordinates included in the three-dimensional data. The density of points having the three-dimensional coordinates visualized by the three-dimensional image may be higher than the density of points included in the region among the two or more points of the subject.

According to a fourteenth aspect of the present invention, in the third aspect, the processor may select the reference image including a reference region that meets a condition set in advance in the first selection step. The processor may estimate three-dimensional coordinates of one or more points of the reference region in the estimation step.

According to a fifteenth aspect of the present invention, in the fourteenth aspect, the processor may estimate the three-dimensional coordinates of the one or more points of the reference region on the basis of the second camera coordinate, the second posture information, and the selected image in the estimation step. The one or more points of the reference region may be different from points having the three-dimensional coordinates included in the three-dimensional data. The three-dimensional image may visualize the three-dimensional coordinates of the one or more points of the reference region and may visualize three-dimensional coordinates of at least one point included in the reference region among the three-dimensional coordinates included in the three-dimensional data. The density of points having the three-dimensional coordinates visualized by the three-dimensional image may be higher than the density of points included in the reference region among the two or more points of the subject.

According to a sixteenth aspect of the present invention, in the third aspect, the three-dimensional data may further include two-dimensional coordinates of a first point included in each of the two or more two-dimensional images. The processor may estimate the second camera coordinate on the basis of the first camera coordinate, the two-dimensional coordinates of the first point included in one of the two or more two-dimensional images, and two-dimensional coordinates of a second point of the reference image corresponding to the first point in the estimation step.

According to a seventeenth aspect of the present invention, in the third aspect, the processor may select one of one or more selection target images as the reference image in the first selection step. The one or more selection target images may be two-dimensional images of the subject and do not need to be included in the two or more two-dimensional images.

According to an eighteenth aspect of the present invention, in the third aspect, each of the two or more two-dimensional images may be temporally associated with the other two-dimensional images included in the two or more two-dimensional images.

According to a nineteenth aspect of the present invention, in the eighteenth aspect, each of the two or more two-dimensional images may be an image acquired by a single-eye camera.

According to a twentieth aspect of the present invention, in the eighteenth aspect, the processor may select at least one of the two or more two-dimensional images as the selected image in the second selection step by using time information that temporally associates the two or more two-dimensional images with each other.

According to a twenty-first aspect of the present invention, in the first aspect, the image of the subject may be a two-dimensional image. The image of the subject may visualize two-dimensional coordinates corresponding to at least one of the second camera coordinate and the set of the three-dimensional coordinates of the one or more points of the subject calculated on the basis of the second camera coordinate and may visualize two-dimensional coordinates corresponding to the three-dimensional coordinates of one or more of the two or more points.

According to a twenty-second aspect of the present invention, in the twenty-first aspect, the three-dimensional data may further include first posture information indicating a posture of the first camera. The first posture information may be associated with each of the two or more two-dimensional images. The processor may further estimate a posture of the second camera on the basis of the first posture information associated with the selected frame and may further generate second posture information indicating the estimated posture in the estimation step. The processor may further estimate three-dimensional coordinates of one or more points of a region of the subject seen in the reference image on the basis of the second camera coordinate and the second posture information in the estimation step. The image of the subject may visualize two-dimensional coordinates corresponding to the three-dimensional coordinates of the one or more points of the region.

According to a twenty-third aspect of the present invention, in the twenty-second aspect, the processor may further superimpose information indicating a position of the region on the image of the subject in the display step.

According to a twenty-fourth aspect of the present invention, in the twenty-first aspect, the image display method may further include a generation step in which the processor generates the image of the subject by using the three-dimensional data.

According to a twenty-fifth aspect of the present invention, in the twenty-fourth aspect, the processor may generate a first image that is the image of the subject seen from a first viewpoint and may generate a second image that is the image of the subject seen from a second viewpoint different from the first viewpoint in the generation step. The processor may display the first image and the second image on the display in the display step.

According to a twenty-sixth aspect of the present invention, in the twenty-first aspect, the reference image may be associated with information of the subject in advance. The image display method may further include an information display step in which, when the display step is executed and an instruction to select the reference image is input, the processor displays the information associated with the reference image indicated by the instruction on the display.

According to a twenty-seventh aspect of the present invention, in the twenty-first aspect, the image of the subject may be an image of shape data indicating a two-dimensional shape of the subject. The image display method may further include an association step in which the processor associates two-dimensional coordinates corresponding to the three-dimensional coordinates of the two or more points of the subject with the two-dimensional shape indicated by the shape data.

According to a twenty-eighth aspect of the present invention, a display control device includes a processor. The processor causes a storage medium to store three-dimensional data generated on the basis of two or more two-dimensional images of a subject. The three-dimensional data include three-dimensional coordinates of two or more points of the subject and a first camera coordinate. The first camera coordinate indicates three-dimensional coordinates of a first camera that acquires each of the two or more two-dimensional images. The first camera coordinate is associated with each of the two or more two-dimensional images. The processor selects a reference image that is a two-dimensional image of the subject and selects at least one of the two or more two-dimensional images as a selected image on the basis of the reference image. The processor estimates, on the basis of the first camera coordinate associated with the selected image, a second camera coordinate indicating three-dimensional coordinates of a second camera that acquires the reference image. The processor displays an image of the subject on a display. The image of the subject visualizes a position indicated by at least one of the second camera coordinate and a set of three-dimensional coordinates of one or more points of the subject calculated on the basis of the second camera coordinate.

According to a twenty-ninth aspect of the present invention, a non-transitory computer-readable recording medium saves a program for causing a computer to execute a storage step, a first selection step, a second selection step, an estimation step, and a display step. The computer causes a storage medium to store three-dimensional data generated on the basis of two or more two-dimensional images of a subject in the storage step. The three-dimensional data include three-dimensional coordinates of two or more points of the subject and a first camera coordinate. The first camera coordinate indicates three-dimensional coordinates of a first camera that acquires each of the two or more two-dimensional images. The first camera coordinate is associated with each of the two or more two-dimensional images. The computer selects a reference image that is a two-dimensional image of the subject in the first selection step. The computer selects at least one of the two or more two-dimensional images as a selected image on the basis of the reference image in the second selection step. The computer estimates, on the basis of the first camera coordinate associated with the selected image, a second camera coordinate indicating three-dimensional coordinates of a second camera that acquires the reference image in the estimation step. The computer displays an image of the subject on a display in the display step. The image of the subject visualizes a position indicated by at least one of the second camera coordinate and a set of three-dimensional coordinates of one or more points of the subject calculated on the basis of the second camera coordinate.

DETAILED DESCRIPTION OF THE INVENTION

Hereinafter, embodiments of the present invention will be described with reference to the drawings.

First Embodiment

Figure 1:
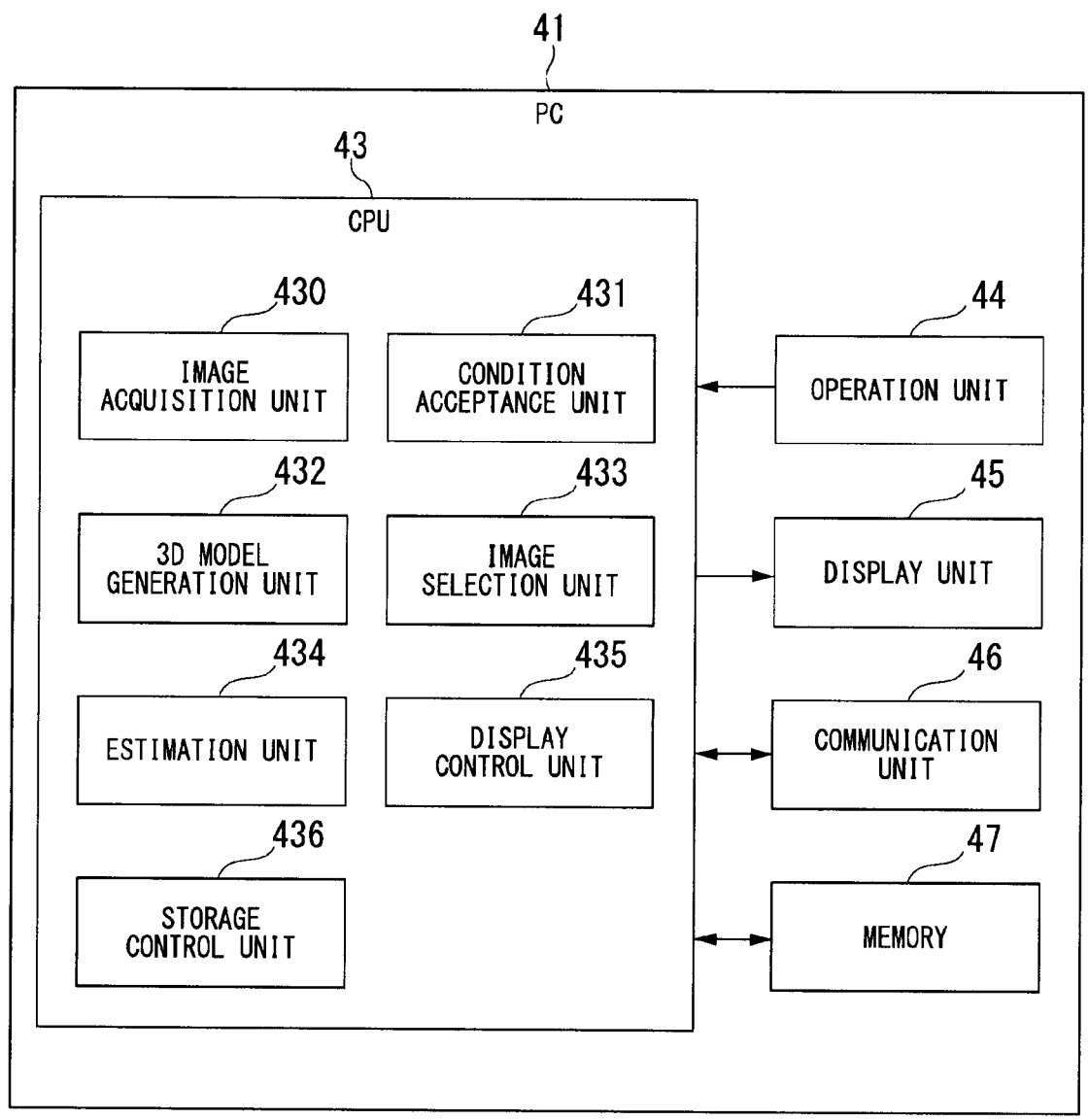
FIG. 1 is a block diagram showing a configuration of a PC according to a first embodiment of the present invention.

FIG. 1 shows a configuration of a personal computer (PC) 41 according to a first embodiment of the present invention. For example, the PC 41 is a desktop PC. The PC 41 may be a portable laptop PC or tablet terminal. The PC 41 may be a computer system that operates on a cloud. The PC 41 shown in FIG. 1 includes a CPU 43, an operation unit 44, a display unit 45, a communication unit 46, and a memory 47. The PC 41 functions as a display control device.

The operation unit 44 is a user interface. For example, the operation unit 44 is at least one of a button, a switch, a key, a mouse, a joystick, a touch pad, a track ball, and a touch panel. The operation unit 44 accepts a user's operation for the PC 41. A user can input various kinds of information into the PC 41 by operating the operation unit 44. The operation unit 44 accepts information input by the user and outputs the information to the CPU 43.

The display unit 45 includes a display screen and displays a 3D model and the like of a subject in an inspection target on the display screen. The display unit 45 is a monitor (display) such as a liquid crystal display (LCD). The display unit 45 may be a touch panel. In such a case, the operation unit 44 and the display unit 45 are integrated.

The communication unit 46 performs communication with an external device such as an endoscope device. For example, the communication unit 46 is connected to the external device wirelessly or by a cable. The communication between the communication unit 46 and the external device may be performed via a local area network (LAN) or the Internet.

The memory 47 is a volatile or nonvolatile memory. For example, the memory 47 is at least one of a random-access memory (RAM), a dynamic random-access memory (DRAM), a static random-access memory (SRAM), a read-only memory (ROM), an erasable programmable read-only memory (EPROM), an electrically erasable programmable read-only memory (EEPROM), and a flash memory. The memory 47 stores an image and the like.

In each embodiment of the present invention, an endoscope device acquires an image (image data) of a subject. However, a device that acquires an image is not limited to an endoscope device. A device including a camera may acquire an image, and the PC 41 may acquire the image from the camera. A device including a camera may acquire an image, and the image may be stored on a storage medium such as a memory card. The PC 41 may acquire the image from the storage medium. The PC 41 may include a camera, and the camera may acquire an image.

The CPU 43 controls an operation of the PC 41. The CPU 43 has functional units including an image acquisition unit 430, a condition acceptance unit 431, a 3D model generation unit 432, an image selection unit 433, an estimation unit 434, a display control unit 435, and a storage control unit 436. At least one of the blocks in the CPU 43 shown in FIG. 1 may be constituted by a different circuit from the CPU 43.

Each unit in the CPU 43 may be constituted by at least one of a processor and a logic circuit. For example, the processor is at least one of a CPU, a digital signal processor (DSP), and a graphics-processing unit (GPU). For example, the logic circuit is at least one of an application-specific integrated circuit (ASIC) and a field-programmable gate array (FPGA). Each unit in the CPU 43 may include one or a plurality of processors. Each unit in the CPU 43 may include one or a plurality of logic circuits.

The image acquisition unit 430 acquires a still image group including two or more still images from an endoscope device by controlling the communication unit 46. A still image is a two-dimensional image (2D image) of a subject. Therefore, the image acquisition unit 430 acquires two or more 2D images. The still image group may be a video including two or more 2D images temporally associated with each other.

A user inputs information indicating a condition for generating a three-dimensional model (3D model) of a subject into the PC 41 by operating the operation unit 44. The condition acceptance unit 431 accepts the condition for generating the 3D model of the subject on the basis of the information input by the user. Specifically, the condition includes an internal parameter of a camera, a distortion correction parameter of the camera, a setting value, a reference length, and the like. The setting value is used for various types of processing for generating a 3D model. The reference length is used for matching the 3D model with the actual scale of a subject.

The 3D model generation unit 432 generates (reconfigures) a 3D model of a subject on the basis of two or more 2D images included in the still image group. The 3D model generation unit 432 does not need to use all the 2D images included in the still image group. In a case in which the still image group includes three or more 2D images, the 3D model generation unit 432 generates a 3D model on the basis of all or part of the still image group. The 3D model is constituted by three-dimensional data (3D data) of a subject. The 3D model includes three-dimensional coordinates (3D coordinates) of two or more points (three-dimensional point cloud) of a subject, a camera coordinate, and posture information.

The camera coordinate (first camera coordinate) indicates 3D coordinates of a camera (first camera), which acquires each of the two or more 2D images, and is associated with each of the two or more 2D images. The camera coordinate indicates 3D coordinates of a viewpoint when a 2D image is acquired. For example, the camera coordinate indicates 3D coordinates of an observation optical system included in the camera. Posture information (first posture information) indicates a posture of the camera, which acquires each of the two or more 2D images, and is associated with each of the two or more 2D images. For example, the posture information indicates a posture of the observation optical system included in the camera.

Each of two or more points of a subject is seen in a 2D image. Although the term "point" is used in the specification for the convenience of description, a point of a subject does not need to be one point corresponding to one pixel on the screen. A point of a subject may include a region having an arbitrary size. A point of a subject may include a region that can be designated in units of sub-pixels.

The 3D model includes 2D coordinates of points included in each of the two or more 2D images. Each set of the 3D coordinates and each set of the 2D coordinates are associated with each other in the 3D model. The 3D coordinates and the 2D coordinates are associated with a 2D image including the 2D coordinates.

The image selection unit 433 selects a reference frame (reference image) in which a region of interest is seen from the still image group. The region of interest indicates a specific region designated by a user or a computer in order to visualize positions on the 3D model. Positions on the 3D model corresponding to the region of interest are visualized. Regions of interest are mainly classified into the entire specific image and a region of a specific subject seen in a specific image.

An example in which a region of interest is the entire specific image will be described. For example, a region of interest is the entire region of a still image acquired during an inspection. The entire region is the entire range seen in a still image. A region of interest may be the entire region of an image in which an abnormality is automatically detected by using a technical means such as machine learning. A region of interest may be the entire region of an image to which a user attaches a tag while a video is recorded.

An example in which a region of interest is a region of a specific subject will be described. For example, a region of interest is a specific region of a subject designated in a specific image by a user during or after an inspection. In other words, a region of interest is a partial region of a still image. The partial region is part of a range seen in a still image. A region of interest may be a specific region included in an image in which an abnormality is automatically detected.

Accordingly, a region of interest is all or part of one still image included in the still image group. A region of interest is not limited to the above-described examples. The image selection unit 433 may select two or more reference frames from the still image group.

In addition, the image selection unit 433 selects at least one image (selected image) among two or more images that are included in the still image group and are used for generating a 3D model. Hereinafter, the two or more images used for generating a 3D model are called key frames. In addition, a key frame selected by the image selection unit 433 is called a selected frame. The reference frame and a key frame selected by the image selection unit 433 are used by the estimation unit 434.

As described above, a 3D model includes a camera coordinate and posture information, and the camera coordinate and the posture information are associated with a still image included in the still image group. A selected frame is included in the still image group. The estimation unit 434 estimates 3D coordinates (second camera coordinate) of a camera (second camera) that acquires a reference frame on the basis of the camera coordinate associated with the selected frame.

The estimation unit 434 further estimates a posture of the camera, which acquires the reference frame, and generates posture information (second posture information) indicating the estimated posture. The estimation unit 434 estimates 3D coordinates of a region of a subject seen in the reference frame on the basis of the camera coordinate and the posture information of the camera that acquires the reference frame. In this way, the estimation unit 434 estimates a position on a 3D model corresponding to a region of interest.

The display control unit 435 displays an image on the display unit 45 by outputting the image to the display unit 45. In addition, the display control unit 435 superimposes information on an image and outputs the image to the display unit 45. In this way, the display control unit 435 displays the image on which the information is superimposed on the display unit 45. Specifically, the display control unit 435 displays a three-dimensional image (3D image), which visualizes 3D coordinates included in a 3D model, on the display unit 45. In addition, the display control unit 435 displays, on a 3D image, at least one of the camera coordinate of the camera that acquires the reference frame and a position of a region of a 3D model corresponding to a region of interest. Furthermore, the display control unit 435 displays various kinds of information presented to a user on the display unit 45.

The storage control unit 436 causes the memory 47 to store the still image group acquired from an endoscope device. The storage control unit 436 causes the memory 47 to store the condition accepted by the condition acceptance unit 431. The storage control unit 436 causes the memory 47 to store the 3D model generated by the 3D model generation unit 432. The storage control unit 436 causes the memory 47 to store various kinds of information and various kinds of data processed by the CPU 43 in addition to the above-described information and data.

The CPU 43 may read a program and execute the read program. The program includes commands defining the operations of the CPU 43. In other words, the functions of the CPU 43 may be realized by software. The program, for example, may be provided by using a "computer-readable storage medium" such as a flash memory. The program may be transmitted from the computer storing the program to the PC 41 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

The PC 41 may execute processing without accepting information from a user. Therefore, the PC 41 does not need to include the operation unit 44. The PC 41 may use a display unit outside the PC 41 in order to display an image and the like. Therefore, the PC 41 does not need to include the display unit 45. In a case in which the PC 41 includes a camera that acquires a still image group, the PC 41 does not need to acquire the still image group from an endoscope device. Therefore, the PC 41 does not need to include the communication unit 46. The memory 47 may be configured to be attachable to and detachable from the PC 41. Therefore, the PC 41 does not need to include the memory 47.

Figure 2:
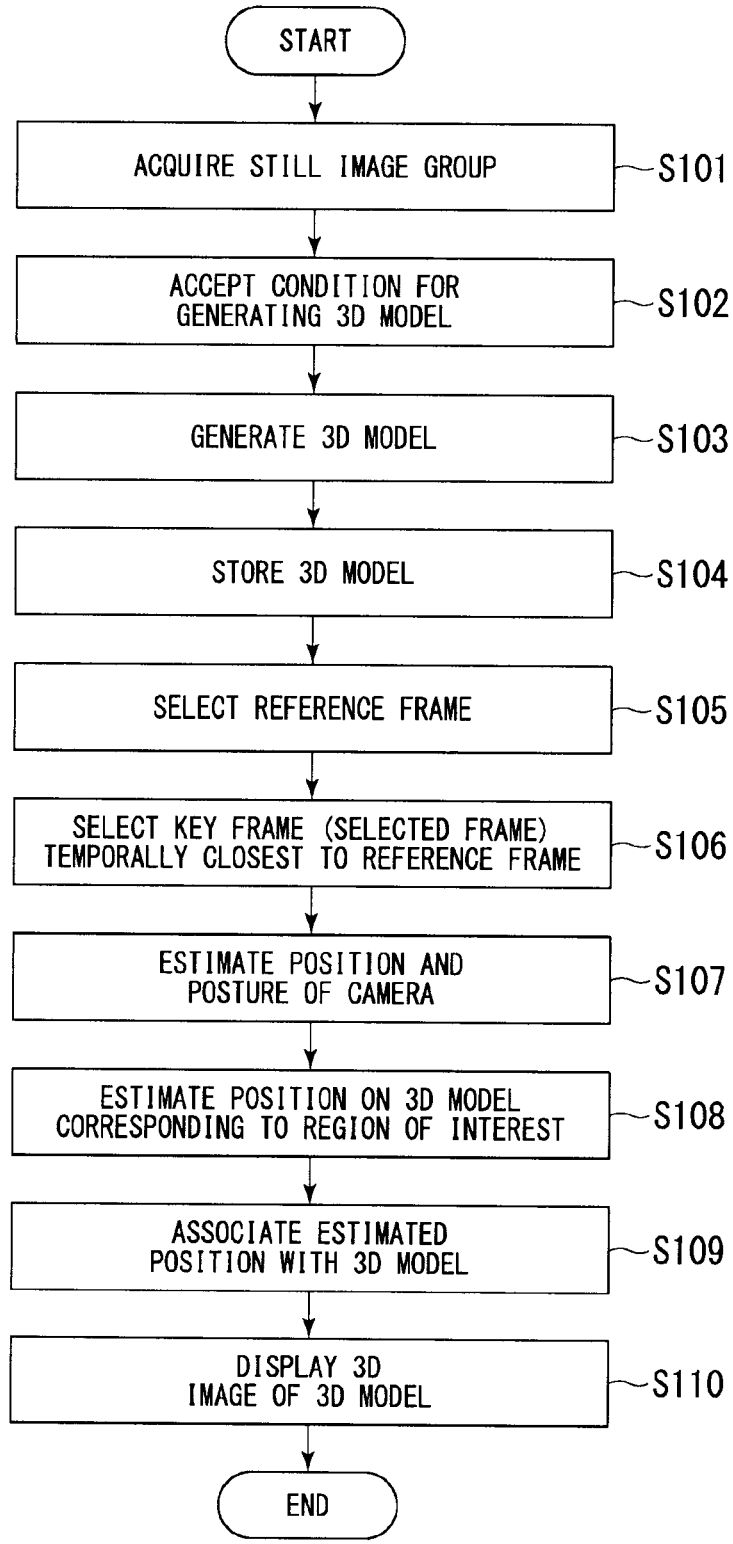
FIG. 2 is a flow chart showing a procedure of processing executed by the PC according to the first embodiment of the present invention.

A procedure of processing executed for generating a 3D model and displaying a region of interest will be described by referring to FIG. 2. FIG. 2 shows a procedure of processing executed by the CPU 43. The PC 41 executes processing on the basis of a still image group, a condition for generating a 3D model, and information of a region of interest. In this way, the PC 41 visualizes a position on a 3D model corresponding to a region of interest.

In the first embodiment, a region of interest is the entire region of a still image recorded in accordance with an instruction from a user during an inspection using an endoscope. In addition, the still image group is a video, and timings at which still images are recorded are associated with a video file recorded during the inspection. An example in which timings at which still images are recorded are not associated with a video file will be described in a third modified example of the first embodiment. An example in which a user does not set a region of interest and a device automatically sets a region of interest will be described in a third embodiment.

The image acquisition unit 430 acquires a still image group including two or more still images (2D images) from an endoscope device by controlling the communication unit 46. The storage control unit 436 causes the memory 47 to store the still image group (Step S101).

After Step S101, a user inputs information indicating a condition for generating a 3D model of a subject into the PC 41. The condition acceptance unit 431 accepts the condition for generating the 3D model of the subject on the basis of the information input into the PC 41 by the user. The storage control unit 436 causes the memory 47 to store the condition (Step S102). As described above, the condition includes an internal parameter of a camera, a distortion correction parameter of the camera, a setting value, a reference length, and the like. A user does not need to designate all of these conditions. The CPU 43 may automatically set at least one of these conditions.

After Step S102, the 3D model generation unit 432 generates a 3D model of a subject on the basis of two or more 2D images included in the still image group and the condition for generating the 3D model (Step S103). The 3D model generation unit 432 does not need to use all the 2D images included in the still image group.

A procedure of specific processing executed by the 3D model generation unit 432 will be described. The 3D model generation unit 432 uses the still image group acquired by the image acquisition unit 430 and the condition accepted by the condition acceptance unit 431. Hereinafter, an example in which the 3D model generation unit 432 uses two images (still images) included in the still image group will be described. When two images are captured, the two viewpoints of a camera are different from each other. Even when three or more images are used, a basic principle is not changed from that of the case in which two images are used. A method described below may be applied also to a case in which three or more images are used.

In a method described below, feature points in each of two images acquired at two different viewpoints are detected, and a plurality of feature points are associated with each other. In addition, in the method described below, a position of a camera, a posture of the camera, and 3D coordinates of the feature points are estimated. A method using information of feature points is called an indirect method. A method applied to each embodiment of the present invention is not limited to this method.

For example, there is a method of directly using pixel values of two images acquired at two different viewpoints. By using this method, a position of a camera, a posture of the camera, and 3D coordinates corresponding to each pixel are estimated. This method is called a direct method. This method may be used in each embodiment of the present invention. As long as a position of a camera, a posture of the camera, and 3D coordinates of a subject are estimated by using two or more images acquired at two or more different viewpoints, any method may be used.

Figure 3:
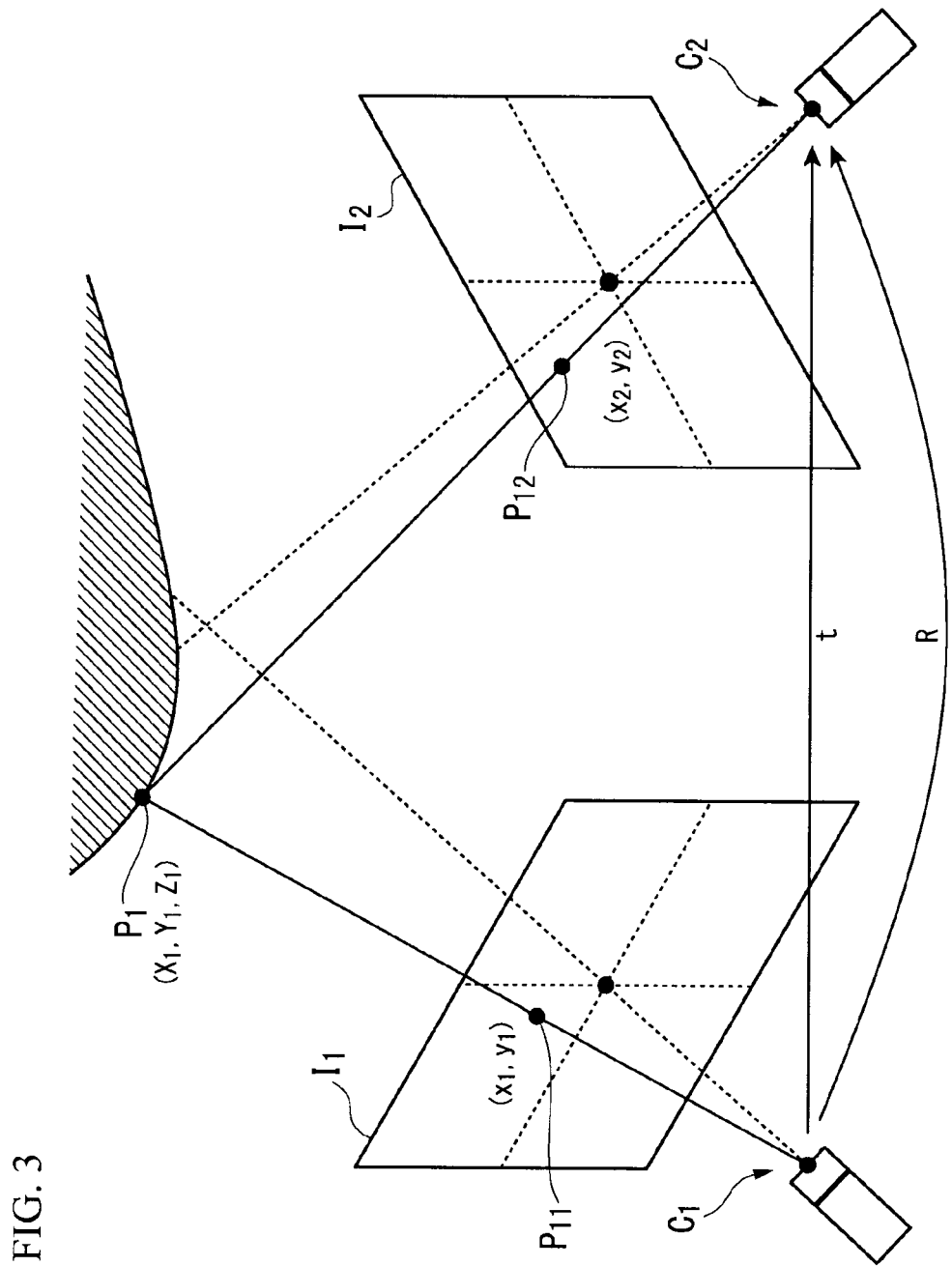
FIG. 3 is a schematic diagram showing a situation in which an image is acquired in the first embodiment of the present invention.

FIG. 3 schematically shows a situation of image acquisition in a case in which two images of a subject are acquired. In the following description, the expression "camera" is used in a broad sense. In a case in which an endoscope acquires an image, the camera in the following description specifically indicates an observation optical system of the distal end of the endoscope.

As shown in FIG. 3, first, an image $I_1$ is acquired in an imaging state $c_1$ of the camera. Next, an image $I_2$ is acquired in an imaging state $c_2$ of the camera. At least one of an imaging position and an imaging posture is different between the imaging state $c_1$ and the imaging state $c_2$. In FIG. 3, both the imaging position and the imaging posture are different between the imaging state $c_1$ and the imaging state $c_2$.

In each embodiment of the present invention, it is assumed that the image $I_1$ and the image $I_2$ are acquired by the same endoscope. In addition, in each embodiment of the present invention, it is assumed that parameters of an objective optical system of the endoscope do not change. The parameters of the objective optical system are a focal distance, a distortion aberration, a pixel size of an image sensor, and the like. Hereinafter, for the convenience of description, the parameters of the objective optical system will be abbreviated to internal parameters. When such conditions are assumed, the internal parameters specifying characteristics of the optical system of the endoscope can be used in common regardless of the position and the posture of the camera (observation optical system). In each embodiment of the present invention, it is assumed that the internal parameters are acquired at the time of factory shipment. In addition, in each embodiment of the present invention, it is assumed that the internal parameters are known at the time of acquiring an image.

In each embodiment of the present invention, it is assumed that two or more images are extracted from the still image group and the still image group is acquired by one endoscope. However, the present invention is not limited to this. For example, the present invention may also be applied to a case in which a 3D model is restored by using a plurality of still image groups acquired by a plurality of endoscopes. In this case, the image $I_1$ and the image $I_2$ have only to be acquired by using different endoscope devices, and each internal parameter has only to be stored for each endoscope. Even if the internal parameters are unknown, it is possible to perform calculation by using the internal parameters as variables. Therefore, the subsequent procedure does not greatly change in accordance with whether or not the internal parameters are known.

Figure 4:
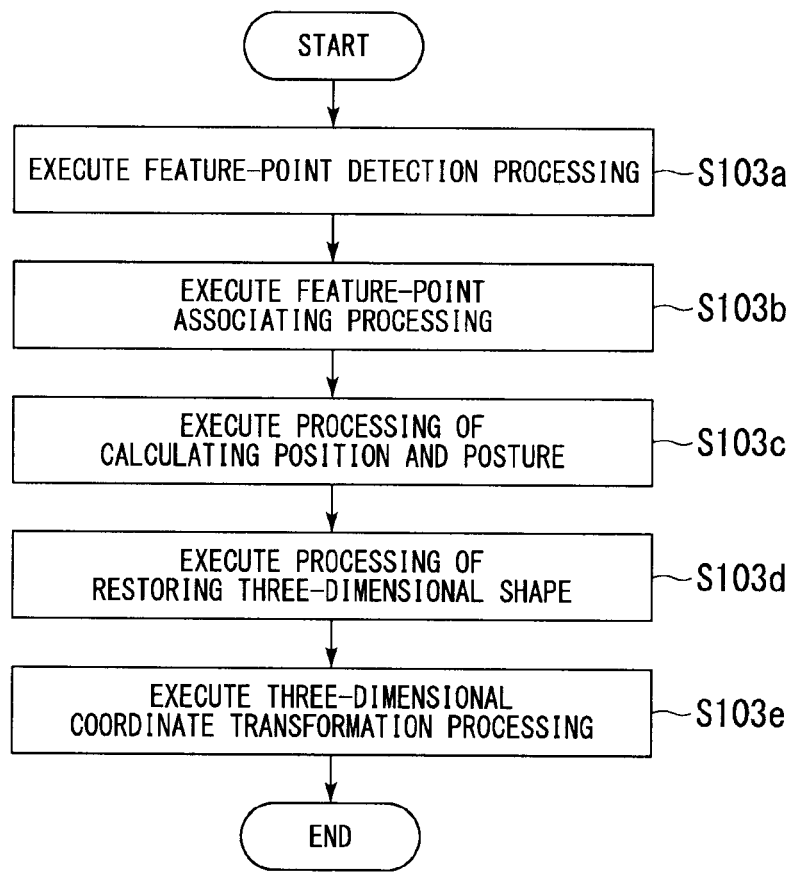
FIG. 4 is a flow chart showing a procedure of processing for generating a three-dimensional model in the first embodiment of the present invention.

Processing for calculating 3D coordinates of a subject on the basis of two images and generating a 3D model will be described by referring to FIG. 4. FIG. 4 shows a procedure of processing for generating a 3D model.

First, the 3D model generation unit 432 executes feature-point detection processing (Step S103a). The 3D model generation unit 432 detects a feature point of each of two images in the feature-point detection processing. The feature point indicates a corner, an edge, and the like in which an image luminance gradient is large in information of a subject seen in an image. As a method of detecting this feature point, scale-invariant feature transform (SIFT), features from accelerated segment test (FAST), or the like is used. The 3D model generation unit 432 can detect a feature point within an image by using such a method.

FIG. 3 shows an example in which a feature point $P_{11}$ is detected from the image $I_1$ and a feature point $P_{12}$ is detected from the image $I_2$. Although only one feature point of each image is shown in FIG. 3, in fact, a plurality of feature points are detected in each image. There is a possibility that the number of feature points detected in each image is different between images. Each feature point detected from each image is converted into data called a feature quantity. The feature quantity is data that indicate a feature of a feature point.

After Step S103a, the 3D model generation unit 432 executes feature-point associating processing (Step S103b). In the feature-point associating processing, the 3D model generation unit 432 compares correlations of feature quantities between images for each feature point detected in the feature-point detection processing (Step S103a). In a case in which the correlations of the feature quantities are compared and a feature point of which feature quantities are close to those of a feature point of another image is found in each image, the 3D model generation unit 432 stores information of the feature point on the memory 47. In this way, the 3D model generation unit 432 associates feature points of respective images together. On the other hand, in a case in which a feature point of which feature quantities are close to those of a feature point of another image is not found, the 3D model generation unit 432 discards information of the feature point.

After Step S103b, the 3D model generation unit 432 reads coordinates of feature points (feature point pair) of two images associated with each other from the memory 47. The 3D model generation unit 432 executes processing of calculating a position and a posture on the basis of the read coordinates (Step S103c). In the processing of calculating a position and a posture, the 3D model generation unit 432 calculates a relative position and a relative posture between the imaging state $c_1$ of the camera that acquires the image $I_1$ and the imaging state $c_2$ of the camera that acquires the image $I_2$. More specifically, the 3D model generation unit 432 calculates a matrix E by solving the following Equation (1) using an epipolar restriction.

$$p_1^T E p_2 = 0 \quad E = [t]_X R \quad \because [t]_X = \begin{pmatrix} 0 & -t_z & t_y \\ t_z & 0 & -t_x \\ -t_y & t_x & 0 \end{pmatrix} \quad (1)$$

The matrix E is called a basic matrix. The basic matrix E is a matrix storing a relative position and a relative posture between the imaging state $c_1$ of the camera that acquires the image $I_1$ and the imaging state $c_2$ of the camera that acquires the image $I_2$. In Equation (1), a matrix $p_1$ is a matrix including coordinates of a feature point detected from the image $I_1$. A matrix $p_2$ is a matrix including coordinates of a feature point detected from the image $I_2$. The basic matrix E includes information related to a relative position and a relative posture of the camera and thus corresponds to external parameters of the camera. The 3D model generation unit 432 can solve the basic matrix E by using a known algorithm.

As shown in FIG. 3, Expression (2) and Expression (3) are satisfied in a case in which the amount of position (relative position) change of the camera is t and the amount of posture (relative posture) change of the camera is R.

$$t = (t_x, t_y, t_z) \quad (2)$$

$$R = R_x(\alpha)R_y(\beta)R_z(\gamma) = \\ \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \quad (3)$$

In Expression (2), the amount of movement in an x-axis direction is expressed as $t_x$, the amount of movement in a y-axis direction is expressed as ty, and the amount of movement in a z-axis direction is expressed as $t_z$. In Expression (3), a rotation amount $\alpha$ around the x-axis is expressed as $R_x(\alpha)$, a rotation amount $\beta$ around the y axis is expressed as $R_y(\beta)$, and a rotation amount $\gamma$ around the z axis is expressed as $R_z(\gamma)$. After the basic matrix E is calculated, optimization processing called bundle adjustment may be executed in order to improve restoration accuracy of 3D coordinates.

The 3D model generation unit 432 calculates 3D coordinates (camera coordinate) in a coordinate system of a 3D model by using the calculated amount of position change of the camera. For example, the 3D model generation unit 432 defines 3D coordinates of the camera that acquires the image $I_1$. The 3D model generation unit 432 calculates 3D coordinates of the camera that acquires the image $I_2$ on the basis of the 3D coordinates of the camera that acquires the image $I_1$ and the amount of position change of the camera that acquires the image $I_2$.

The 3D model generation unit 432 calculates posture information in a coordinate system of a 3D model by using the calculated amount of posture change of the camera. For example, the 3D model generation unit 432 defines posture information of the camera that acquires the image $I_1$. The 3D model generation unit 432 generates posture information of the camera that acquires the image $I_2$ on the basis of the posture information of the camera that acquires the image $I_1$ and the amount of posture change of the camera that acquires the image $I_2$.

The 3D model generation unit 432 generates data (3D shape data) of a three-dimensional shape (3D shape) by executing the processing (Step S103c) of calculating a position and a posture. The 3D shape data include 3D coordinates (camera coordinate) at a position of a camera and posture information indicating a posture of the camera. In addition, in a case in which a method such as structure from motion, visual-SLAM, or the like is applied to the processing (Step S103c) of calculating a position and a posture, the 3D model generation unit 432 further calculates 3D coordinates of each feature point in Step S103c. The 3D shape data generated in Step S103c do not include 3D coordinates of points on a subject other than the feature point. Therefore, the 3D shape data indicate a sparse 3D shape of a subject.

The 3D shape data include 3D coordinates of each feature point, the above-described camera coordinate, and the above-described posture information. The 3D coordinates of each feature point are defined in a coordinate system of a 3D model. The 3D coordinates of each feature point are associated with two-dimensional coordinates (2D coordinates) of each feature point. The 2D coordinates of each feature point are defined in a coordinate system of a 2D image including each feature point. The 2D coordinates and the 3D coordinates of each feature point are associated with a 2D image including each feature point.

After Step S103c, the 3D model generation unit 432 executes processing of restoring a three-dimensional shape on the basis of the relative position and the relative posture of the camera (the amount t of position change and the amount R of posture change) calculated in Step S103c (Step S103d). The 3D model generation unit 432 generates a 3D model of a subject in the processing of restoring a three-dimensional shape. As a technique for restoring a three-dimensional shape of a subject, there are patch-based multi-view stereo (PMVS), matching-processing that uses parallelization stereo, and the like. However, a means therefor is not particularly limited.

The 3D model generation unit 432 calculates 3D coordinates of points on a subject other than feature points in Step S103d. The 3D coordinates of each point other than feature points are defined in a coordinate system of a 3D model. The 3D coordinates of each point are associated with the 2D coordinates of each point. The 2D coordinates of each point are defined in a coordinate system of a 2D image including each point. The 3D coordinates and the 2D coordinates of each point are associated with a 2D image including each point. The 3D model generation unit 432 updates the 3D shape data. The updated 3D shape data include 3D coordinates of each feature point, 3D coordinates of each point other than feature points, a camera coordinate, and posture information. The 3D shape data updated in Step S103d include 3D coordinates of a point on a subject other than feature points in addition to 3D coordinates of the feature points. Therefore, the 3D shape data indicate a dense 3D shape of a subject.

After Step S103d, the 3D model generation unit 432 executes three-dimensional coordinate transformation processing on the basis of both the 3D shape data processed in the processing (Step S103d) of restoring a three-dimensional shape and the reference length accepted by the condition acceptance unit 431 (Step S103e). The 3D model generation unit 432 transforms the 3D shape data of a subject into three-dimensional coordinate data having a dimension of length in the three-dimensional coordinate transformation processing. When Step S103e is executed, the processing shown in FIG. 4 is completed.

In order to shorten a processing time, Step S103d may be omitted. In this case, after Step S103c is executed, Step S103e is executed without executing Step S103d.

Step S103e may be omitted. In this case, after Step S103d is executed, the processing shown in FIG. 4 is completed without executing Step S103e. In this case, a 3D model indicates a relative shape of a subject not having a dimension of length. Even when a 3D model indicates a relative shape of a subject, the PC 41 can identify a region of the 3D model corresponding to the region of interest.

It is necessary that at least part of a region of one of 2D images and at least part of a region of at least one of the other 2D images be shared in order to generate a 3D model in accordance with the principle shown in FIG. 3. In other words, a region of a first 2D image and a region of a second 2D image different from the first 2D image include a common region. A region in the first 2D image other than the common region and a region in the second 2D image other than the common region are different from each other.

A procedure of processing executed after the 3D model is generated will be described by referring to FIG. 2 again. After Step S103, the storage control unit 436 causes the memory 47 to store the 3D model generated by the 3D model generation unit 432 (Step S104).

After Step S104, the image selection unit 433 selects a reference frame including the region of interest from the still image group. In the first embodiment, a timing at which a still image is recorded is associated with a video file recorded during an inspection. For example, the timing is embedded in the header of the video file. The image selection unit 433 identifies a timing at which a still image is recorded by reading the header of the video file. For example, in a case in which the frame rate of the video file is 60 fps and a still image is recorded 20 seconds after the timing at which generation of the video file is started, a still image corresponding to the 1200th image of the video file is recorded. The image selection unit 433 reads a still image recorded at the identified timing as a reference frame from the memory 47 (Step S105).

In the first embodiment, the reference frame is the same as the still image designated by a user. The region of interest is the entire range seen in the reference frame.

A condition of the reference frame is stored on the memory 47 in advance. In the above-described example, the condition indicates that a still image to be selected is associated with a specific timing. The image selection unit 433 selects a 2D image that meets the condition among two or more 2D images included in the still image group in Step S105.

After Step S105, the image selection unit 433 selects at least one (selected frame) of two or more key frames used for generating the 3D model in Step S103. The selected frame is associated with a timing temporally closest to the timing identified in Step S105. The selected frame is different from the reference frame. The image selection unit 433 reads the selected frame from the memory 47 (Step S106).

A condition of the selected frame is stored on the memory 47 in advance. In the above-described example, the condition indicates that a key frame to be selected is associated with a timing temporally closest to the timing identified in Step S105. The image selection unit 433 selects a key frame that meets the condition among the two or more key frames in Step S106.

In the above-described example, the image selection unit 433 selects a key frame temporally closest to the reference frame as the selected frame. In this way, the image selection unit 433 selects a key frame acquired in the most similar composition to that of the reference frame. Therefore, it is expected that the same region of a subject is seen in the reference frame and the selected frame. However, each embodiment of the present invention is not limited to this processing. In addition, the image selection unit 433 may select at least two key frames as the selected frame. For example, the image selection unit 433 may select a key frame temporally closest to the reference frame and may select a key frame second closest to the reference frame.

At least part of a region of the reference frame and at least part of a region of the selected frame are shared. In other words, the region of the reference frame and the region of the selected frame include a common region. A region in the reference frame other than the common region and a region in the selected frame other than the common region are different from each other.

After Step S106, the estimation unit 434 reads the 3D model from the memory 47. The estimation unit 434 estimates a position and a posture of a camera that acquires the reference frame on the basis of the reference frame, the selected frame, and the 3D model (Step S107).

Figure 5:
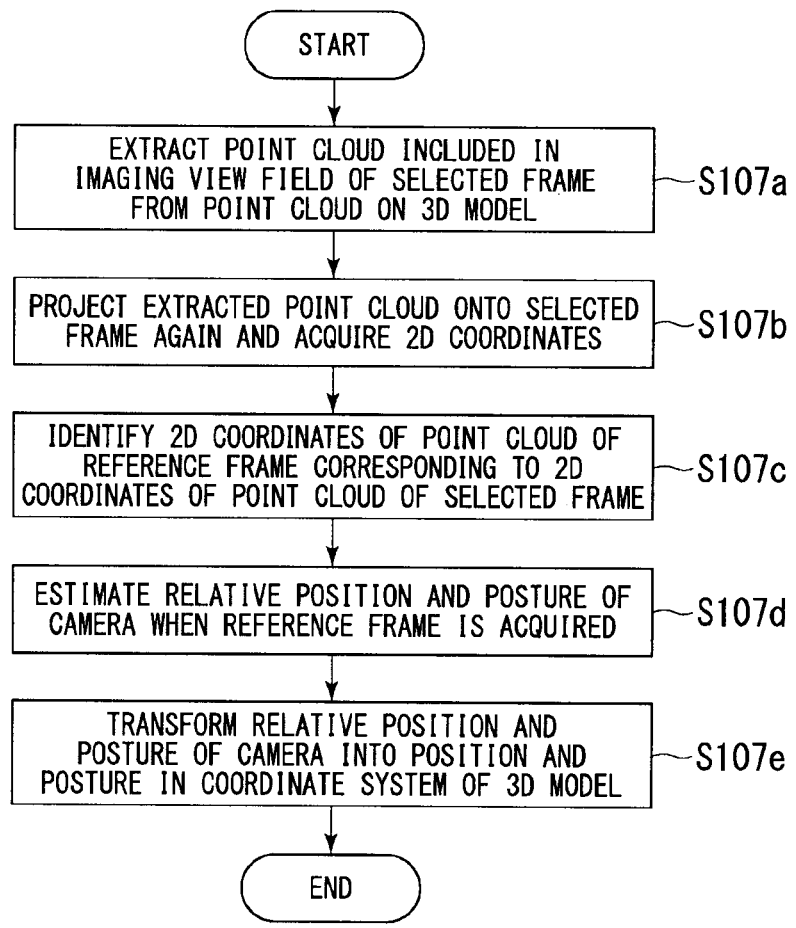
FIG. 5 is a flow chart showing a procedure of processing for estimating a position and a posture of a camera in the first embodiment of the present invention.
Figure 6:
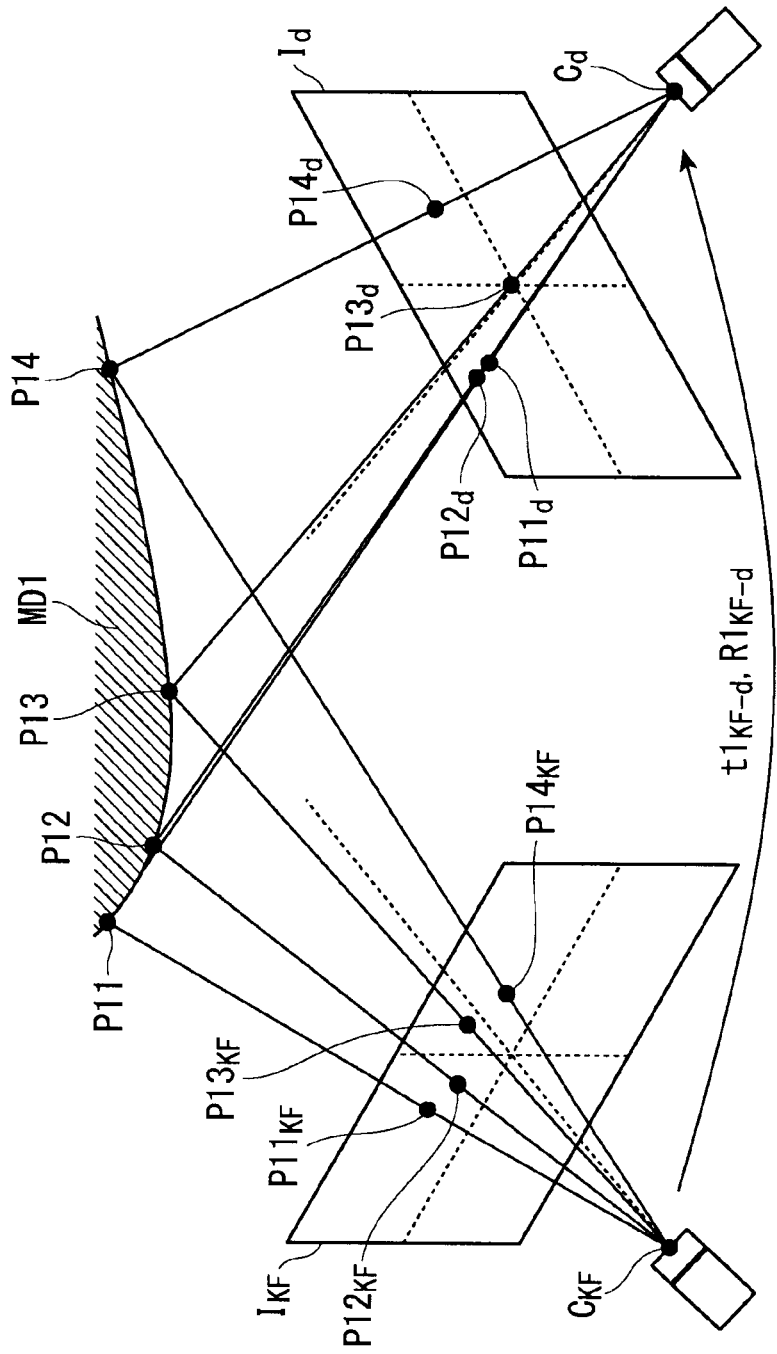
FIG. 6 is a schematic diagram showing a situation in which an image is acquired in the first embodiment of the present invention.

Processing for estimating a position and a posture of a camera will be described by referring to FIG. 5 and FIG. 6. FIG. 5 shows a procedure of processing for estimating a position and a posture of a camera. FIG. 6 schematically shows a situation in which the reference frame and the selected frame are acquired. A reference frame $I_d$ is acquired in an imaging state $C_d$ of a camera and a selected frame $I_{KF}$, which is one of the key frames, is acquired in an imaging state $C_{KF}$ of a camera. In the first embodiment, the reference frame and the selected frame are included in the still image group acquired by an endoscope. Therefore, the camera that acquires the reference frame is the same as the camera that acquires the selected frame. The camera that acquires the reference frame may be different from the camera that acquires the selected frame.

The estimation unit 434 extracts part of a three-dimensional point cloud (3D point cloud) constituting the 3D model. A region of a subject corresponding to the extracted 3D point cloud is included in the imaging view field of the camera that acquires the selected frame. Therefore, the region is seen in the selected frame. As described above, 2D coordinates and 3D coordinates of a feature point are associated with a 2D image including the feature point. The 3D model includes 3D coordinates of a feature point included in each of the two or more key frames. The estimation unit 434 extracts 3D coordinates of a feature point associated with the selected frame. In this way, the estimation unit 434 extracts the 3D point cloud. For example, the estimation unit 434 extracts a point P11, a point P12, a point P13, and a point P14 on a 3D model MD1 shown in FIG. 6 (Step S107a).

After Step S107a, the estimation unit 434 projects the 3D point cloud extracted in Step S107a onto a two-dimensional coordinate system of the selected frame again, thus acquiring 2D coordinates of the 3D point cloud. The estimation unit 434 can project the 3D coordinates of the 3D point cloud onto the two-dimensional coordinate system of the selected frame again by using a camera model stored in advance. In general, a pinhole-camera model or the like is often used as a camera model. For example, the estimation unit 434 acquires 2D coordinates of each of a point $P11_{KF}$, a point $P12_{KF}$, a point $P13_{KF}$, and a point $P14_{KF}$ of the selected frame $I_{KF}$ shown in FIG. 6. In FIG. 6, the point $P11_{KF}$ of the selected frame $I_{KF}$ corresponds to the point P11 on the 3D model MD1, the point $P12_{KF}$ of the selected frame $I_{KF}$ corresponds to the point P12 on the 3D model MD1, the point $P13_{KF}$ of the selected frame $I_{KF}$ corresponds to the point P13 on the 3D model MD1, and the point $P14_{KF}$ of the selected frame $I_{KF}$ corresponds to the point P14 on the 3D model MD1 (Step S107b).

After Step S107b, the estimation unit 434 searches for 2D coordinates of the reference frame corresponding to the 2D coordinates of the selected frame acquired in Step S107b. In other words, the estimation unit 434 identifies the same points in the reference frame as those seen in the selected frame. For example, the estimation unit 434 identifies a point $P11_d$, a point $P12_d$, a point $P13_d$, and a point $P14_d$ of the reference frame $I_d$ shown in FIG. 6. In FIG. 6, the point $P11_d$ of the reference frame $I_d$ corresponds to the point $P11_{KF}$ of the selected frame $I_{KF}$, the point $P12_d$ of the reference frame $I_d$ corresponds to the point $P12_{KF}$ of the selected frame $I_{KF}$, the point $P13_d$ of the reference frame $I_d$ corresponds to the point $P13_{KF}$ of the selected frame $I_{KF}$, and the point $P14_d$ of the reference frame $I_d$ corresponds to the point $P14_{KF}$ of the selected frame $I_{KF}$ (Step S107c).

In Step S103a shown in FIG. 4, a feature quantity at a feature point of each image is calculated. The 3D model may include a feature quantity at a feature point of each of two or more 2D images included in the still image group. The estimation unit 434 may identify the same point of the reference frame as that of the selected frame on the basis of the feature quantities of points of the selected frame and the feature quantities of points of the reference frame in Step S107c.

After Step S107c, the estimation unit 434 estimates a position and a posture of the camera that acquires the reference frame on the basis of the 3D coordinates acquired in Step S107a, the 2D coordinates acquired in Step S107b, and the 2D coordinates acquired in Step S107c. Specifically, the estimation unit 434 solves a perspective-n-point problem using the 3D coordinates on the 3D model, the 2D coordinates of the selected frame, and the 2D coordinates of the reference frame as the input, thus estimating a position and a posture of the camera. In this way, the estimation unit 434 estimates a relative position of a second camera with respect to a position of a first camera and estimates a relative posture of the second camera with respect to a posture of the first camera. The first camera is the camera that acquires the selected frame. The second camera is the camera that acquires the reference frame. For example, the estimation unit 434 estimates a position $t1_{KF\text{-}d}$ and a posture $R1_{KF\text{-}d}$ shown in FIG. 6 (Step S107d).

The 3D model includes a camera coordinate and posture information of a camera that acquires two or more 2D images for generating the 3D model. In the first embodiment, it is assumed that the 3D model generation unit 432 generates the 3D model without using the reference frame. In this case, the image selection unit 433 selects, as the reference frame, a different 2D image from all the two or more key frames used for generating the 3D model. The 3D model does not include a camera coordinate and posture information of the camera that acquires the reference frame. Therefore, the estimation unit 434 estimates a position and a posture of the camera that acquires the reference frame in Step S107d.

Figure 7:
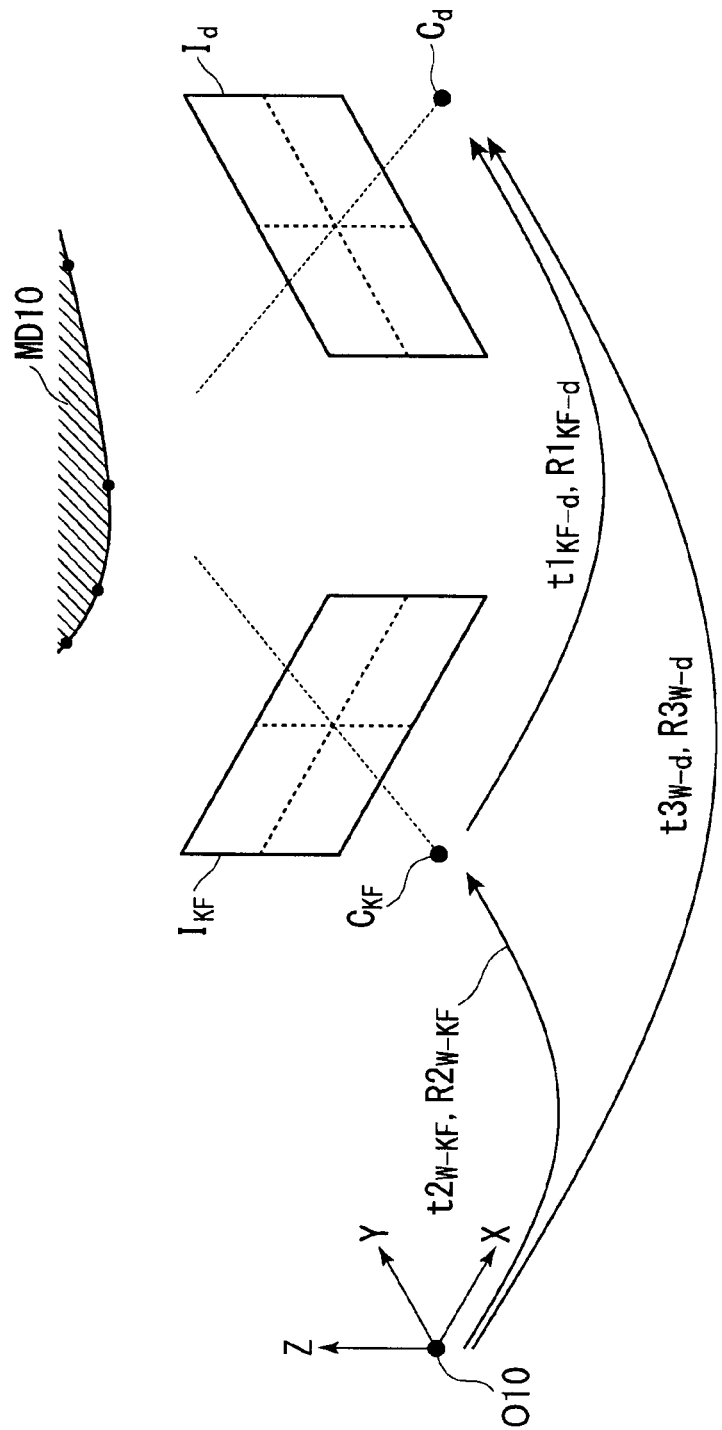
FIG. 7 is a schematic diagram showing the processing for estimating a position and a posture of a camera in the first embodiment of the present invention.

After Step S107d, the estimation unit 434 transforms the position and the posture of the camera acquired in Step S107d into a position and a posture of the camera in the coordinate system of the 3D model (Step S107e). When Step S107e is executed, the processing shown in FIG. 5 is completed. Details of Step S107e will be described by referring to FIG. 7. The 3D model generation unit 432 estimates a position and a posture of a camera that acquires the selected frame $I_{KF}$ in FIG. 7 in Step S103. In other words, the 3D model generation unit 432 estimates a position $t2_{W\text{-}KF}$ and a posture $R2_{W\text{-}KF}$ of which a reference is an origin O10 of the coordinate system of the 3D model MD10 in FIG. 7. The 3D data of the 3D model MD10 include a camera coordinate of the camera that acquires the selected frame $I_{KF}$ and include posture information of the camera. In other words, the 3D data include 3D coordinates of the position $t2_{W\text{-}KF}$ and posture information of the posture $R2_{W\text{-}KF}$.

The estimation unit 434 estimates the relative position $t1_{KF}$-d and the relative posture $R1_{KF}$-d of the camera that acquires the reference frame $I_d$ in Step S107d. The estimation unit 434 acquires the position $t2_{W\text{-}KF}$ (3D coordinates) of the camera, which acquires the selected frame $I_{KF}$, and the posture $R2_{W\text{-}KF}$ (posture information) of the camera from the 3D data in Step S107e. The estimation unit 434 estimates a position and a posture of the camera that acquires the reference frame $I_d$ in FIG. 7 in Step S107e. Specifically, the estimation unit 434 estimates a position $t3_{W\text{-}d}$ of which a reference is the origin O10 on the basis of the position $t2_{W-KF}$ and the position $t1_{KF-d}$. In addition, the estimation unit 434 estimates a posture $R3_{W-d}$ of which a reference is the origin O10 on the basis of the posture $R2_{W-KF}$ and the posture $R1_{KF}$-d.

A procedure of processing executed after the 3D model is generated will be described by referring to FIG. 2 again. After Step S107, the estimation unit 434 calculates 3D coordinates of a region of the 3D model corresponding to the reference frame. In this way, the estimation unit 434 estimates a position on the 3D model corresponding to the region of interest (Step S108).

Details of Step S108 will be described. The estimation unit 434 projects 2D coordinates of one or more points of the reference frame onto the 3D model on the basis of the position and the posture of the camera estimated in Step S107 and the condition (the internal parameter and the distortion correction parameter) received from the condition acceptance unit 431. In this way, the estimation unit 434 identifies one or more points on the 3D model. The one or more points of the reference frame include a point having the 2D coordinates identified in Step S107c. In other words, the one or more points of the reference frame include one or more feature points. Alternatively, the one or more points of the reference frame include a point having 2D coordinates other than the 2D coordinates identified in Step S107c. In other words, the one or more points of the reference frame include one or more points other than the feature points. The one or more points of the reference frame may include one or more feature points and one or more points other than the feature points. The estimation unit 434 acquires the 3D coordinates of the identified point from the 3D model. The estimation unit 434 calculates 3D coordinates of a subject that enters the imaging visual field of the camera that acquires the reference frame by executing the above-described processing.

After Step S108, the estimation unit 434 associates the 3D coordinates calculated in Step S108 with the 3D model. Specifically, the estimation unit 434 associates the 3D coordinates with the 3D model by executing annotation processing (Step S109).

After Step S109, the display control unit 435 displays a 3D image of the 3D model on the display unit 45. At this time, the display control unit 435 displays, on the 3D image, a region including a point having the 3D coordinates calculated in Step S108. In this way, the display control unit 435 displays, on the 3D image, a region of the 3D model corresponding to the region of interest (Step S110). A user can confirm the position on the 3D model corresponding to the reference frame that is the region of interest. When Step S110 is executed, the processing shown in FIG. 2 is completed.

A different device from the PC 41 may execute Steps S101 to S103 and the PC 41 may acquire the 3D model from the device. Therefore, Steps S101 to S103 are not necessary.

The estimation unit 434 does not need to execute Step S108 and Step S109. The display control unit 435 may display the camera coordinate of the camera that acquires the reference frame on the 3D image of the 3D model. Since the camera coordinate is displayed on the 3D image, a user can confirm the position of the viewpoint of the reference frame. Therefore, Step S108 and Step S109 are not necessary.

The display control unit 435 may simultaneously display the 3D model and a region corresponding to the region of interest in Step S110. Alternatively, the display control unit 435 may display, on the 3D image, the 3D image of the 3D model before Step S109 is executed, and may display a region corresponding to the region of interest in Step S110.

As described above, the 3D model includes a camera coordinate and posture information of a camera that acquires two or more 2D images for generating the 3D model. Therefore, the 3D model includes a camera coordinate of a first camera, which acquires the selected frame, and posture information of the first camera. The estimation unit 434 may acquire, in Step S107d, the camera coordinate of the first camera from the 3D model as an estimation result of the camera coordinate of a second camera that acquires the reference frame. The estimation unit 434 may acquire the posture information of the first camera from the 3D model as an estimation result of the posture of the second camera in Step S107d. The composition of the selected frame is similar to that of the reference frame. Therefore, the estimation unit 434 may use the camera coordinate of the first camera as an approximate camera coordinate of the second camera. The estimation unit 434 may use the posture information of the first camera as approximate posture information of the second camera.

In the above-described example, the image selection unit 433 selects a 2D image, which is not included in the two or more key frames used for generating the 3D model, as the reference frame. The image selection unit 433 may select one of the two or more key frames as the reference frame. In such a case, the 3D model includes the camera coordinate of the second camera, which acquires the reference frame, and the posture information of the second camera. The estimation unit 434 may acquire the camera coordinate and the posture information from the 3D model.

An example of an image displayed on the display unit 45 will be described. FIGS. 8 to 13 show examples of the display screen of the display unit 45. Hereinafter, for the convenience of description, an example in which the PC 41 selects one reference frame as the region of interest after the display unit 45 displays the 3D image of the 3D model is shown. There are no restrictions on a timing at which the PC 41 displays the 3D image and a timing at which the PC 41 selects the reference frame. Therefore, either display of the 3D image or selection of the reference frame may be performed first.

The examples shown in FIGS. 8 to 13 indicate the minimum configuration in each embodiment of the present invention. Components (a button, a check box, a radio button, or the like) of a user interface other than those shown in FIGS. 8 to 13 may be disposed in the display screen. The same reference signs are attached to the common parts between FIGS. 8 to 13.

Figure 8:
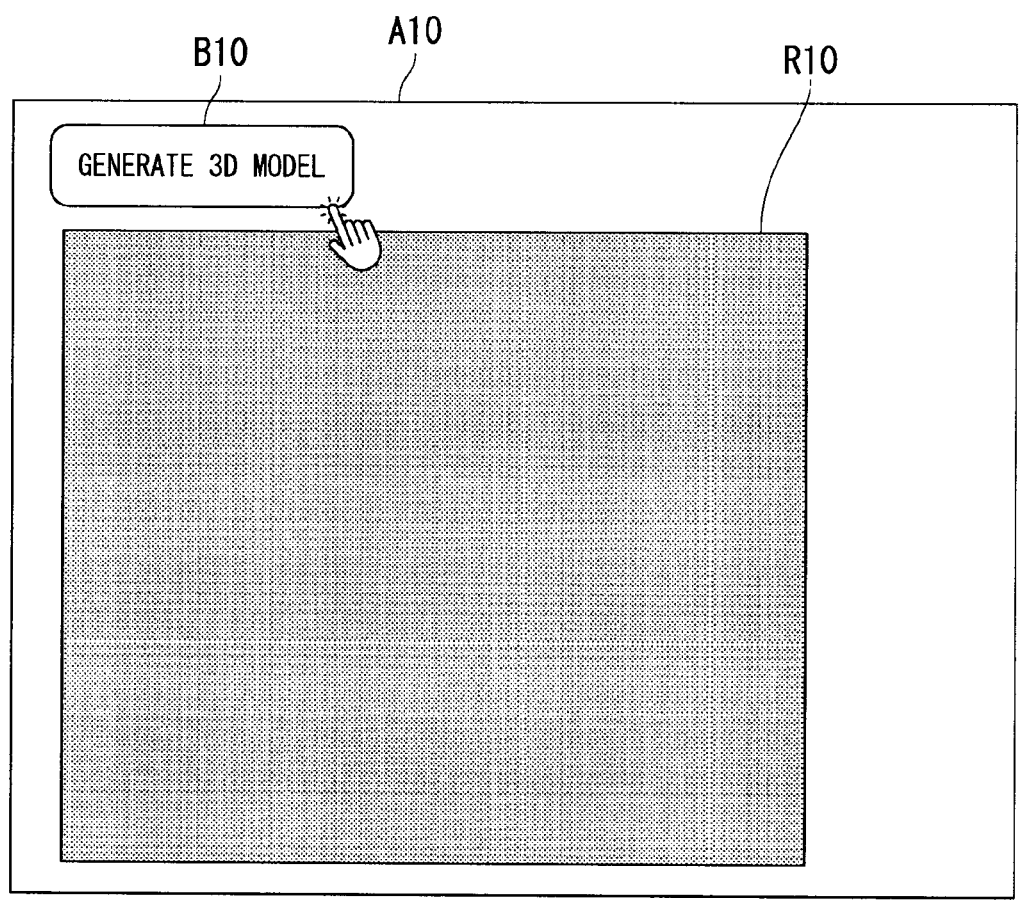
FIG. 8 is a diagram showing an example of a display screen of a display unit included in the PC according to the first embodiment of the present invention.

When the CPU 43 starts the processing shown in FIG. 2, the display control unit 435 displays a dialog box A10 shown in FIG. 8 on the display unit 45. In addition, the display control unit 435 displays a button B10 and a region R10 on the dialog box A10.

The button B10 is a button for inputting an instruction to generate a 3D model. A user can press a button on the display screen through the operation unit 44. In a case in which the display unit 45 is constituted as a touch panel, a user can press a button on the display screen by touching the display screen.

The region R10 is a region for displaying a 3D image of a 3D model. When the CPU 43 starts the processing shown in FIG. 2, the 3D model has not been generated yet. At this time, the 3D image is not displayed in the region R10.

A user inputs an instruction to generate a 3D model by pressing the button B10. At this time, the 3D model generation unit 432 starts the processing in Step S103. The display control unit 435 may display a button for displaying a 3D image of the generated 3D model on the display unit 45.

Figure 9:
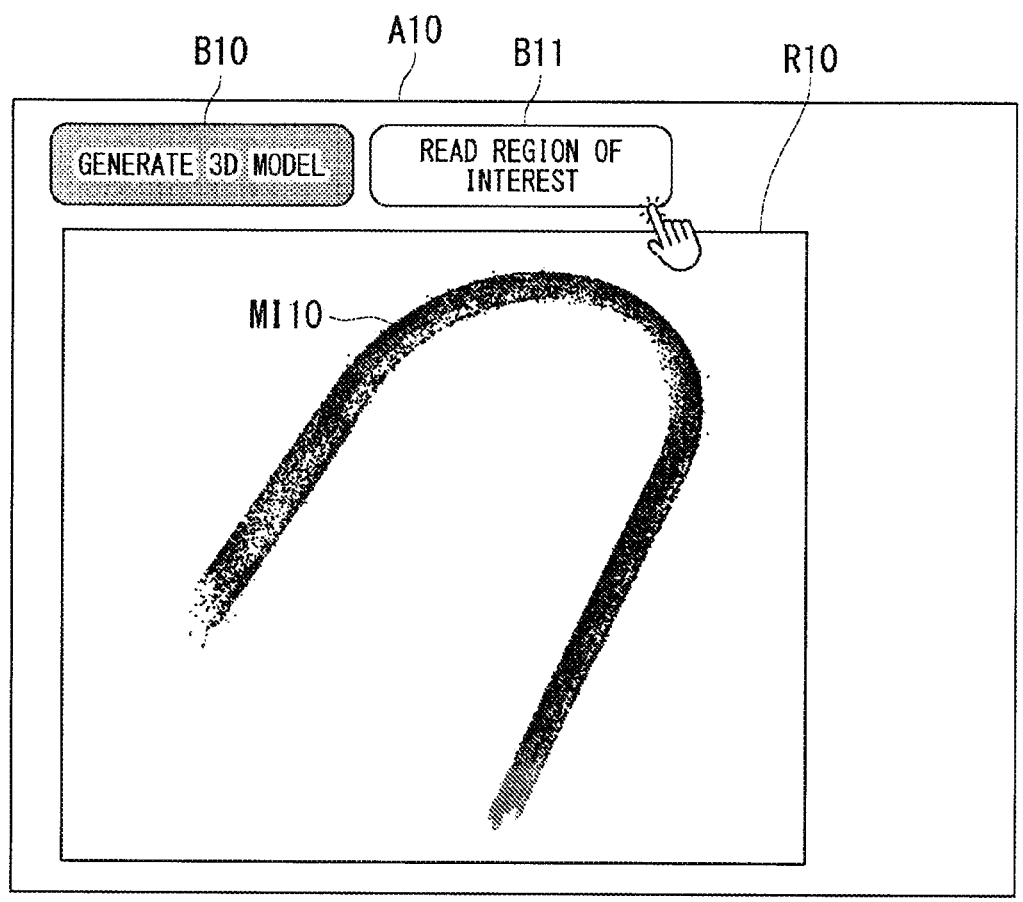
FIG. 9 is a diagram showing an example of the display screen of the display unit included in the PC according to the first embodiment of the present invention.

After the 3D model is generated, the display control unit 435 displays a 3D image M110 of the 3D model in the region R10 in Step S110 (FIG. 9). At this time, the display control unit 435 displays the 3D image M110 of the 3D model seen in a direction set in advance and from a viewpoint set in advance. In addition, the display control unit 435 displays a button B11 on the dialog box A10. The button B11 is a button for inputting an instruction to read the reference frame as the region of interest.

After the 3D model is displayed, a user presses the button B11. At this time, the display control unit 435 displays a dialog box for selecting a still image recorded during an inspection on the display unit 45. A user selects a still image for which the user hopes to learn a position at which the still image is recorded.

Hereinafter, an example in which three still images (reference frames) are selected will be described. For example, identification information (file name) of "img01," "img02," and "img03" is attached to respective three still images. In the first embodiment, the region of interest is the entire region of a still image acquired during an inspection. Processing of reading the region of interest is not limited to processing of reading a still image. In the following example, the ranges seen in three still images do not overlap each other.

The image selection unit 433 reads three still images from the memory 47 and executes Step S106. The estimation unit 434 executes Steps S107 to S109.

Figure 10:
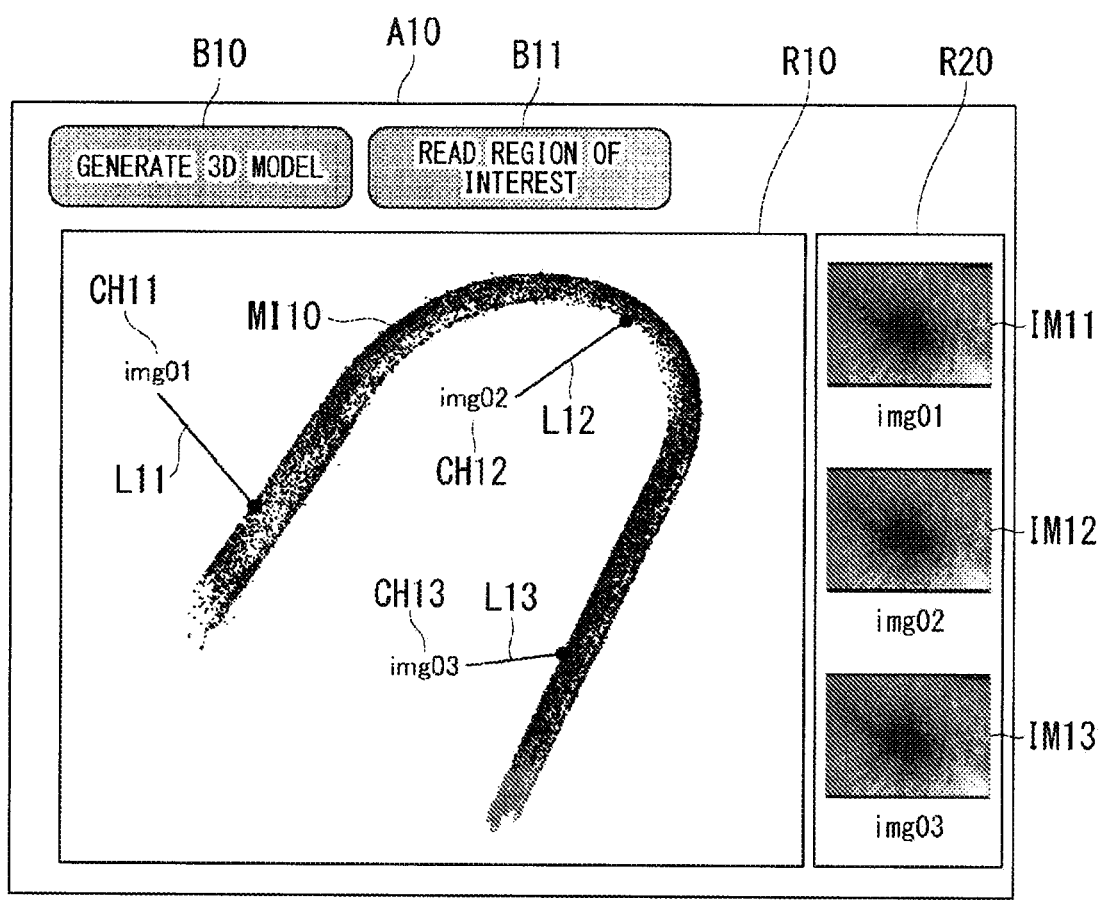
FIG. 10 is a diagram showing an example of the display screen of the display unit included in the PC according to the first embodiment of the present invention.

The display control unit 435 displays information, which indicates positions on the 3D model corresponding to the three still images, on the 3D image M110 in Step S110 (FIG. 10). Specifically, the display control unit 435 displays a character string CH11, a character string CH12, and a character string CH13 on the 3D image M110 and displays a line 11, a line L12, and a line L13 on the 3D image M110.

Each of the character strings indicates a file name of each of the three still images. The character string CH11 indicates a file name img01. The character string CH12 indicates a file name img02. The character string CH13 indicates a file name img03. Each of the lines indicates a position corresponding to each of the still images. The line L11 indicates a position corresponding to the still image having the file name img01. The line L12 indicates a position corresponding to the still image having the file name img02. The line L13 indicates a position corresponding to the still image having the file name img03. Each of the positions corresponds to the 3D coordinates calculated in Step S108 on the basis of the camera coordinate and the posture information of the camera that acquires the reference frame. Since the position on the 3D model corresponding to each of the still images is displayed on the 3D image M110, a user can confirm the position on the 3D model corresponding to the region of interest.

In addition, the display control unit 435 displays a thumbnail image of each of the three still images on the display unit 45 in Step S110. In the example shown in FIG. 10, the display control unit 435 displays a thumbnail image IM11, a thumbnail image IM12, and a thumbnail image IM13 in a region R20 within the dialog box A10.

Each of the thumbnail images corresponds to a still image (reference frame) that is the region of interest. The thumbnail image IM11 corresponds to the still image having the file name img01. The thumbnail image IM12 corresponds to the still image having the file name img02. The thumbnail image IM13 corresponds to the still image having the file name img03. The display control unit 435 does not need to display an image (the thumbnail image IM11, the thumbnail image IM12, and the thumbnail image IM13) of the region of interest on the display unit 45.

In the example shown in FIG. 10, the position on the 3D image M110 is associated with the file name of the still image. The file name does not need to be displayed. The position on the 3D image M110 may be associated with identification information different from a file name. The position on the 3D image M110 may be associated with a text, a color, or the like different from a file name. For example, the display control unit 435 may display the periphery of the thumbnail image IM11 corresponding to the file name img01 in a predetermined color and may display a mark at the position on the 3D image M110 in the color.

Figure 11:
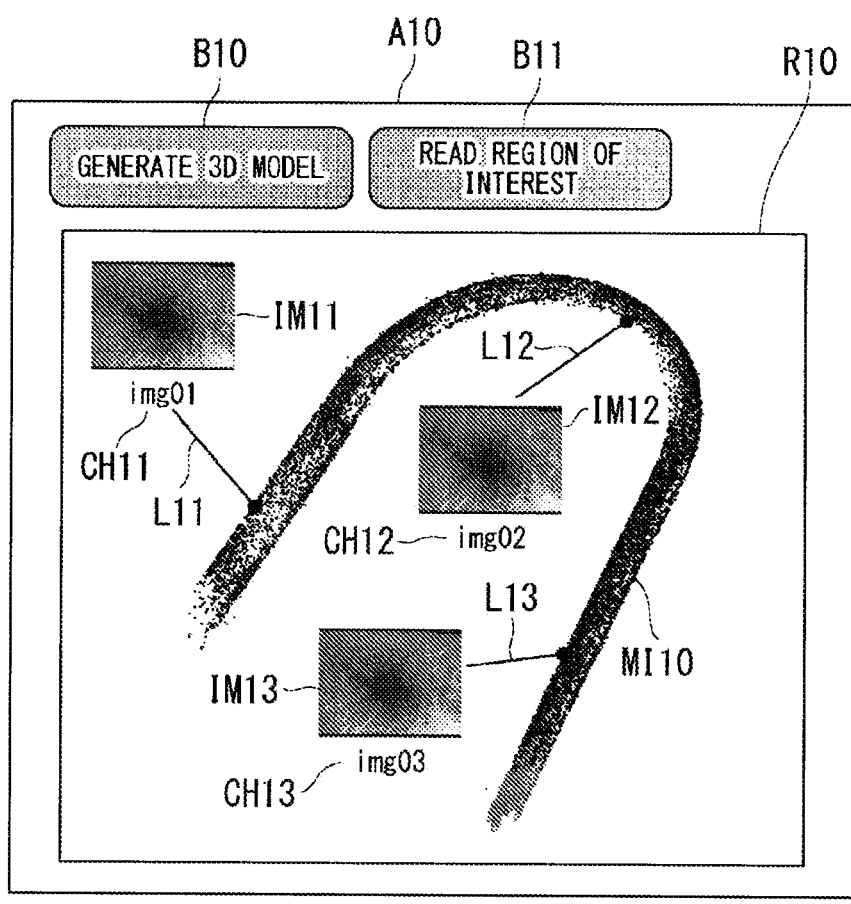
FIG. 11 is a diagram showing an example of the display screen of the display unit included in the PC according to the first embodiment of the present invention.

FIG. 11 shows another example of the display screen of the display unit 45. The same parts as those shown in FIG. 10 will not be described. The display control unit 435 displays the thumbnail image IM11, the thumbnail image IM12, and the thumbnail image IM13 along with the file names on the 3D image M110 of the 3D model in Step S110.

The display control unit 435 may have a function of switching between a state in which a thumbnail image and a file name are displayed and a state in which the thumbnail image and the file name are not displayed. The display control unit 435 does not need to display a still image that has been recorded as a thumbnail image. The display control unit 435 may display an artificially processed still image. For example, the display control unit 435 may execute processing of unifying the brightness of a plurality of images to be displayed into the average brightness of the plurality of images. The display control unit 435 may transform a still image into an image (free viewpoint image) acquired at a virtual viewpoint under the condition of a specific object distance or a specific observation angle. The display control unit 435 may execute this transformation as long as the position at which the still image is recorded does not greatly change. Each embodiment of the present invention is not restricted by the processing performed on a still image when the still image is displayed.

Figure 12:
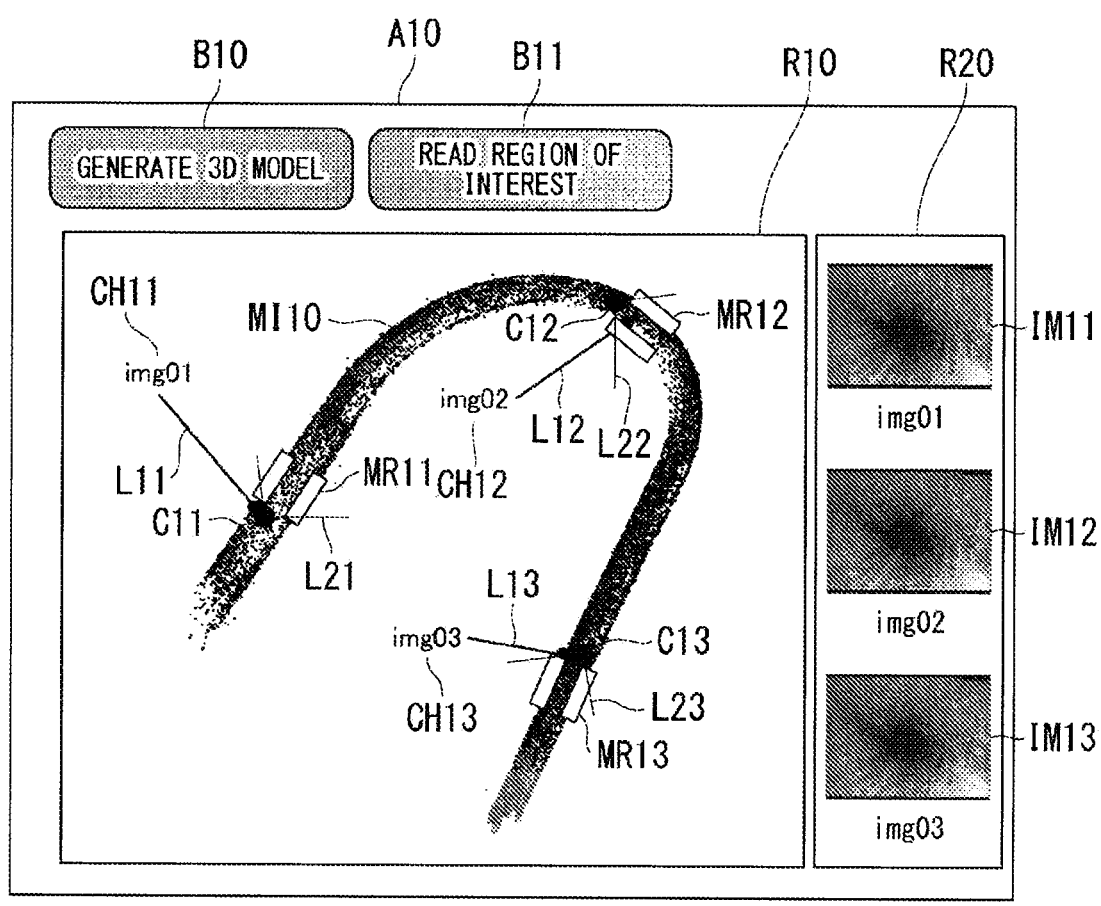
FIG. 12 is a diagram showing an example of the display screen of the display unit included in the PC according to the first embodiment of the present invention.

FIG. 12 shows another example of the display screen of the display unit 45. The same parts as those shown in FIG. 10 will not be described. The display control unit 435 displays information, which indicates a position of a region of the 3D model corresponding to each of the still images, on the 3D image M110 in Step S110. For example, the display control unit 435 displays a region MR11, a region MR12, and a region MR13 on the 3D image M110 of the 3D model. The region MR11 is a region of the 3D model corresponding to the still image having the file name img01. The region MR12 is a region of the 3D model corresponding to the still image having the file name img02. The region MR13 is a region of the 3D model corresponding to the still image having the file name img03. The region MR11, the region MR12, and the region MR13 do not need to accurately indicate the range of a subject seen in the still images.

The display control unit 435 may perform processing (enhancement processing) for enhancing the visibility on an image of each of the region MR11, the region MR12, and the region MR13. For example, the display control unit 435 may display the outline of each of the regions by using a line. The display control unit 435 may display each of the regions in a predetermined color or a predetermined pattern. As long as a user can recognize each of the regions from the other regions of the 3D model, a method of displaying each of the regions is not limited to the above-described methods.

The display control unit 435 displays a camera coordinate of a camera that acquires each of the still images on the 3D image M110 in Step S110. For example, the display control unit 435 displays a mark C11, a mark C12, and a mark C13 shown in FIG. 12. The mark C11 indicates a camera coordinate when the still image having the file name img01 is acquired. The mark C12 indicates a camera coordinate when the still image having the file name img02 is acquired. The mark C13 indicates a camera coordinate when the still image having the file name img03 is acquired.

The display control unit 435 may perform the enhancement processing on an image of each of the mark C11, the mark C12, and the mark C13. For example, the display control unit 435 may display the outline of each of the marks by using a line. The display control unit 435 may display each of the marks in a predetermined color or a predetermined pattern. As long as a user can identify each of the marks, a method of displaying each of the marks is not limited to the above-described methods.

The display control unit 435 displays field-angle information indicating a field angle of each of the still images on the 3D image M110 in Step S110. For example, the display control unit 435 displays a line L21, a line L22, and a line L23 shown in FIG. 12. The line L21 indicates a field angle of the still image having the file name img01. The line L22 indicates a field angle of the still image having the file name img02. The line L23 indicates a field angle of the still image having the file name img03. The field-angle information indicates a boundary between a region included in the imaging view field of the camera that acquires a still image and a region not included in the imaging view field. The display control unit 435 may calculate four lines indicating the field angle on the basis of four points on the 3D model corresponding to the points at the four corners of the range seen in the still image and on the basis of the camera coordinate of the camera that acquires the still image.

The display control unit 435 does not need to display all of the following: the region of the 3D model corresponding to the still image, the camera coordinate, and the field-angle information. The display control unit 435 may display only one of the region of the 3D model and the camera coordinate without displaying the field-angle information. The display control unit 435 may display the region of the 3D model and the field-angle information without displaying the camera coordinate. The display control unit 435 may display the camera coordinate and the field-angle information without displaying the region of the 3D model. The display control unit 435 may display different types of information for respective still images.

After the 3D image M110 is displayed, the display control unit 435 may change the viewpoint of the 3D image M110. For example, a user designates any one of the thumbnail image IM11, the thumbnail image IM12, and the thumbnail image IM13 by operating the operation unit 44. Alternatively, the user designates any one of the mark C11, the mark C12, and the mark C13 by operating the operation unit 44. At this time, the display control unit 435 identifies a still image corresponding to the thumbnail image or the mark designated by the user.

A user can designate each of the thumbnails or each of the marks through the operation unit 44. In a case in which the display unit 45 is constituted as a touch panel, a user can designate each of the thumbnails or each of the marks by touching the display screen of the display unit 45. The display control unit 435 changes the viewpoint of the 3D image M110 on the basis of the camera coordinate of the camera that acquires the identified still image. In addition, the display control unit 435 changes the direction of the visual line to a predetermined direction.

The display control unit 435 may change the viewpoint of the 3D image M110 to a point having the above-described camera coordinate. The display control unit 435 may change the viewpoint of the 3D image M110 to a point having 3D coordinates close to the above-described camera coordinate. The display control unit 435 may magnify, reduce, or rotate the region of the 3D model corresponding to the still image after changing the viewpoint of the 3D image M110. As long as the viewpoint of the 3D image M110 is changed to the camera coordinate or 3D coordinates close to the camera coordinate, a method of changing the viewpoint is not limited to the above-described methods.

An example in which the viewpoint of the 3D image M110 is changed will be described by referring to FIG. 13. The display control unit 435 displays a thumbnail image IM11, a thumbnail image IM12, and a thumbnail image IM13 in a region R20. For example, a user designates the thumbnail image IM12. At this time, the display control unit 435 identifies a still image corresponding to the thumbnail image IM12 and changes the viewpoint of the 3D image M110 shown in FIG. 12 on the basis of the camera coordinate of the camera that acquires the still image. In this way, the display control unit 435 displays a 3D image M120 shown in FIG. 13. For example, the display control unit 435 changes the viewpoint so that the point having the camera coordinate and at least part of the region included in the imaging view field of the camera are displayed. The display control unit 435 may execute processing such as magnification, reduction, rotation, or the like so that the region included in the imaging view field of the camera becomes highly visible.

Figure 13:
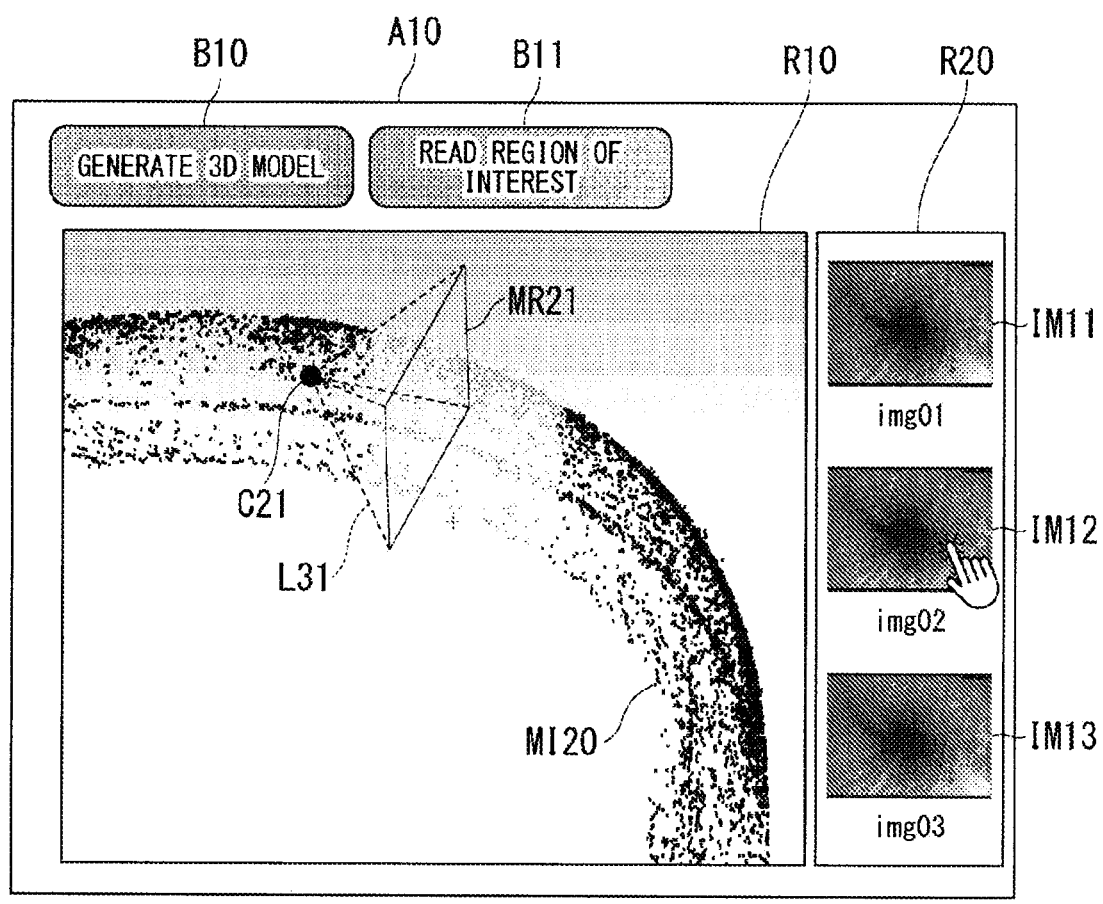
FIG. 13 is a diagram showing an example of the display screen of the display unit included in the PC according to the first embodiment of the present invention.

The display control unit 435 displays a mark C21, a region MR21, and a line L31 shown in FIG. 13. The mark C21 indicates a camera coordinate when the still image corresponding to the thumbnail image IM12 is acquired. The region MR21 indicates a region of the 3D model corresponding to the still image. The line L31 indicates a field angle of the still image.

Figure 14:
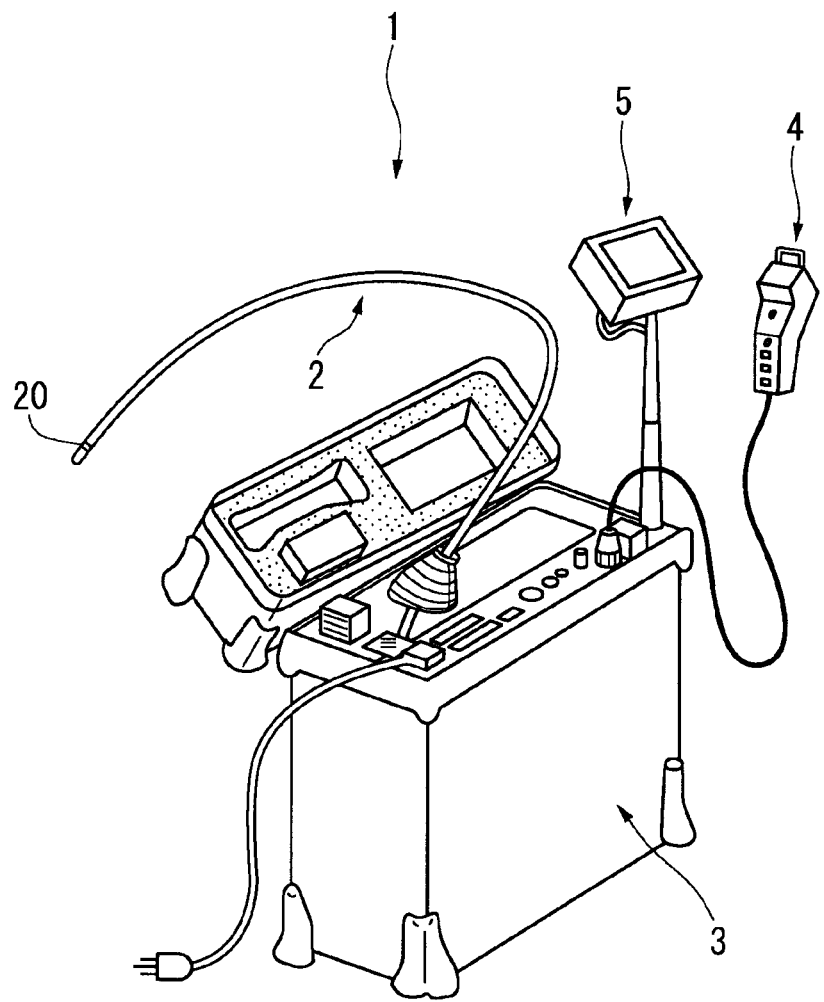
FIG. 14 is a perspective view showing an entire configuration of an endoscope device according to the first embodiment of the present invention.
Figure 15:
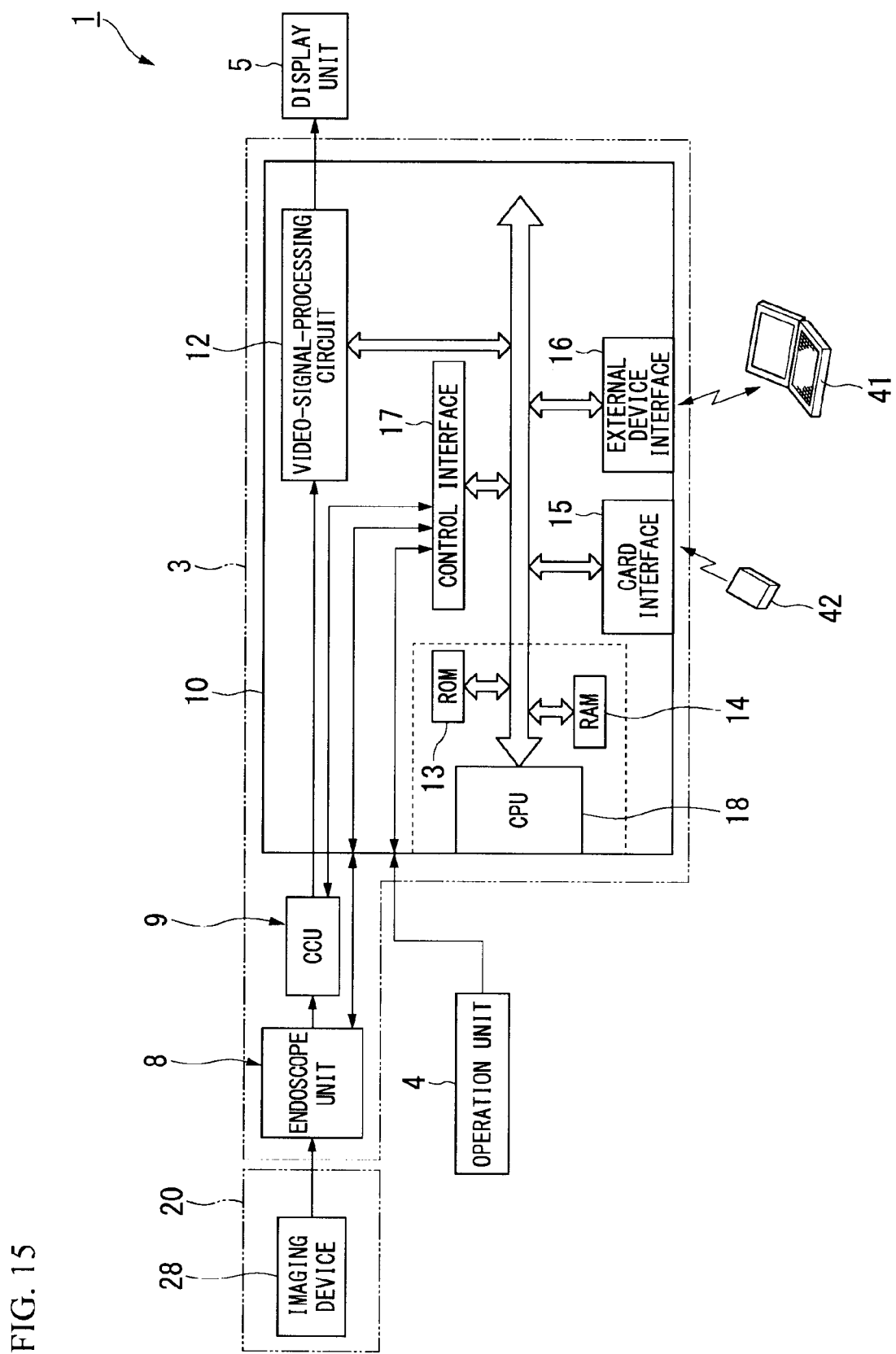
FIG. 15 is a block diagram showing an internal configuration of the endoscope device according to the first embodiment of the present invention.

A configuration of an endoscope device that acquires a still image group will be described by referring to FIG. 14 and FIG. 15. FIG. 14 shows an external appearance of an endoscope device 1. FIG. 15 shows an internal configuration of the endoscope device 1. The endoscope device 1 images a subject and generates an image. A subject is an industrial product. In order to observe various subjects, an inspector can perform replacement of an optical adaptor mounted at a distal end of an insertion unit 2, selection of a built-in video-processing program, and addition of a video-processing program.

The endoscope device 1 shown in FIG. 14 includes the insertion unit 2, a main body unit 3, an operation unit 4, and a display unit 5.

The insertion unit 2 is inserted into the inside of a subject. The insertion unit 2 has a long and thin bendable tube shape from a distal end 20 to a base end portion. The insertion unit 2 images a subject and outputs an imaging signal to the main body unit 3. An optical adapter is mounted on the distal end 20 of the insertion unit 2. For example, a single-eye optical adapter is mounted on the distal end 20 of the insertion unit 2. The main body unit 3 is a control device including a housing unit that houses the insertion unit 2. The operation unit 4 accepts a user's operation for the endoscope device 1. The display unit 5 includes a display screen and displays an image of a subject acquired by the insertion unit 2, an operation menu, and the like on the display screen.

The operation unit 4 is a user interface. The display unit 5 is a monitor (display) such as a liquid crystal display (LCD). The display unit 5 may be a touch panel. In such a case, the operation unit 4 and the display unit 5 are integrated.

The main body unit 3 shown in FIG. 15 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism that is built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. An imaging signal output from the imaging device 28 is input to the CCU 9. The CCU 9 performs pre-processing including amplification, noise elimination, and the like for the imaging signal acquired by the imaging device 28. The CCU 9 converts the imaging signal for which the pre-processing has been executed into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18.

The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. For example, the video-signal-processing circuit 12 combines the video signal output from the CCU 9 and a graphic image signal generated by the CPU 18. The graphic image signal includes an image of the operation screen and the like. The video-signal-processing circuit 12 outputs a combined video signal to the display unit 5.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42, which is a removable recording medium, is connected to the card interface 15. The card interface 15 inputs control-processing information, image information, and the like stored on the memory card 42 into the control device 10. In addition, the card interface 15 records the control-processing information, the image information, and the like generated by the endoscope device 1 on the memory card 42.

An external device such as a USB device is connected to the external device interface 16. For example, the PC 41 shown in FIG. 1 is connected to the external device interface 16. The external device interface 16 transmits information to the PC 41 and receives information from the PC 41. In this way, the display unit 45 of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by the user. The control interface 17 outputs control signals used for controlling the light source device and the bending device to the endoscope unit 8. The control interface 17 outputs a control signal used for controlling the imaging device 28 to the CCU 9.

The imaging device 28 is a camera that acquires a still image group. The still image group includes two or more 2D images. Each of the two or more 2D images is temporally associated with the other 2D images included in the two or more 2D images. For example, in a case in which the still image group is a video, two or more frames included in the video are associated with each other by timestamps (time-codes).

For example, the imaging device 28 is a single-eye camera having a single viewpoint. In this case, each of the two or more 2D images is an image acquired by the single-eye camera.

The imaging device 28 may have two or more viewpoints. For example, the imaging device 28 may acquire a stereo image including both an image of a subject seen from a first viewpoint and an image of the subject seen from a second viewpoint different from the first viewpoint. The endoscope device 1 may project pattern light having a bright part and a dark part onto a subject and the imaging device 28 may acquire two or more images. The PC 41 may generate a 3D model on the basis of a stereo image or an image of a subject onto which the pattern light is projected.

An image display method according to each aspect of the present invention includes a storage step, a first selection step, a second selection step, an estimation step, and a display step. The storage control unit 436 causes the memory 47 (storage medium) to store a 3D model (3D data) generated on the basis of two or more 2D images of a subject in the storage step (Step S104). The 3D model includes 3D coordinates of two or more points of the subject and a first camera coordinate. The first camera coordinate indicates 3D coordinates of a first camera, which acquires each of the two or more 2D images, and is associated with each of the two or more 2D images. The image selection unit 433 selects a reference frame (reference image) that is a 2D image of the subject in the first selection step (Step S105). The image selection unit 433 selects at least one of the two or more 2D images as a selected frame (selected image) on the basis of the reference frame in the second selection step (Step S106). The estimation unit 434 estimates, on the basis of the first camera coordinate associated with the selected frame, a second camera coordinate indicating 3D coordinates of a second camera that acquires the reference frame in the estimation step (Step S107). The display control unit 435 displays the 3D image M110 on the display unit 45 (display) in the display step (Step S110). The 3D image M110 visualizes at least one of the second camera coordinate and a set of 3D coordinates of one or more points of the subject calculated on the basis of the second camera coordinate and visualizes 3D coordinates of one or more of the two or more points of the subject.

For example, the display control unit 435 displays, on the 3D image M110, a position corresponding to at least one of the second camera coordinate and the set of the 3D coordinates calculated on the basis of the second camera coordinate. In the example shown in FIG. 12, the display control unit 435 displays the mark C11 and the like indicating the second camera coordinate. In the examples shown in FIG.

10 and FIG. 12, the display control unit 435 displays the character string CH11, the line 11, and the like indicating the position on the 3D model corresponding to the still image on the 3D image M110. The character string CH11, the line 11, and the like indicate 3D coordinates calculated on the basis of the second camera coordinate. In the example shown in FIG. 12, the display control unit 435 displays the region MR11 and the like of the 3D model corresponding to the still image on the 3D image M110. The region MR11 and the like indicate 3D coordinates calculated on the basis of the second camera coordinate.

Each aspect of the present invention may include the following modified example. The 3D model further includes first posture information indicating a posture of the first camera. The first posture information is associated with each of the two or more 2D images. The estimation unit 434 further estimates a posture of the second camera on the basis of the first posture information associated with the selected frame and generates second posture information indicating the estimated posture in the estimation step (Step S107). The estimation unit 434 further estimates 3D coordinates of one or more points of a region of the subject seen in the reference frame on the basis of the second camera coordinate and the second posture information in the estimation step (Step S108). The 3D image M110 visualizes the 3D coordinates of the one or more points of the region.

For example, the estimation unit 434 calculates 3D coordinates of the entire region seen in the reference frame. The estimation unit 434 may calculate 3D coordinates of part of the region seen in the reference frame. When the 3D model is generated, 3D coordinates of two or more points constituting the 3D model are calculated. The estimation unit 434 calculates 3D coordinates of different points from the two or more points.

For example, the display control unit 435 displays a position corresponding to the 3D coordinates of one or more points of the region seen in the reference frame on the 3D image M110. In the examples shown in FIG. 10 and FIG. 12, the display control unit 435 displays the character string CH11, the line 11, and the like indicating the position on the 3D model corresponding to the still image on the 3D image M110. In the example shown in FIG. 12, the display control unit 435 displays the region MR11 and the like of the 3D model corresponding to the still image on the 3D image M110. The 3D image M110 shown in FIG. 10 and FIG. 12 visualizes the 3D coordinates of the one or more points of the region seen in the reference frame and the 3D coordinates of the two or more points of the subject.

Each aspect of the present invention may include the following modified example. The display control unit 435 further superimposes information indicating the position of the region seen in the reference frame on the 3D image M110 in the display step (Step S110).

Each aspect of the present invention may include the following modified example. The display control unit 435 changes the viewpoint of the 3D image M110 in a viewpoint change step (Step S110) after the 3D image is displayed on the display unit 45.

Each aspect of the present invention may include the following modified example. The display control unit 435 displays field-angle information indicating a field angle of the reference frame on the display unit 45 in the display step (Step S110).

Each aspect of the present invention may include the following modified example. The 3D model further includes 2D coordinates of a first point included in each of the two or more 2D images. The estimation unit 434 estimates the second camera coordinate on the basis of the first camera coordinate, the 2D coordinates of the first point (the point $P11_{KF}$ and the like in FIG. 6) included in one of the two or more 2D images, and 2D coordinates of a second point (the point $P11_d$ and the like in FIG. 6) of the reference frame corresponding to the first point in the estimation step (Step S107).

Each aspect of the present invention may include the following modified example. The image selection unit 433 selects one of one or more selection target images as the reference frame in the first selection step (Step S105). The one or more selection target images are 2D images of the subject and are not included in the two or more 2D images.

Each aspect of the present invention may include the following modified example. The image selection unit 433 selects at least one of the two or more 2D images as the selected frame in the second selection step (Step S106) by using time information that temporally associates the two or more 2D images with each other.

In the first embodiment, the PC 41 displays a 3D image of a subject on the display unit 45. The 3D image visualizes at least one of a camera coordinate of a camera, which acquires a reference frame, and a set of 3D coordinates calculated on the basis of the camera coordinate and visualizes 3D coordinates of one or more of two or more points of the subject. In this way, the PC 41 can visualize a position having 3D coordinates related to at least part of the 2D image (reference frame) of the subject.

A user can confirm the position on the 3D model corresponding to the region of interest. Since the position is displayed on the 3D image, a user can confirm the relative position of the region of interest in the entire inspection target. Therefore, the PC 41 can provide a user with information that is useful in a repair or a next inspection. A user does not need to take notes of an insertion length during an inspection.

The PC 41 highlights the 3D image so that the visibility of the region of interest is enhanced. Alternatively, the PC 41 switches viewpoints for displaying the 3D image. In this way, a user can confirm the shape, the inclination (direction), or the like of a region of the 3D model corresponding to the region of interest in detail.

First Modified Example of First Embodiment

Figure 16:
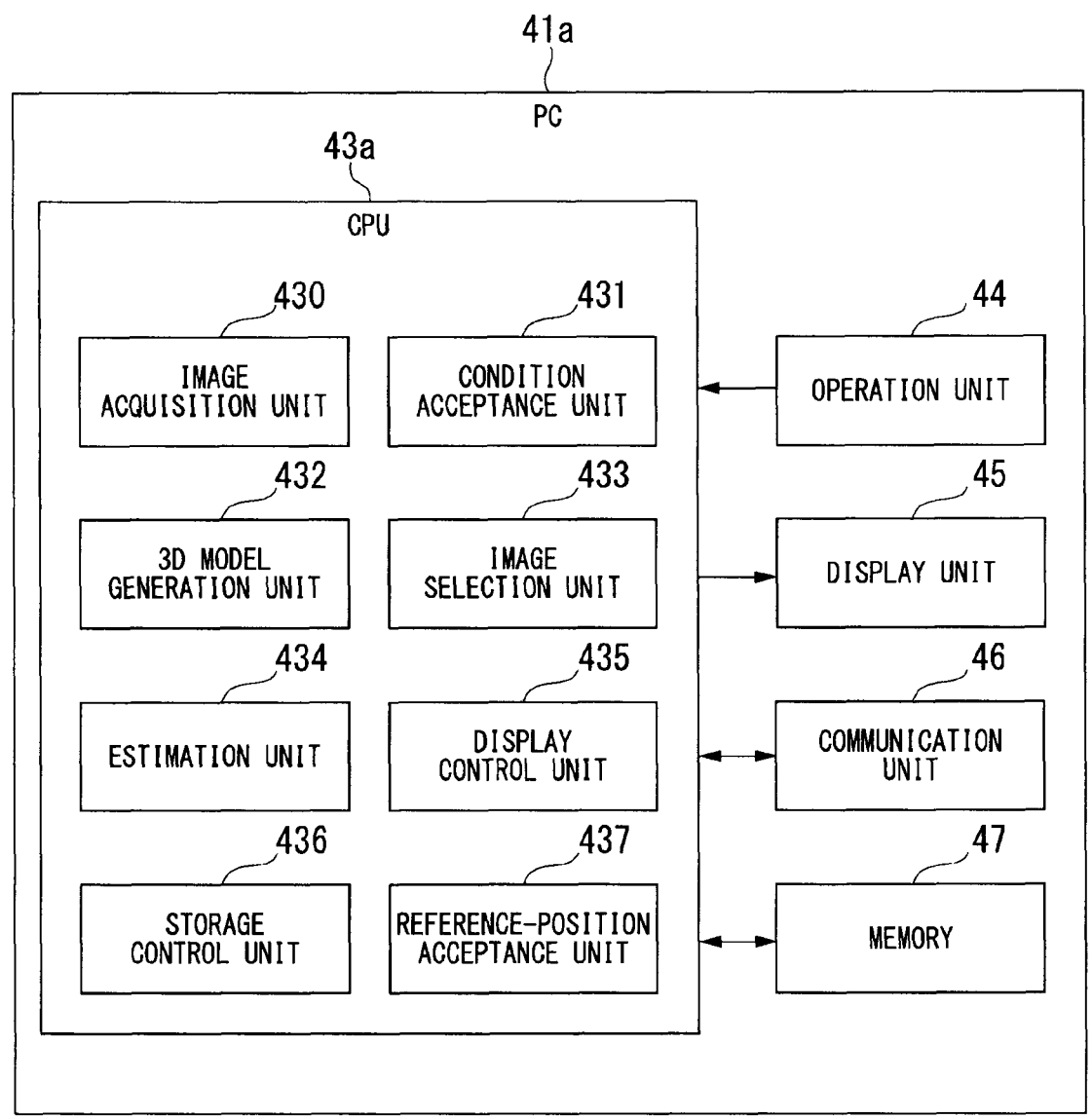
FIG. 16 is a block diagram showing a configuration of a PC according to a first modified example of the first embodiment of the present invention.

A first modified example of the first embodiment of the present invention will be described. The PC 41 shown in FIG. 1 is changed to a PC 41a shown in FIG. 16. FIG. 16 shows a configuration of the PC 41a. The PC 41a displays a position on a 3D model corresponding to a region of interest and displays the three-dimensional distance (3D distance) between the position and the reference point on the 3D model. The same configuration as that shown in FIG. 1 will not be described.

The CPU 43 shown in FIG. 1 is changed to a CPU 43a. The CPU 43a has functional units including an image acquisition unit 430, a condition acceptance unit 431, a 3D model generation unit 432, an image selection unit 433, an estimation unit 434, a display control unit 435, a storage control unit 436, and a reference-position acceptance unit 437. At least one of the blocks in the CPU 43a shown in FIG. 16 may be constituted by a different circuit from the CPU 43a.

Each unit in the CPU 43a may be constituted by at least one of a processor and a logic circuit. Each unit in the CPU

43a may include one or a plurality of processors. Each unit in the CPU 43a may include one or a plurality of logic circuits.

A user inputs a reference position on the 3D model into the PC 41a by operating the operation unit 44. The reference position is not limited to one point on the 3D model. The reference position may be a region including two or more points on the 3D model. The reference-position acceptance unit 437 accepts the reference position on the basis of the information input into the PC 41a by the user. The storage control unit 436 causes the memory 47 to store the reference position accepted by the reference-position acceptance unit 437. The reference-position acceptance unit 437 identifies a reference point on the 3D model corresponding to the reference position. The 3D model includes 3D coordinates of two or more points including the reference point. The reference-position acceptance unit 437 calculates the 3D distance between the reference point and a region of the 3D model corresponding to the region of interest. The display control unit 435 displays the 3D distance calculated by the reference-position acceptance unit 437 on the 3D image of the 3D model.

Figure 17:
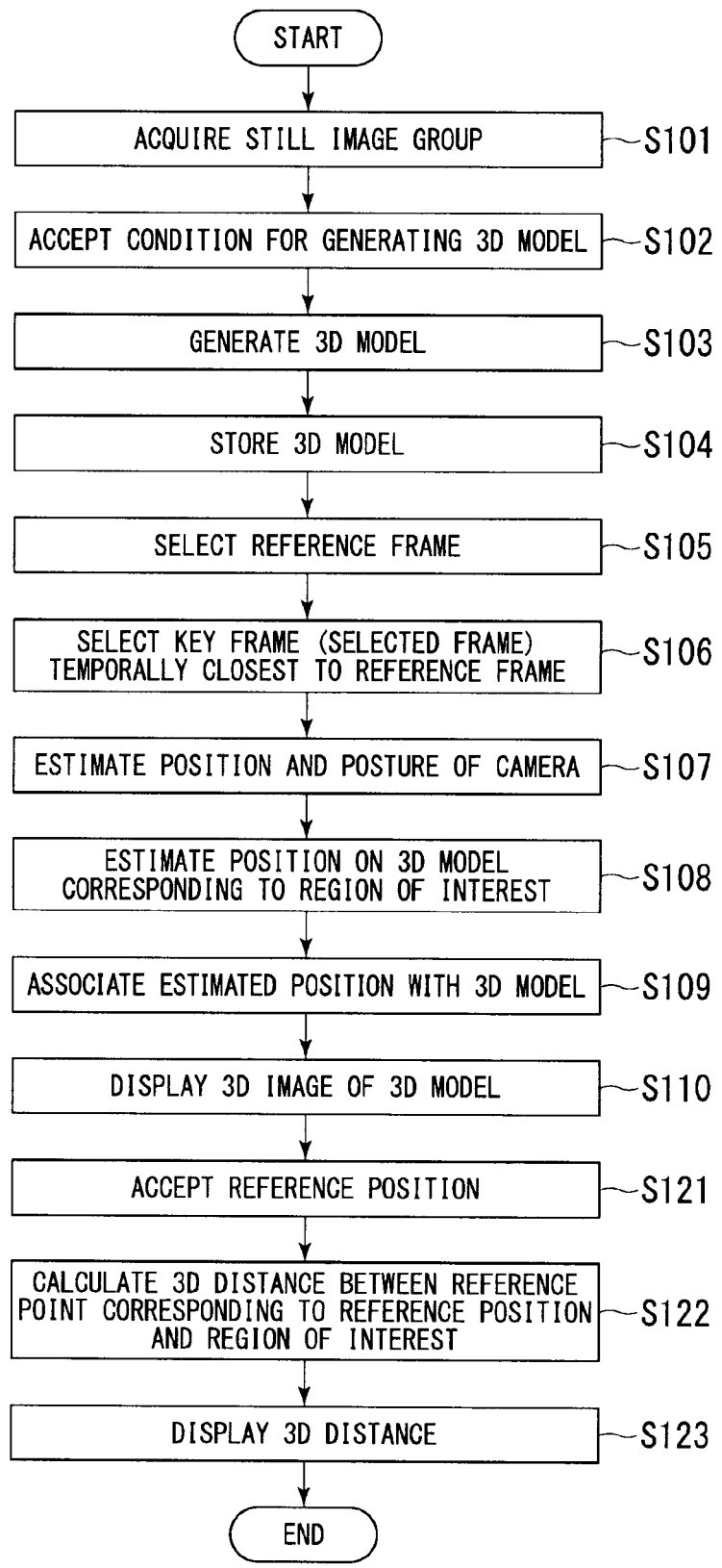
FIG. 17 is a flow chart showing a procedure of processing executed by the PC according to the first modified example of the first embodiment of the present invention.

FIG. 17 shows a procedure of processing executed by the PC 41a. The same processing as that shown in FIG. 2 will not be described.

A user inputs a reference position on the 3D model into the PC 41a by operating the operation unit 44. For example, a user designates an access port as the reference position. The access port is the entrance through which an endoscope is inserted. Alternatively, a user designates a curving portion such as an elbow as the reference position. After Step S110, the reference-position acceptance unit 437 accepts the reference position on the basis of the information input into the PC 41a by the user (Step S121).

After Step S121, the reference-position acceptance unit 437 identifies a reference point on the 3D model corresponding to the reference position. For example, in a case in which a specific region on the 3D model is designated as the reference position, the reference-position acceptance unit 437 identifies one point included in the region as the reference point. The reference-position acceptance unit 437 calculates the 3D distance between the reference point and a region of the 3D model corresponding to the region of interest (Step S122).

Details of Step S122 will be described. For example, the reference-position acceptance unit 437 selects a typical point on the 3D model corresponding to the region of interest and calculates the 3D distance between the reference point and the typical point. In this case, the reference-position acceptance unit 437 calculates the 3D distance between the reference point and one of two or more points within the region of the 3D model. The reference-position acceptance unit 437 may calculate the 3D distance between the reference point and each of two or more points on the 3D model corresponding to the region of interest and may calculate the average of the 3D distance for all the two or more points. In this case, the reference-position acceptance unit 437 calculates the 3D distance between the reference point and an approximate point within the region of the 3D model. The approximate point matches any one of the two or more points on the 3D model or is close to any one of the two or more points.

After Step S122, the display control unit 435 displays the 3D distance calculated in Step S122 on the 3D image of the 3D model (Step S123). When Step S123 is executed, the processing shown in FIG. 17 is completed.

In the above-described example, a user designates the reference position. The PC 41a may automatically set the reference position on the 3D model. For example, information of the reference position designated by a user in advance is stored on the memory 47. The information may indicate a reference position previously input into the PC 41a by a user. The PC 41a sets the reference position to the 3D model on the basis of the information.

Figure 18:
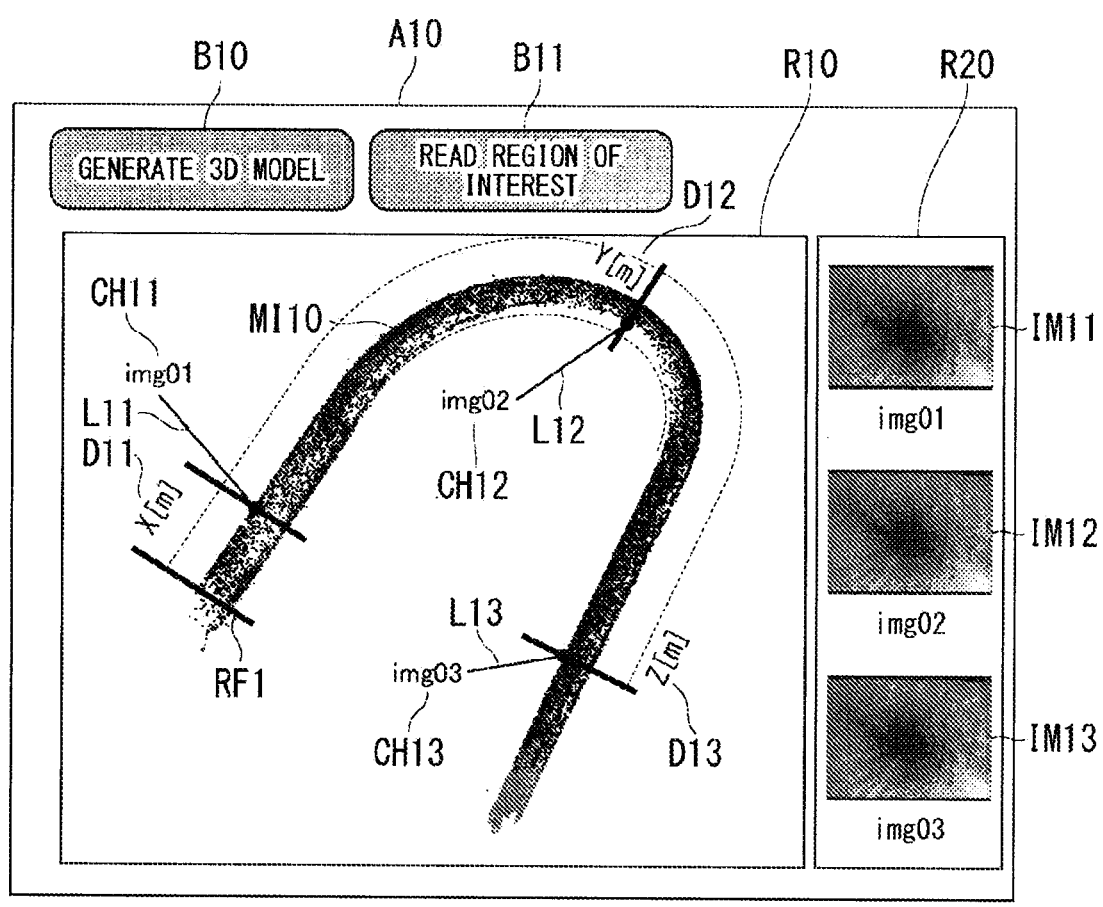
FIG. 18 is a diagram showing an example of a display screen of a display unit included in the PC according to the first modified example of the first embodiment of the present invention.

FIG. 18 shows an example of the display screen of the display unit 45. The same parts as those shown in FIG. 10 will not be described.

The display control unit 435 displays the reference position accepted by the reference-position acceptance unit 437 and the 3D distance calculated by the reference-position acceptance unit 437 on the 3D image M110 in Step S123. In the example shown in FIG. 18, the display control unit 435 displays a reference position RF1 on the 3D image M110 and displays a character string D11, a character string D12, and a character string D13, each of which indicates the 3D distance, on the 3D image M110. The character string D11 indicates the 3D distance between a reference point corresponding to the reference position RF1 and a region corresponding to a still image having a file name img01. The character string D12 indicates the 3D distance between a reference point corresponding to the reference position RF1 and a region corresponding to a still image having a file name img02. The character string D13 indicates the 3D distance between a reference point corresponding to the reference position RF1 and a region corresponding to a still image having a file name img03.

In the example shown in FIG. 18, the 3D image M110 and the 3D distance are displayed in the region R10. The 3D distance may be displayed in a different region from the region R10 in which the 3D image M110 is displayed.

In the above-described example, a reference length is necessary for transforming the length on the 3D model into an actual length. The reference length is not necessary. The reference-position acceptance unit 437 may calculate a 3D distance not having the scale of actual length. For example, the reference-position acceptance unit 437 calculates a first 3D distance between a first reference point and a first point on the 3D model. In addition, the reference-position acceptance unit 437 calculates a second 3D distance between a second reference point and a second point on the 3D model. The reference-position acceptance unit 437 calculates a ratio between the first 3D distance and the second 3D distance. In this case, the 3D distance does not need to have the scale of length. Therefore, the reference length is unnecessary.

In the above-described example, the reference length is set on the basis of an instruction from a user. A user does not need to designate the reference length. For example, in a case in which the portion to which the reference length is set has a characteristic shape, pattern, color, or the like, information of the portion may be stored on the memory 47 in advance. The reference-position acceptance unit 437 may process a 2D image of a subject or a 3D model of the subject and may detect the reference position by using the information. At this time, the reference-position acceptance unit 437 can use a known technique.

Each aspect of the present invention may include the following modified example. The display control unit 435 displays the 3D distance between a reference point included in two or more points of a subject and a region of the subject seen in a reference frame (reference image) on the display unit 45 in a display step (Step S123).

In the first modified example of the first embodiment, the PC 41a displays the 3D distance between the reference point and the region of the 3D model corresponding to the region of interest. A user can confirm how far the position on the 3D model is away from the reference position. For example, the first modified example of the first embodiment is applied to an inspection of pipes.

Second Modified Example of First Embodiment

A second modified example of the first embodiment of the present invention will be described. In the second modified example of the first embodiment, the PC 41 shown in FIG. 1 is used. For example, the second modified example of the first embodiment is applied to an inspection of gas turbines. A gas turbine includes two or more blades that are periodically disposed. The two or more blades are disposed along the periphery direction of the gas turbine. The gas turbine rotates in the periphery direction during an inspection.

A reference blade and a blade of interest are designated during an inspection. The blade of interest is seen in the still image designated by a user. The reference frame is the same as the still image designated by a user. Therefore, the blade of interest is seen in the reference frame. The PC 41, or the endoscope device 1 shown in FIG. 14 or FIG. 15 detects the number of blades from the reference blade to the blade of interest. The PC 41 displays the number.

Figure 19:
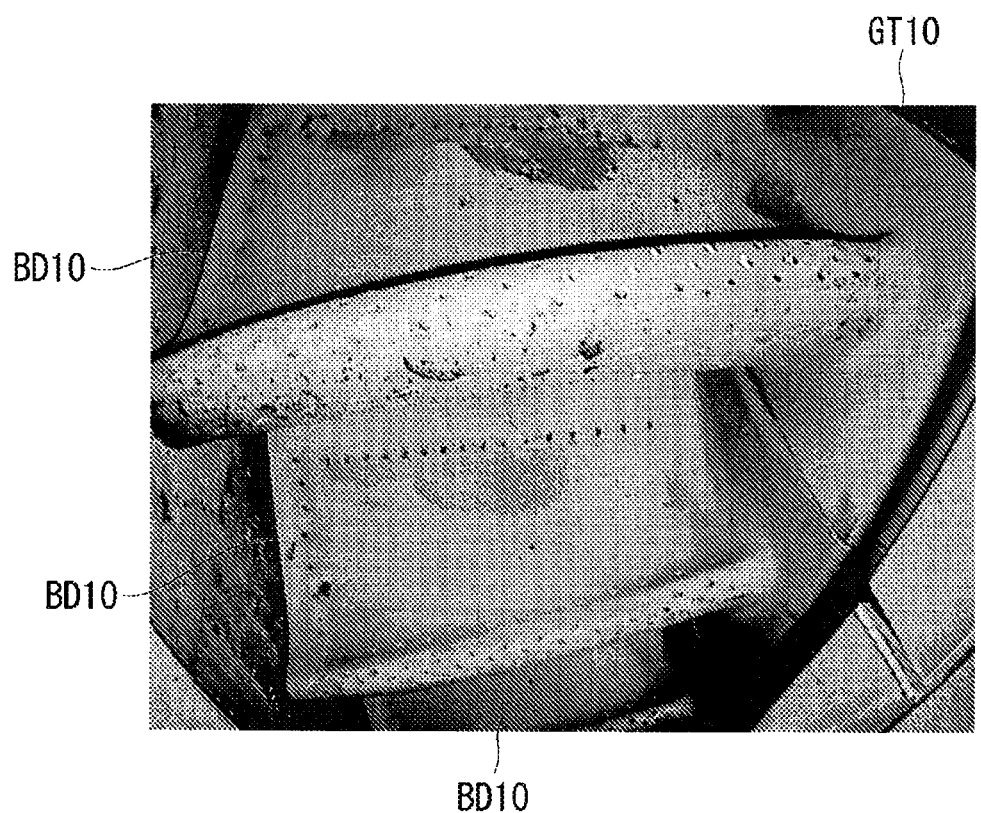
FIG. 19 is a diagram showing an example of a two-dimensional image of a subject in a second modified example of the first embodiment of the present invention.

FIG. 19 shows an example of a 2D image of a gas turbine that is a subject in the second modified example of the first embodiment. In an image GT10 shown in FIG. 19, two or more blades BD10 are seen. For example, the two or more blades BD10 are manufactured so that the two or more blades BD10 have the same shape and the same size. The two or more blades BD10 are disposed at regular intervals.

Hereinafter, two methods of detecting the number of blades will be described. To begin with, a first method for the endoscope device 1 to detect the number of blades will be described. For example, the endoscope device 1 includes a projection optical system that projects laser light and a detection optical system that detects the laser light. For example, the projection optical system includes a laser pointer. The detection optical system includes a laser detector. The laser detector may be the imaging device 28.

The projection optical system projects laser light toward a gas turbine. When a blade is within the imaging view field of the imaging device 28, the laser light is reflected by the blade and enters the detection optical system. Therefore, the laser detector detects the laser light. When a blade is not within the imaging view field of the imaging device 28, the laser light is not reflected by the blade and does not enter the detection optical system. Therefore, the laser detector does not detect the laser light. The laser detector outputs a signal indicating a detection result of the laser light to the CPU 18.

While a gas turbine rotates, the CPU 18 detects a first period in which the laser detector detects the laser light and a second period in which the laser detector does not detect the laser light. The first period and the second period appear in turns. When the CPU 18 detects a combination of a single first period and a single second period, the CPU 18 determines that one blade is detected. The CPU 18 detects the number of blades by counting the number of combinations, each of which includes two types of periods.

For example, a user designates a blade having characteristic damage or the like as a reference blade. The CPU 18 may select a reference blade that meets a predetermined criterion. After the imaging device 28 starts acquisition of the still image group (video), the CPU 18 determines whether or not the reference blade is detected in an image acquired by the imaging device 28. When the reference blade is detected, the CPU 18 starts to detect the number of blades. Each time one blade is detected, the CPU 18 increases the number of blades by one. Next time the reference blade is detected, the CPU 18 completes counting of blades and newly starts to detect the number of blades. The CPU 18 associates information indicating the number of blades with each image acquired by the imaging device 28. For example, the CPU 18 records the information in the header of the video file.

The display control unit 435 acquires, in Step S110 shown in FIG. 2 or FIG. 17, the information associated with the reference frame selected by the image selection unit 433. The information indicates the number of blades from the reference blade to the blade of interest seen in the reference frame.

Next, a second method for the PC 41 to detect the number of blades will be described. When a reference blade is designated in a 3D model of a gas turbine, the display control unit 435 detects each of blades arranged in a predetermined direction along the periphery of the gas turbine. The predetermined direction is the same as the rotation direction of the gas turbine or is opposite to the rotation direction. The display control unit 435 may detect a blade in a 3D model by combining 3D computer-aided design (CAD) data of the gas turbine and the 3D model. The display control unit 435 detects the number of blades from the reference blade to the blade of interest in Step S110 shown in FIG. 2 or FIG. 17.

The display control unit 435 may detect a first number of blades from the reference blade in a predetermined direction and may detect a second number of blades from the reference blade in the opposite direction to the predetermined direction. The display control unit 435 may select the smaller one of the first number and the second number as a final blade number.

The display control unit 435 displays the number of blades detected by using the first method or the second method on the display unit 45. For example, the display control unit 435 displays the number on the 3D image of the 3D model in Step S110 shown in FIG. 2 or FIG. 17.

Each aspect of the present invention may include the following modified example. The subject includes two or more partial regions that are periodically disposed. The display control unit 435 displays the number of at least some of the partial regions from a reference part to a part of interest on the display unit 45 in a display step (Step S110). The reference part is one of the two or more partial regions. The part of interest is different from the reference part and is one of the two or more partial regions. The part of interest corresponds to a region of the subject seen in the reference frame (reference image).

In the above-described example, the subject is a gas turbine and includes two or more blades. The reference part is one of the two or more blades. In the above-described example, the reference part is the reference blade. In the above-described example, the part of interest is the blade of interest seen in the reference frame.

An example of the range in which the number of blades is detected will be described. For example, the range includes the reference blade and the blade of interest and includes all the one or more blades disposed between the reference blade and the blade of interest. The range may include any one of the reference blade and the blade of interest and may include all the one or more blades disposed between the reference blade and the blade of interest. Therefore, the range does not need to include all the reference blade and the blade of interest. The range does not need to include the reference blade and the blade of interest and may include all the one or more blades disposed between the reference blade and the blade of interest. In a case in which the blade of interest is the same as the reference blade, the range includes only the reference blade.

In the second modified example of the first embodiment, the PC 41 displays the number of blades from the reference blade to the blade of interest. The blade of interest is included in the region of interest. A user can confirm how far the blade of interest is away from the reference blade.

Third Modified Example of First Embodiment

A third modified example of the first embodiment of the present invention will be described. In the third modified example of the first embodiment, the PC 41 shown in FIG. 1 is used. In the first embodiment described above, a device such as the endoscope device 1 acquires both a still image group for generating a 3D model of a subject and a still image in which a region of interest is seen in a single inspection. Hereinafter, a still image in which a region of interest is seen is called an image of interest. In the third modified example of the first embodiment, a device such as the endoscope device 1 acquires a still image group and an image of interest in different inspections.

The processing executed by the PC 41 will be described by referring to FIG. 2. The same processing as that in the first embodiment will not be described. The processing in Step S105 shown in FIG. 2 is changed.

In the first embodiment, a timing at which an image of interest is recorded is embedded in the header of the video file. Therefore, the image selection unit 433 can identify the timing at which the image of interest is recorded by reading the header of the video file in the first embodiment.

In the third modified example of the first embodiment, a timing of an inspection for acquiring a still image group (video file) and a timing of an inspection for acquiring an image of interest are different from each other. Therefore, the timing at which the image of interest is recorded is not embedded in the header of the video file. The image selection unit 433 selects an image acquired in similar composition to that of the image of interest from the video file in Step S105. In this way, the image selection unit 433 selects a similar reference frame to the image of interest.

The image selection unit 433 may use a known technique called "similar image search." In this way, the image selection unit 433 can search the video file for an image (frame) acquired in similar composition to that of a specific still image. As a typical example of the similar image search, there is a technique such as bag-of-visual words.

Even when a still image group and an image of interest are acquired in different inspections, the PC 41 can select a reference frame corresponding to the image of interest. Therefore, the PC 41 can visualize a position having 3D coordinates related to at least part of a 2D image (reference frame) of a subject.

Fourth Modified Example of First Embodiment

A fourth modified example of the first embodiment of the present invention will be described. In the fourth modified example of the first embodiment, the PC 41 shown in FIG. 1 is used.

After a 3D model is displayed, the PC 41 accepts a specific region of a still image as a new region of interest from a user. The PC 41 displays a region of the 3D model corresponding to the region of interest on a 3D image of the 3D model. The region of interest is part of the range seen in the reference frame.

Figure 20:
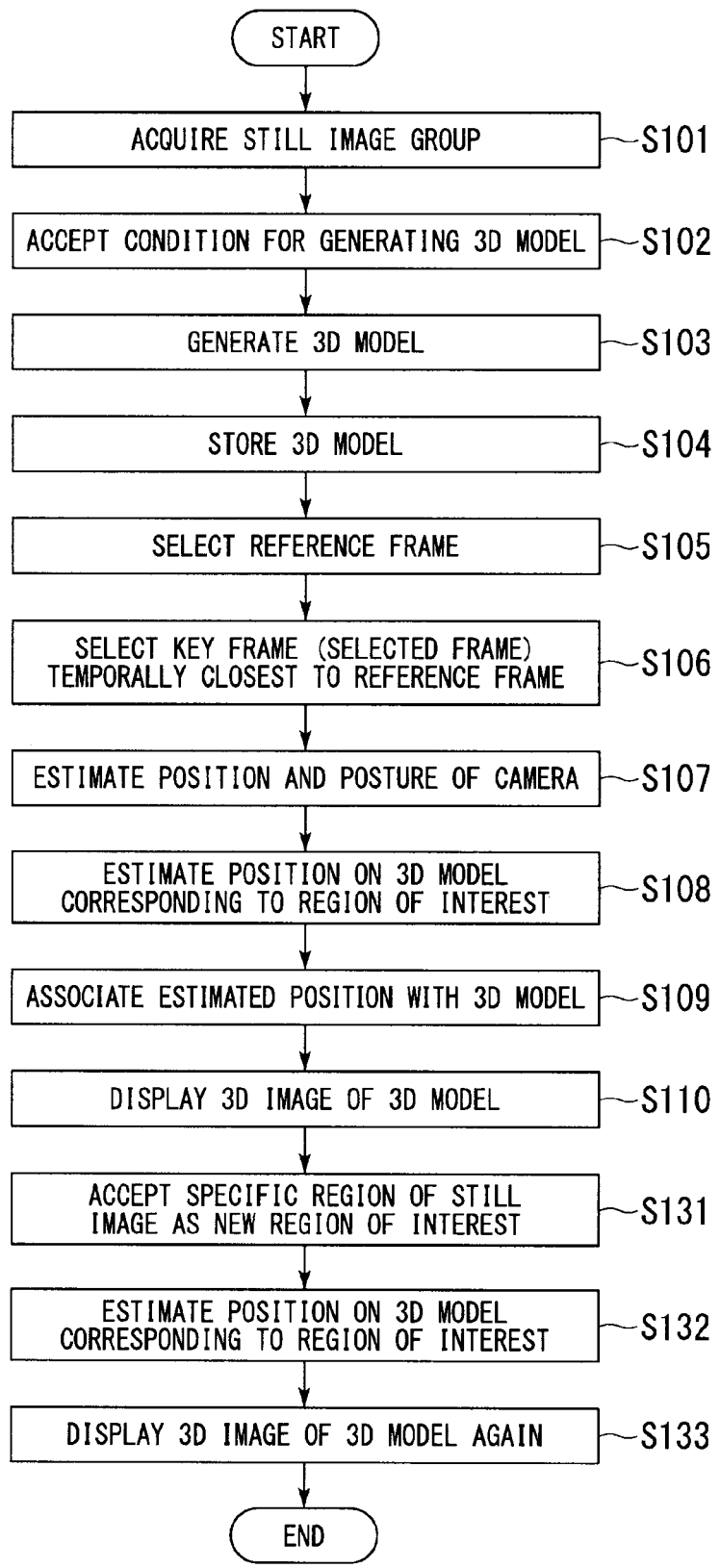
FIG. 20 is a flow chart showing a procedure of processing executed by a PC according to a fourth modified example of the first embodiment of the present invention.

FIG. 20 shows a procedure of processing executed by the PC 41. The same processing as that shown in FIG. 2 will not be described.

After the 3D image of the 3D model is displayed on the display unit 45 in Step S110, a user inputs information indicating a position of a region of interest in a specific still image into the PC 41 by operating the operation unit 44. The still image is the reference frame selected in Step S105. When two or more reference frames are selected in Step S105, a user inputs information indicating a position of a region of interest in one reference frame into the PC 41. The estimation unit 434 accepts the region of interest on the basis of the information input into the PC 41 by the user. The estimation unit 434 may accept two or more regions of interest (Step S131).

After Step S131, the estimation unit 434 calculates 3D coordinates of a region of the 3D model corresponding to the region of interest. In this way, the estimation unit 434 estimates a position on the 3D model corresponding to the region of interest (Step S132).

Details of Step S132 will be described. The estimation unit 434 can execute Step S132 by using a known technique. For example, the estimation unit 434 calculates 3D coordinates of a region of the 3D model corresponding to the region of interest by executing similar processing to Step S103. Since the region of interest is a region of the reference frame, the estimation unit 434 may calculate 3D coordinates of a region of the 3D model corresponding to the region of interest by using the result of Step S108.

The region of interest may be a region of a key frame used for generating the 3D model. When Step S103 is executed, the 2D coordinates of each point of the key frame are associated with the 3D coordinates of each point of the 3D model. Therefore, the estimation unit 434 may calculate, on the basis of the relationship between the 2D coordinates and the 3D coordinates, 3D coordinates of a region of the 3D model corresponding to the region of interest.

After Step S132, the display control unit 435 displays the 3D image of the 3D model including the position estimated in Step S132 on the display unit 45 again. At this time, the display control unit 435 may change the viewpoint of the 3D image so that the position estimated in Step S132 is easily viewed. The display control unit 435 may magnify, reduce, or rotate a region including the position estimated in Step S132 (Step S133). A user can confirm the position on the 3D model corresponding to the region of interest. When Step S133 is executed, the processing shown in FIG. 20 is completed.

Steps S121 to S123 shown in FIG. 17 may be executed in addition to the processing shown in FIG. 20. For example, Steps S121 to S123 may be executed after Step S133 is executed. Steps S121 to S123 may be executed before Step S131 is executed.

The display control unit 435 may display the number of blades of a gas turbine in Step S110 or Step S133 by using the method shown in the second modified example of the first embodiment.

Figure 21:
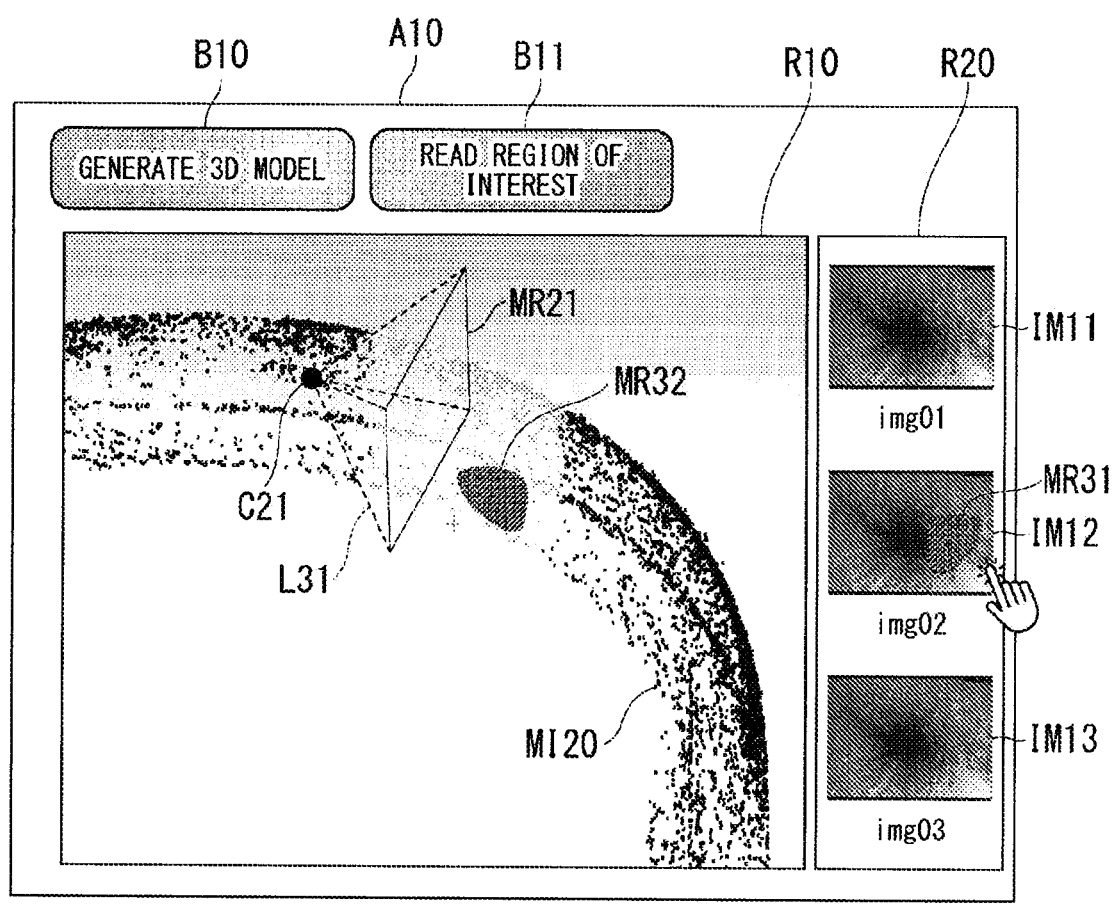
FIG. 21 is a diagram showing an example of a display screen of a display unit included in the PC according to the fourth modified example of the first embodiment of the present invention.

FIG. 21 shows an example of the display screen of the display unit 45. The same parts as those shown in FIG. 13 will not be described.

The display control unit 435 displays a thumbnail image IM11, a thumbnail image IM12, and a thumbnail image IM13 in a region R20. For example, a user designates part of the thumbnail image IM12. At this time, the estimation unit 434 accepts part of the thumbnail image IM12 as a region MR31 of interest in Step S131. The display control unit 435 may display the region MR31 of interest on the thumbnail image IM12. The estimation unit 434 estimates a position on the 3D model corresponding to the region MR31 of interest in Step S132. The display control unit 435 displays, on the 3D image M120 of the 3D model, information indicating a position of a region of the 3D model corresponding to the region MR31 of interest in Step S133. For example, the display control unit 435 displays a region MR32 on the 3D image M120.

The display control unit 435 may perform processing (enhancement processing) for enhancing the visibility on an image of the region MR32. For example, the display control unit 435 may display the outline of the region MR32 by using a line. The display control unit 435 may display the region MR32 in a predetermined color or a predetermined pattern. As long as a user can recognize the region MR32 from the other regions of the 3D model, a method of displaying the region MR32 is not limited to the above-described methods.

In the fourth modified example of the first embodiment, the PC 41 displays a region of the 3D model corresponding to a specific region of a still image on the 3D image of the 3D model. A user can confirm the position on the 3D model corresponding to the specific region.

A user can designate an abnormal portion or the like seen in a still image as a region of interest. A user can confirm the position and the inclination (direction) of a region of the 3D model corresponding to the region of interest in detail.

Fifth Modified Example of First Embodiment

A fifth modified example of the first embodiment of the present invention will be described. In the fifth modified example of the first embodiment, the PC 41 shown in FIG. 1 is used. Two or more reference frames are used. The ranges seen in the two or more reference frames overlap each other. The PC 41 displays regions that overlap each other between the two or more reference frames.

The image selection unit 433 selects two or more reference frames from the still image group. The image selection unit 433 selects a selected frame from the still image group on the basis of each of the reference frames. Accordingly, the image selection unit 433 selects two or more selected frames.

The estimation unit 434 estimates a camera coordinate of a camera that acquires each of the reference frames. In addition, the estimation unit 434 estimates a posture of the camera, which acquires each of the reference frames, and generates posture information indicating the estimated posture. Furthermore, the estimation unit 434 estimates 3D coordinates of a region of a subject seen in each of the reference frames.

The display control unit 435 displays a 3D image of a 3D model on the display unit 45. The display control unit 435 displays, on the 3D image, a position corresponding to at least one of the camera coordinate of the camera, which acquires each of the reference frames, and a region of the 3D model corresponding to a region of interest. The display control unit 435 displays information indicating a position of a region (overlapping region) shared by the two or more reference frames on the display unit 45. The display control unit 435 displays a region of the overlapping region in which the shape of the subject greatly changes on the display unit 45.

Hereinafter, an example in which a user designates two still images as a region of interest will be described. The two still images are a first still image and a second still image. The ranges seen in the two still images overlap each other. The first still image is a still image acquired in a previously performed inspection (for example, an inspection performed one year ago) and is not included in the still image group that is a processing target. The second still image is a still image acquired in the latest inspection and is included in the still image group that is the processing target. Even when three or more still images are regions of interest, the PC 41 can use a similar method to that described below.

Figure 22:
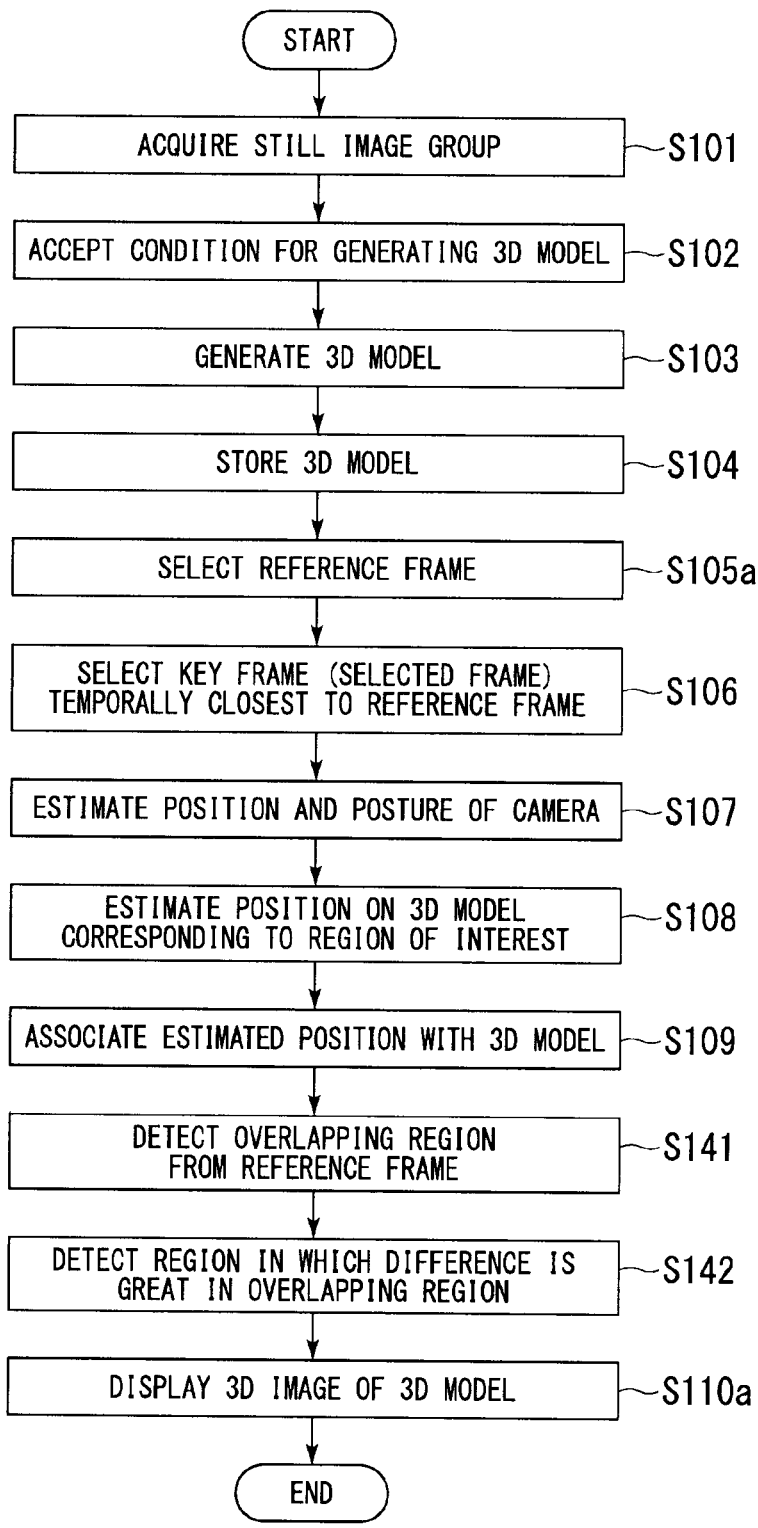
FIG. 22 is a flow chart showing a procedure of processing executed by a PC according to a fifth modified example of the first embodiment of the present invention.

FIG. 22 shows a procedure of processing executed by the PC 41. The same processing as that shown in FIG. 2 will not be described.

Step S105 shown in FIG. 2 is changed to Step S105*a*. A user inputs information indicating two still images into the PC 41 by operating the operation unit 44. The image selection unit 433 accepts the two still images on the basis of the information input into the PC 41 by the user. The image selection unit 433 selects two reference frames from the still image group on the basis of the two still images. The two reference frames are a first reference frame and a second reference frame. The image selection unit 433 reads the two reference frames from the memory 47 (Step S105*a*).

Details of Step S105*a* will be described. The image selection unit 433 selects the first reference frame on the basis of the first still image. The method of selecting the first reference frame is the same as that in the third modified example of the first embodiment. The image selection unit 433 selects a still image acquired in similar composition to that of the first still image from the still image group, thus selecting the similar first reference frame to the first still image.

A timing at which the first still image is acquired is greatly different from a timing at which each still image included in the still image group is acquired. There is a possibility that an abnormality occurred between a previous inspection and the latest inspection. Therefore, there is a case in which no abnormality is seen in the first still image and an abnormality is seen in the first reference frame. In order to correctly select the similar first reference frame to the first still image, an abnormal region may be excluded from each still image of the still image group.

A user may input information indicating an abnormal region into the PC 41 by operating the operation unit 44, and the image selection unit 433 may accept the region. The PC 41 may detect an abnormal region from a still image by using machine learning or the like. The image selection unit 433 may exclude the abnormal region from the range seen in each still image of the still image group and may select the first reference frame. A method of excluding an abnormal region is not limited to the above-described methods.

The image selection unit 433 selects the second reference frame on the basis of the second still image. A method of selecting the second reference frame is the same as that in the first embodiment. For example, a timing at which the second still image is recorded is embedded in the header of the video file. The image selection unit 433 identifies the timing at which the second still image is recorded by reading the header of the video file. The image selection unit 433 reads a still image recorded at the identified timing as the second reference frame from the memory 47. The second reference frame is the same as the second still image.

In a case in which the ranges seen in the two still images designated by a user overlap each other, the image selection unit 433 may select two reference frames by using the following method. First, the image selection unit 433 selects the second reference frame by using the above-described method. The image selection unit 433 selects one or more still images temporally close to the second reference frame in the still image group as a processing target. The image selection unit 433 selects a similar still image to the first still image from the processing target. The selected still image is the first reference frame. In this way, the frequency of selecting a wrong frame as the first reference frame is reduced, and a processing time for selecting the first reference frame is shortened.

The image selection unit 433 selects two selected frames on the basis of the two reference frames in Step S106. The two selected frames are a first selected frame and a second selected frame. A method of selecting each of the selected frames is the same as that in the first embodiment.

The estimation unit 434 estimates a position and a posture of the camera that acquires the first reference frame on the basis of the first reference frame, the first selected frame, and the 3D model in Step S107. In addition, the estimation unit 434 estimates a position and a posture of the camera that acquires the second reference frame on the basis of the second reference frame, the second selected frame, and the 3D model in Step S107. A method of estimating a position and a posture of the camera is the same as that in the first embodiment.

The estimation unit 434 calculates 3D coordinates of a region of the 3D model corresponding to the first reference frame in Step S108. In addition, the estimation unit 434 calculates 3D coordinates of a region of the 3D model corresponding to the second reference frame in Step S108. In this way, the estimation unit 434 estimates a position on the 3D model corresponding to each of the first still image and the second still image. A method of estimating a position on the 3D model is the same as that in the first embodiment.

After Step S109, the display control unit 435 detects a region (overlapping region) shared by the first reference frame and the second reference frame. The region is seen in the first reference frame and the second reference frame. The display control unit 435 may detect an overlapping region on the basis of only two-dimensional information of the two reference frames. Since the region of the 3D model corresponding to each of the reference frames is identified in Step S108, the display control unit 435 may detect an overlapping region by using three-dimensional information of the region (Step S141).

After Step S141, the display control unit 435 calculates the amount of change of the shape of the subject in the overlapping region and detects a region in which the amount of change is greater than or equal to a predetermined amount. In this way, the display control unit 435 detects a region in which the shape of the subject greatly changes. The display control unit 435 may detect the region on the basis of only two-dimensional information of the two reference frames. For example, the display control unit 435 may calculate the difference between values of two pixels adjacent to each other and may detect a region in which the difference exceeds a predetermined value. Alternatively, the display control unit 435 may detect a region in which the color of the image is greatly different from that of its surrounding region. The display control unit 435 may detect a region in which the shape of the subject greatly changes by using three-dimensional information of the overlapping region. For example, the display control unit 435 may detect a region in which the height or the depth with respect to the surrounding region in the 3D shape of the subject exceeds a predetermined value (Step S142).

Step S110 shown in FIG. 2 is changed to Step S110a. After Step S142, the display control unit 435 displays a 3D image of the 3D model on the display unit 45. At this time, the display control unit 435 displays a region including a point having the 3D coordinates calculated in Step S108 on the 3D image. In this way, the display control unit 435 displays a region of the 3D model corresponding to each of the first still image and the second still image on the 3D image. In addition, the display control unit 435 displays the overlapping region detected in Step S141 and the region detected in Step S142 on the display unit 45 (Step S110a). When Step S110a is executed, the processing shown in FIG. 22 is completed.

The order of processing executed by the PC 41 is not limited to that shown in FIG. 22. For example, the display control unit 435 may detect an overlapping region at any timing between a timing at which the reference frame is selected and a timing at which the 3D image is displayed. Accordingly, Step S141 may be executed at any timing between Step S105a and Step S110a. The display control unit 435 may detect a region in which the shape of the subject greatly changes at any timing between the timing at which the reference frame is selected and the timing at which the 3D image is displayed. Accordingly, Step S142 may be executed at any timing between Step S105a and Step S110a.

The display control unit 435 does not need to execute Step S141 and does not need to display the overlapping region in Step S110a. Therefore, Step S141 is not necessary.

The display control unit 435 does not need to execute Step S142 and does not need to display the region in which the shape of the subject greatly changes in Step S110a. Therefore, Step S142 is not necessary.

Steps S121 to S123 shown in FIG. 17 may be executed in addition to the processing shown in FIG. 22. For example, Steps S121 to S123 may be executed after Step S110a is executed. Step S110 and Steps S121 to S123 shown in FIG. 17 may be executed before Step S141 is executed.

Steps S131 to S133 shown in FIG. 20 may be executed in addition to the processing shown in FIG. 22. For example, Steps S131 to S133 may be executed after Step S110a is executed. Step S110 and Steps S131 to S133 shown in FIG. 20 may be executed before Step S141 is executed.

The display control unit 435 may display the number of blades of a gas turbine in Step S110a by using the method shown in the second modified example of the first embodiment.

Figure 23:
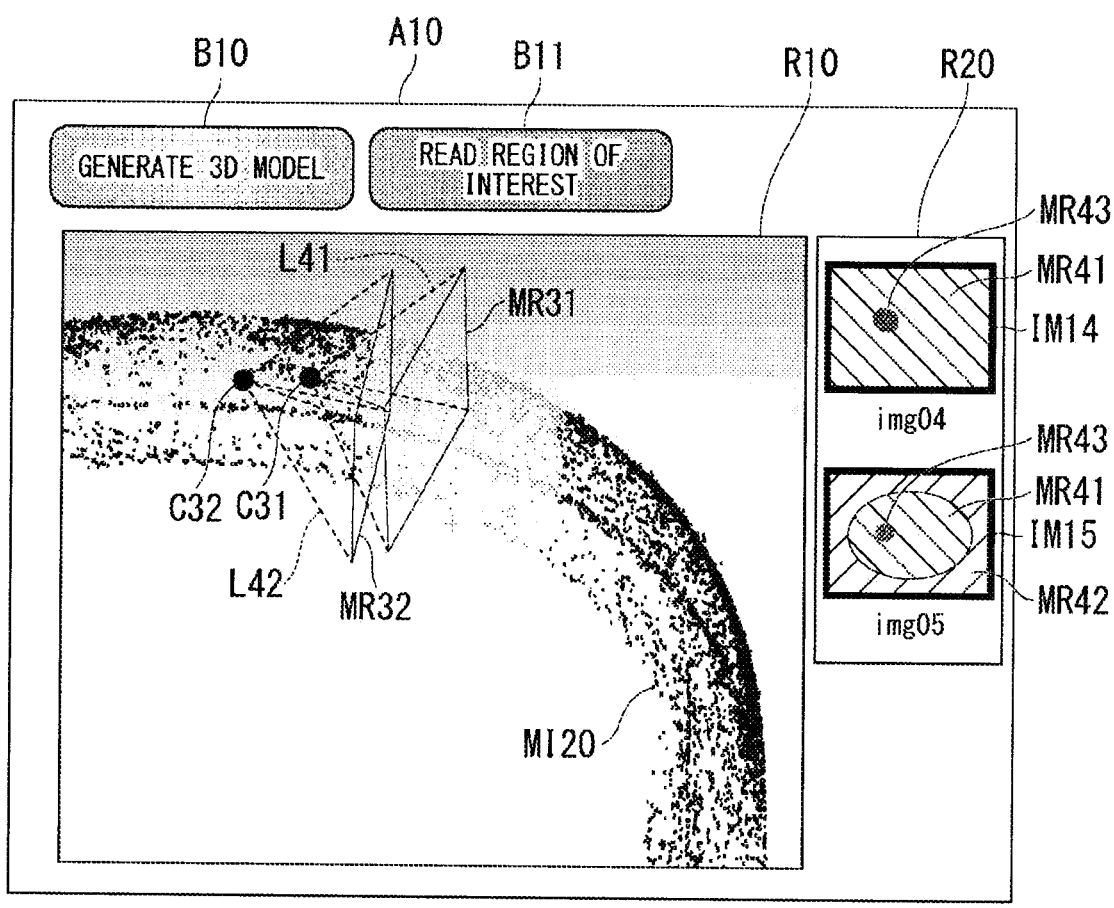
FIG. 23 is a diagram showing an example of a display screen of a display unit included in the PC according to the fifth modified example of the first embodiment of the present invention.

FIG. 23 shows an example of the display screen of the display unit 45. The same parts as those shown in FIG. 13 will not be described.

The display control unit 435 displays a thumbnail image of each of the first still image and the second still image on the display unit 45 in Step S110a. In the example shown in FIG. 23, the display control unit 435 displays a thumbnail image IM14 and a thumbnail image IM15 in a region R20. The thumbnail image IM14 corresponds to a thumbnail image of a still image having a file name img04. The thumbnail image IM15 corresponds to a thumbnail image of a still image having a file name img05.

The display control unit 435 displays a region MR31 of interest and a region MR32 of the 3D model on a 3D image M120 of the 3D model in Step S110a. The region MR31 of interest is a region of the 3D model corresponding to the still image having the file name img04. The region MR32 is a region of the 3D model corresponding to the still image having the file name img05.

The display control unit 435 displays a mark C31 and a mark C32 on the 3D image M120 in Step S110a. The mark C31 indicates a camera coordinate when the still image having the file name img04 is acquired. The mark C32 indicates a camera coordinate when the still image having the file name img05 is acquired.

The display control unit 435 displays a line L41 and a line L42 in Step S110a. The line L41 indicates a field angle of the still image having the file name img04. The line L42 indicates a field angle of the still image having the file name img05.

The display control unit 435 detects a region (overlapping region) shared by the two reference frames in Step S141. The display control unit 435 displays information indicating the position of the overlapping region on the display unit 45 in Step S110a. For example, the display control unit 435 displays a region MR41 on the thumbnail image IM14 and the thumbnail image IM15 and displays a region MR42 on the thumbnail image IM15. The region MR41 is an overlapping region. The region MR42 is a region that is not shared by the two reference frames. In the example shown in FIG. 23, the imaging view field of the camera that acquires the still image having the file name img05 includes the imaging view field of the camera that acquires the still image having the file name img04. The thumbnail image IM14 is an image of only the region MR41. The thumbnail image IM15 is an image of the region MR41 and the region MR42.

The still image designated by a user is the same as or similar to the reference frame. Therefore, it is highly likely that almost the entire region shared by the two reference frames is included in two still images. In the example shown in FIG. 23, the display control unit 435 detects the same region in the still image designated by a user as the overlapping region of the reference frame. The display control unit 435 displays the detected region on the thumbnail image.

In a case in which the still image designated by a user and the reference frame are different from each other, the display control unit 435 may display the reference frame on the display unit 45. The display control unit 435 may display the overlapping region on the reference frame.

The display control unit 435 detects the region in which the shape of the subject greatly changes in Step S142. The display control unit 435 displays a region MR43 on the thumbnail image IM14 and the thumbnail image IM15 in Step S110a. The shape of the subject greatly changes in the region MR43. The region MR43 is included in the region MR41. In a case in which the still image designated by a user and the reference frame are different from each other, the display control unit 435 may display the region in which the shape of the subject greatly changes on the reference frame.

In the example shown in FIG. 23, the display control unit 435 displays the overlapping region on the thumbnail image corresponding to each still image. The display control unit 435 may display the overlapping region on the 3D image M120.

In the example shown in FIG. 23, the display control unit 435 displays the region in which the shape of the subject greatly changes on the thumbnail image corresponding to each still image. The display control unit 435 may display the region on the 3D image M120.

The display control unit 435 may perform processing (enhancement processing) for enhancing the visibility on an image of each of the region MR41, the region MR42, and the region MR43. For example, the display control unit 435 may display the outline of each of the regions by using a line. The display control unit 435 may display each of the regions in a predetermined color or a predetermined pattern. As long as a user can recognize each of the regions from the other regions of the still image or the regions of the 3D model, a method of displaying each of the regions is not limited to the above-described methods.

Each aspect of the present invention may include the following modified example. The image selection unit 433 selects two or more reference frames (reference images) in the first selection step (Step S105a). The display control unit 435 displays information indicating the position of the region shared by the two or more reference frames on the display unit 45 in the display step (Step S110a).

In the fifth modified example of the first embodiment, the PC 41 displays the information indicating the position of the region (overlapping region) shared by the two or more reference frames on the display unit 45. A user can analyze and manage the relationship between two or more still images acquired at timings that are greatly different from each other.

The PC 41 displays the region in which the shape of the subject greatly changes in the overlapping region on the display unit 45. A user can analyze and manage the time-series change of the shape of the subject.

Sixth Modified Example of First Embodiment

Figure 24:
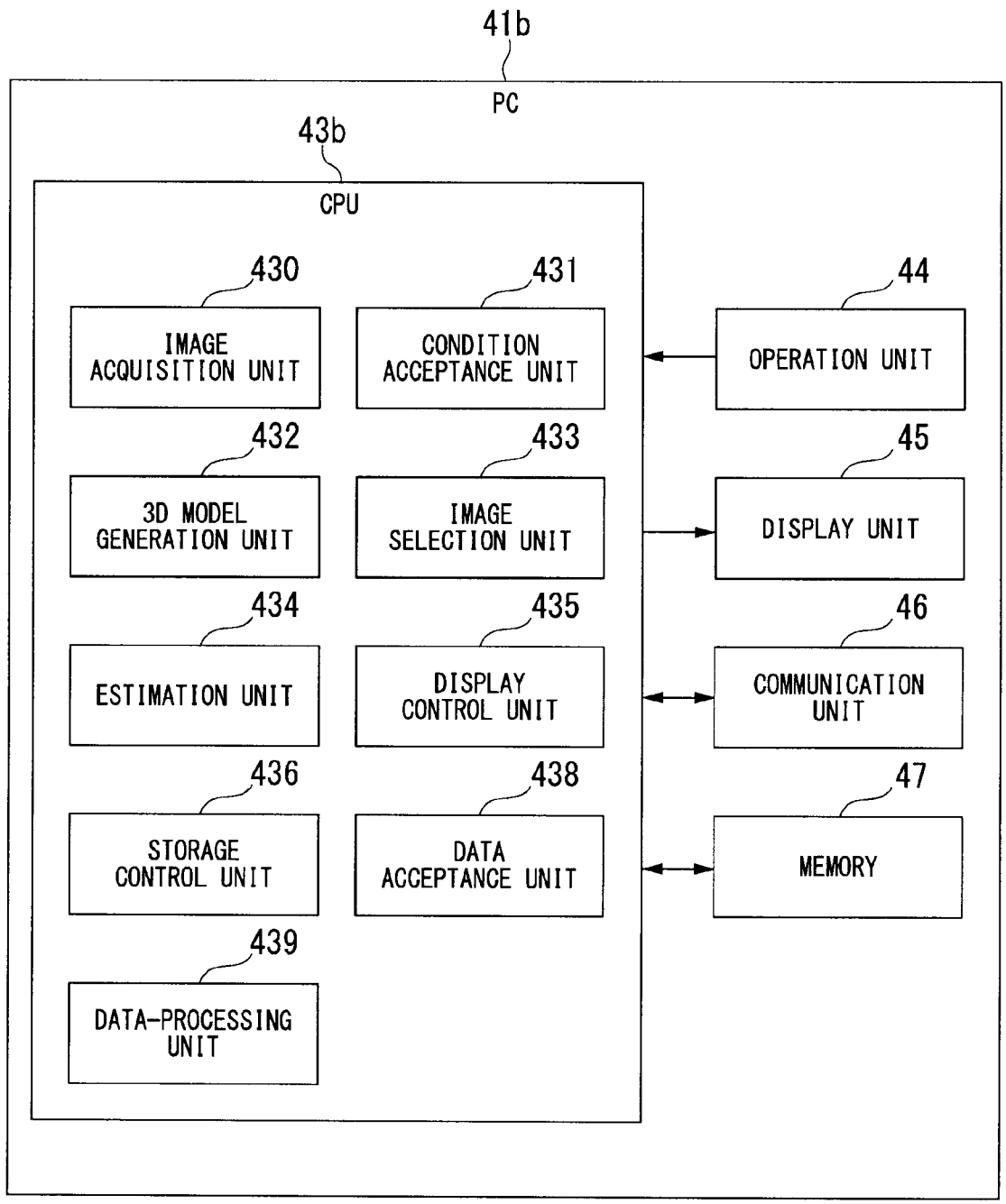
FIG. 24 is a block diagram showing a configuration of a PC according to a sixth modified example of the first embodiment of the present invention.

A sixth modified example of the first embodiment of the present invention will be described. The PC 41 shown in FIG. 1 is changed to a PC 41b shown in FIG. 24. FIG. 24 shows a configuration of the PC 41b. The PC 41b displays a 3D image of design data (reference data) of 3D-CAD or the like instead of displaying a 3D model. The same configuration as that shown in FIG. 1 will not be described.

The CPU 43 shown in FIG. 1 is changed to a CPU 43b. The CPU 43b has functional units including an image acquisition unit 430, a condition acceptance unit 431, a 3D model generation unit 432, an image selection unit 433, an estimation unit 434, a display control unit 435, a storage control unit 436, a data acceptance unit 438, and a data-processing unit 439. At least one of the blocks in the CPU 43b shown in FIG. 24 may be constituted by a different circuit from the CPU 43b.

Each unit in the CPU 43b may be constituted by at least one of a processor and a logic circuit. Each unit in the CPU 43b may include one or a plurality of processors. Each unit in the CPU 43b may include one or a plurality of logic circuits.

The memory 47 stores reference data generated by the PC 41b or an external device. The reference data indicate a 3D shape of a subject. The reference data are independent of a 3D model. The data format of the 3D model and the data format of the reference data may be different from each other. A user inputs information for designating the reference data into the PC 41b by operating the operation unit 44. The data acceptance unit 438 accepts the information from the operation unit 44.

The 3D model includes 3D coordinates of two or more points of the subject. The data-processing unit 439 associates the 3D coordinates of the two or more points with the 3D shape indicated by the reference data. In this way, the data-processing unit 439 associates the position of the 3D model and the position of the reference data with each other.

Figure 25:
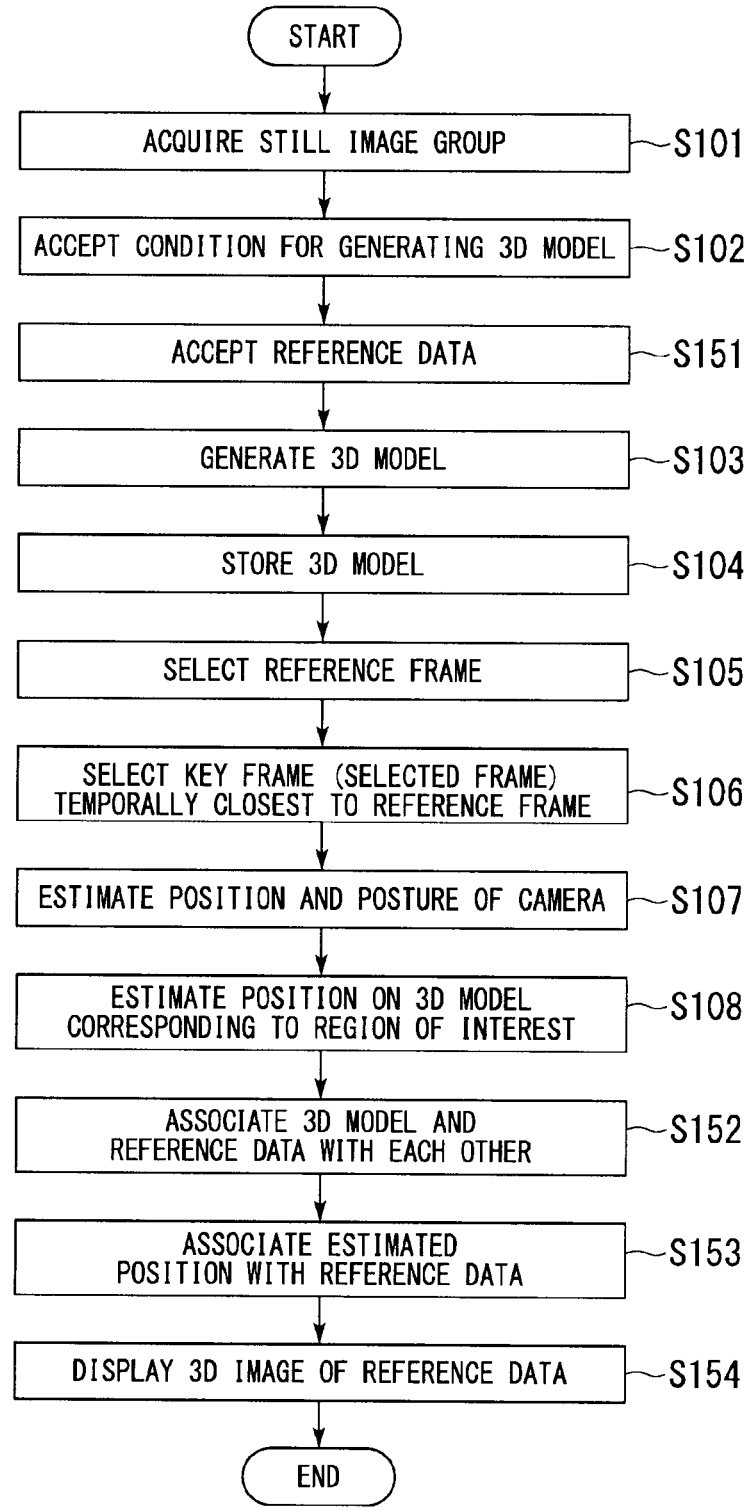
FIG. 25 is a flow chart showing a procedure of processing executed by a PC according to the sixth modified example of the first embodiment of the present invention.

FIG. 25 shows a procedure of processing executed by the PC 41b. The same processing as that shown in FIG. 2 will not be described.

After Step S102, a user inputs information for designating the reference data into the PC 41b by operating the operation unit 44. The data acceptance unit 438 accepts the information from the operation unit 44 (Step S151). After Step S151, Step S103 is executed.

After Step S108, the data-processing unit 439 reads the 3D model generated in Step S103 and the reference data indicated by the information accepted in Step S151 from the memory 47. The data-processing unit 439 associates the position of the 3D model and the position of the reference data with each other (Step S152).

Details of Step S152 will be described. In a case in which the data format of the 3D model and the data format of the reference data are different from each other, the data-processing unit 439 executes processing of matching the data format of the 3D model and the data format of the reference data with each other. The 3D model is configured as 3D point cloud data. For example, in a case in which the reference data are solid data or surface data, the data-processing unit 439 transforms the reference data into 3D point cloud data. The data-processing unit 439 may transform the 3D model into solid data or surface data.

Thereafter, the data-processing unit 439 uses a known technique of aligning positions of 3D data, thus associating the position of the 3D model and the position of the reference data with each other. The data-processing unit 439 can easily execute position-alignment by transforming the data format of the 3D model or the reference data. A user may align the position of the 3D model and the position of the reference data with each other by operating the operation unit 44.

After Step S152, the estimation unit 434 associates the 3D coordinates calculated in Step S108 with the reference data (Step S153). Step S153 is similar to Step S109 shown in FIG. 2.

After Step S153, the display control unit 435 displays a 3D image of the reference data on the display unit 45. At this time, the display control unit 435 displays, on the 3D image, a region including a point having the 3D coordinates calculated in Step S108. In this way, the display control unit 435 displays a region of the 3D model corresponding to a region of interest (Step S154). A user can confirm the position on the 3D model corresponding to the reference frame that is the region of interest by confirming the 3D image of the reference data. When Step S154 is executed, the processing shown in FIG. 25 is completed.

The order of processing executed by the PC 41b is not limited to that shown in FIG. 25. For example, the data acceptance unit 438 may accept information for designating the reference data at any timing before the data-processing unit 439 processes the reference data. Accordingly, Step S151 may be executed at any timing before Step S152 is executed.

In a case in which a condition to use predetermined reference data is set in the PC 41b in advance, the data acceptance unit 438 does not need to accept the information for designating the reference data. Therefore, the CPU 43b does not need to include the data acceptance unit 438, and Step S151 is not necessary.

Steps S121 to S123 shown in FIG. 17 may be executed in addition to the processing shown in FIG. 25. For example, Steps S121 to S123 may be executed after Step S154 is executed. The display control unit 435 may display a 3D distance on the 3D image of the reference data in Step S123.

Steps S131 to S133 shown in FIG. 20 may be executed in addition to the processing shown in FIG. 25. For example, Steps S131 to S133 may be executed after Step S154 is executed. The display control unit 435 may display a 3D image of the reference data including a position estimated as a position of a new region of interest on the display unit 45 in Step S133.

Step S141 and Step S142 shown in FIG. 22 may be executed in addition to the processing shown in FIG. 25. For example, Step S141 and Step S142 may be executed after Step S154 is executed. After Step S142, the display control unit 435 may display the overlapping region detected in Step S141 and the region detected in Step S142 on the 3D image of the reference data. Step S141 and Step S142 may be executed before Step S152 is executed. When Step S154 is executed, the display control unit 435 may display the overlapping region detected in Step S141 and the region detected in Step S142 on the 3D image of the reference data.

The display control unit 435 may display the number of blades of a gas turbine in Step S154 by using the method shown in the second modified example of the first embodiment.

Each aspect of the present invention may include the following modified example. The 3D image is an image of shape data indicating the 3D shape of the subject. The data-processing unit 439 associates 3D coordinates of two or more points of the subject with the 3D shape indicated by the shape data in an association step (Step S153).

In the sixth modified example of the first embodiment, the PC 41b displays the 3D image of the reference data of 3D-CAD or the like. Since the surface of a subject is displayed with high quality, a user can confirm the surface of the subject in detail.

Second Embodiment

Figure 26:
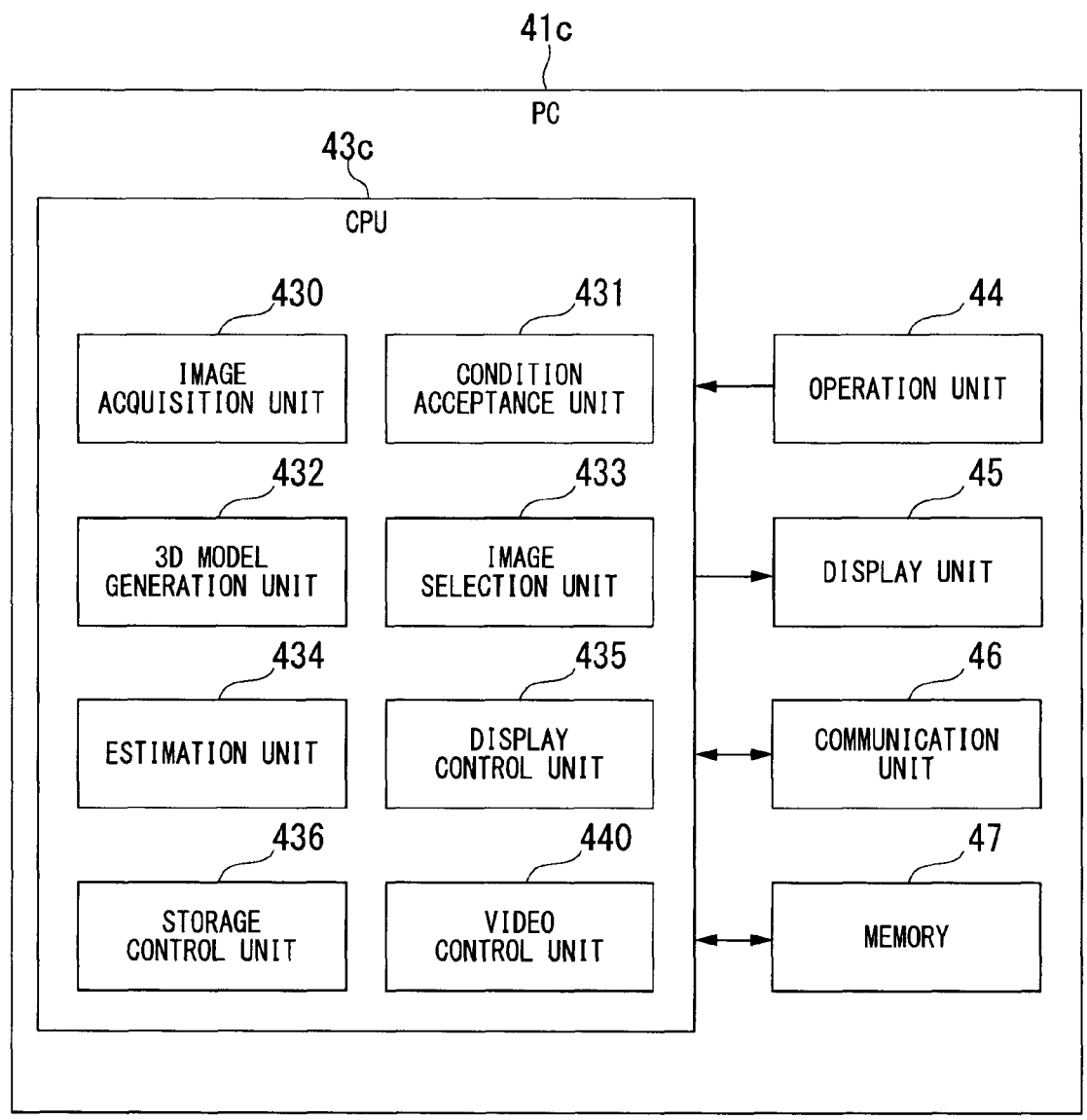
FIG. 26 is a block diagram showing a configuration of a PC according to a second embodiment of the present invention.

A second embodiment of the present invention will be described. The PC 41 shown in FIG. 1 is changed to a PC 41c shown in FIG. 26. FIG. 26 shows a configuration of the PC 41c. The PC 41c has a function of reproducing a video and displays a video along with a 3D image of a 3D model. The same configuration as that shown in FIG. 1 will not be described.

The CPU43 shown in FIG. 1 is changed to a CPU 43c. The CPU 43c has functional units including an image acquisition unit 430, a condition acceptance unit 431, a 3D model generation unit 432, an image selection unit 433, an estimation unit 434, a display control unit 435, a storage control unit 436, and a video control unit 440. At least one of the blocks in the CPU 43c shown in FIG. 26 may be constituted by a different circuit from the CPU 43c.

Each unit in the CPU 43c may be constituted by at least one of a processor and a logic circuit. Each unit in the CPU 43c may include one or a plurality of processors. Each unit in the CPU 43c may include one or a plurality of logic circuits.

In the second embodiment, a video is used as a still image group. A device such as the endoscope device 1 acquires a video during an inspection. A user can add an index to a specific frame of the video by designating a frame of interest during a shooting of the video. The index has a similar function to that of a chapter. The video control unit 440 controls reproduction of the video.

Figure 27:
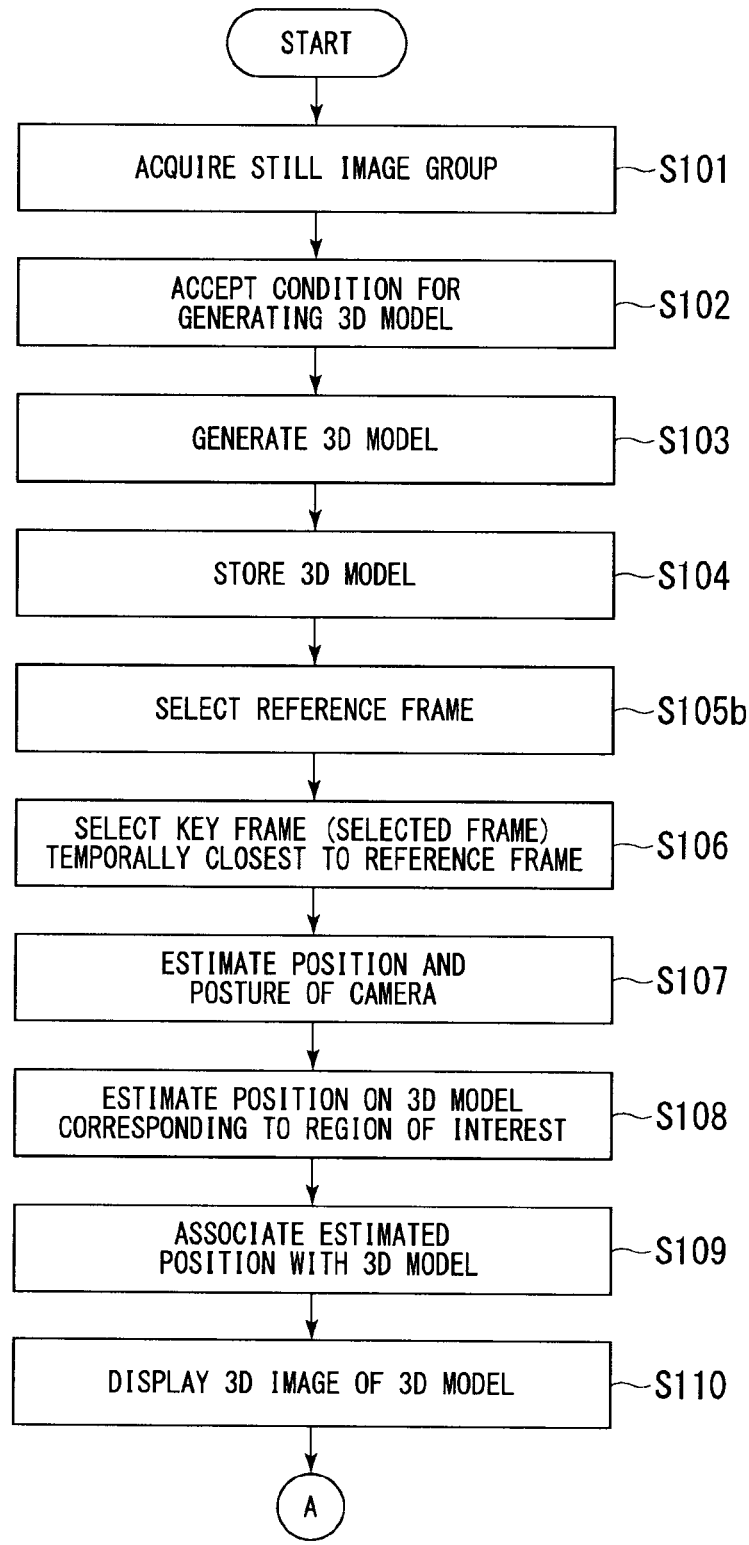
FIG. 27 is a flow chart showing a procedure of processing executed by the PC according to the second embodiment of the present invention.
Figure 28:
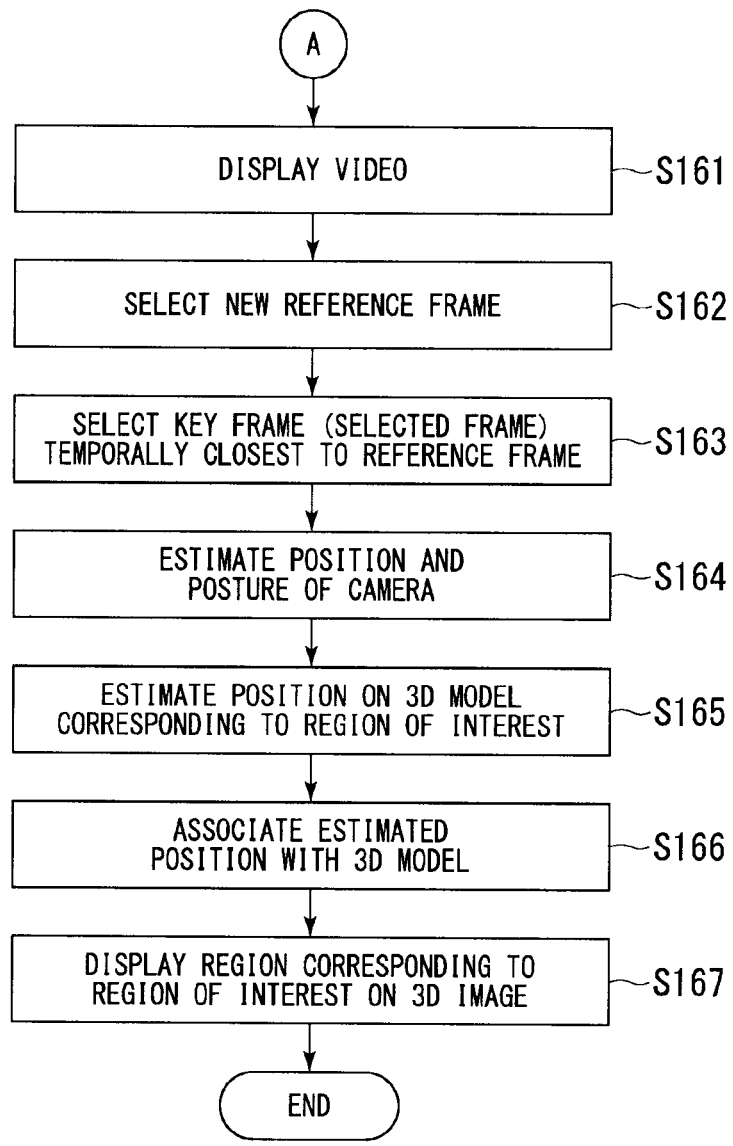
FIG. 28 is a flow chart showing a procedure of processing executed by the PC according to the second embodiment of the present invention.

FIG. 27 and FIG. 28 show a procedure of processing executed by the PC 41c. The same processing as that shown in FIG. 2 will not be described.

Step S105 shown in FIG. 2 is changed to Step S105b. The image selection unit 433 reads an index embedded in a video and identifies a frame corresponding to the index. The image selection unit 433 reads the frame as a reference frame from the memory 47 (Step S105*b*).

After Step S110, the video control unit 440 reads the video from the memory 47 and reproduces the video. The video control unit 440 displays the reproduced video on the display unit 45. The video control unit 440 may read the index embedded in the video and may identify a frame corresponding to the index. The video control unit 440 may display, along with the video, information indicating the frame to which the index is added (Step S161).

A user inputs information indicating a specific frame of the video into the PC 41*c* by operating the operation unit 44 while the video is reproduced. In this way, the user inputs information indicating a new region of interest into the PC 41*c*. The image selection unit 433 reads the frame indicated by the input information as a reference frame from the memory 47 (Step S162).

After Step S162, Steps S163 to S166 are executed. Step S163 is the same as Step S106 shown in FIG. 2. Step S164 is the same as Step S107 shown in FIG. 2. Step S165 is the same as Step S108 shown in FIG. 2. Step S166 is the same as Step S109 shown in FIG. 2.

After Step S166, the display control unit 435 displays, on the 3D image of the 3D model, a region including a point having the 3D coordinates calculated in Step S165. In this way, the display control unit 435 displays a region of the 3D model corresponding to the new region of interest (Step S167). When Step S167 is executed, the processing shown in FIG. 27 and FIG. 28 is completed.

After the video is recorded, an index may be added to the video. For example, after the video is displayed on the display unit 45, a user may add an index to an intended position of the video by operating the operation unit 44.

The order of processing executed by the PC 41*c* is not limited to that shown in FIG. 27 and FIG. 28. For example, the video may be displayed before Step S105*b* is executed and a user may designate a specific frame of the video as a region of interest. The image selection unit 433 may select the frame as a reference frame in Step S105*b*. Accordingly, Step S161 may be executed before Step S104 is executed.

The video control unit 440 may temporarily stop reproduction of the video. The image selection unit 433 may select a frame displayed when reproduction of the video is stopped as a reference frame. A user may input information indicating a region of interest in the reference frame into the PC 41*c* by operating the operation unit 44. Thereafter, similar processing to Steps S131 to S133 shown in FIG. 20 may be executed.

Steps S121 to S123 shown in FIG. 17 may be executed in addition to the processing shown in FIG. 27 and FIG. 28. For example, Steps S121 to S123 may be executed after Step S167 is executed. Steps S121 to S123 may be executed before Step S161 is executed.

Step S141 and Step S142 shown in FIG. 22 may be executed in addition to the processing shown in FIG. 27 and FIG. 28. For example, Step S141 and Step S142 may be executed after Step S166 is executed. Step S141 and Step S142 may be executed before Step S161 is executed. When Step S167 is executed, the display control unit 435 may display the overlapping region detected in Step S141 and the region detected in Step S142 on the 3D image.

Steps S151 to S154 shown in FIG. 25 may be executed in addition to the processing shown in FIG. 27 and FIG. 28. For example, Step S151 may be executed between Step S102 and Step S103. Steps S152 to S154 may be executed instead of Step S109 and Step S110. When Step S167 is executed, the display control unit 435 may display, on the 3D image of the reference data, the region of the 3D model corresponding to the new region of interest.

The display control unit 435 may display the number of blades of a gas turbine in Step S110 or Step S167 by using the method shown in the second modified example of the first embodiment.

Figure 29:
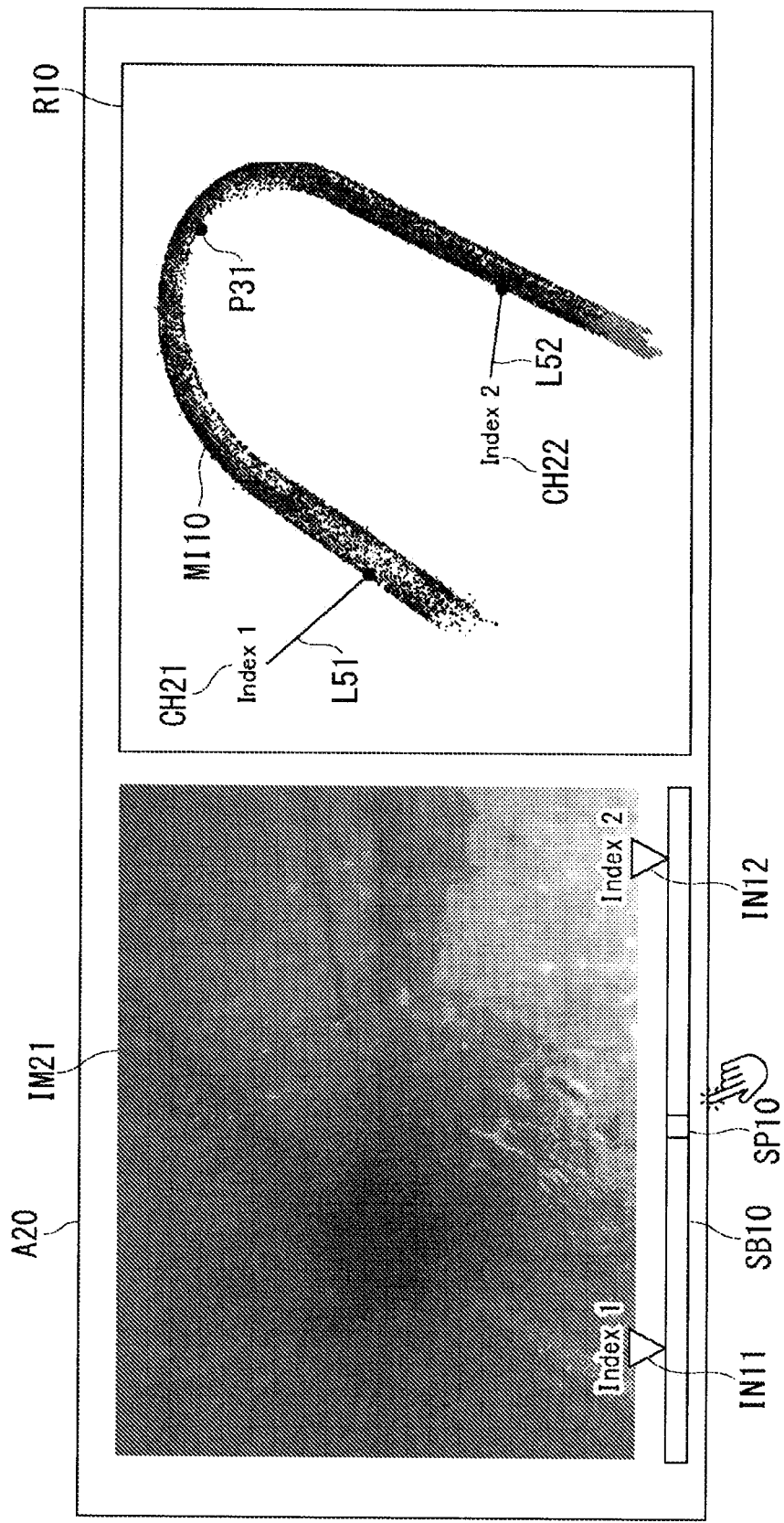
FIG. 29 is a diagram showing an example of a display screen of a display unit included in the PC according to the second embodiment of the present invention.

FIG. 29 shows an example of the display screen of the display unit 45. As with the first embodiment, an example in which the PC 41*c* reads one reference frame as a region of interest after the display unit 45 displays a 3D image of a 3D model will be described. An index is added to the reference frame.

The display control unit 435 displays a dialog box A20 shown in FIG. 29 on the display unit 45. In addition, the display control unit 435 displays a region R10 on the dialog box A20. The region R10 is a region for displaying a 3D image of a 3D model.

After the 3D model is generated, the display control unit 435 displays a 3D image M110 of the 3D model in the region R10. At this time, the display control unit 435 displays the 3D image M110 of the 3D model seen from a viewpoint set in advance.

The display control unit 435 displays a video IM21 on the dialog box A20 in Step S161. At this time, the display control unit 435 displays the video IM21 in a different region from the region R10 in which the 3D image M110 is displayed. The 3D image M110 and the video IM21 are arranged in the horizontal direction.

The display control unit 435 displays a seek-bar SB10 on the dialog box A20 in Step S161. The seek-bar SB10 indicates a reproduction position or a reproduction time of the video IM21. The display control unit 435 displays an index position IN11 and an index position IN12 on the seek-bar SB10 in Step S161. The index position IN11 and the index position IN12 indicate positions of frames to which an index is added by a user during the shooting of the video IM21.

The display control unit 435 displays information indicating a position on the 3D model corresponding to each of the index position IN11 and the index position IN12 on the 3D image M110 in Step S161. Specifically, the display control unit 435 displays a character string CH21 and a character string CH22 on the 3D image M110 and displays a line L51 and a line L52 on the 3D image M110.

Each of the character strings indicates an index name. The character string CH21 indicates an index name index1 corresponding to the index position IN11. The character string CH22 indicates an index name index2 corresponding to the index position IN12. Each of the lines indicates a position corresponding to the frame indicated by each of the index names. The line L51 indicates a position corresponding to the still image indicated by the index name index1. The line L52 indicates a position corresponding to the still image indicated by the index name index2. Each of the positions corresponds to the 3D coordinates calculated in Step S108 on the basis of the camera coordinate and the posture information of the camera that acquires the reference frame.

A user can confirm the position of the frame to which an index is added. In addition, a user can confirm the position on the 3D model corresponding to the index added to the video IM21. Since the 3D image M110 and the video IM21 are displayed, a user can associate the position of the frame to which the index is added and the position on the 3D model corresponding to the index with each other.

After the 3D image M110 is displayed, the display control unit 435 may change the viewpoint of the 3D image MI10.

For example, a user may designate an index by operating the operation unit 44. At this time, the display control unit 435 may identify the frame to which the index designated by the user is added. The display control unit 435 may change the viewpoint of the 3D image M110 on the basis of the camera coordinate of the camera that acquires the identified frame. The display control unit 435 may magnify, reduce, or rotate the region of the 3D model corresponding to the identified frame. A method of changing the viewpoint of the 3D image M110 is the same as that in the first embodiment. A method of magnifying, reducing, or rotating the region of the 3D model is the same as that in the first embodiment.

After the video IM21 is displayed, a user designates a specific position SP10 on the seek-bar SB10 by operating the operation unit 44. In this way, a user designates a specific frame of the video as a region of interest. The image selection unit 433 selects the frame designated by the user as a new reference frame in Step S162. After Steps S163 to S166 are executed, the display control unit 435 displays, on the 3D image M110, a position P31 of a region corresponding to the new region of interest in Step S167.

A user may temporarily stop reproduction of the video. A user may designate part of the region seen in the displayed frame. At this time, the estimation unit 434 may accept part of the frame as a region of interest. The estimation unit 434 may estimate a position on the 3D model corresponding to the region of interest. The display control unit 435 may display, on the 3D image M110, a region corresponding to the region of interest. A method of accepting part of a still image as a region of interest and visualizing a region of the 3D model corresponding to the region of interest is the same as that in the fourth modified example of the first embodiment.

In the second embodiment, the PC 41c displays the 3D image of the 3D model and displays the video including the two or more still images used for generating the 3D model. The PC 41c displays a position on the 3D model corresponding to all or part of a specific frame on the 3D image. After an inspection is completed, a user can confirm a position and a posture of a region of the 3D model corresponding to the region of interest in detail. Therefore, a user can efficiently perform reporting (reviewing) of the inspection result and can efficiently review an abnormality by using an inspection video.

Third Embodiment

Figure 30:
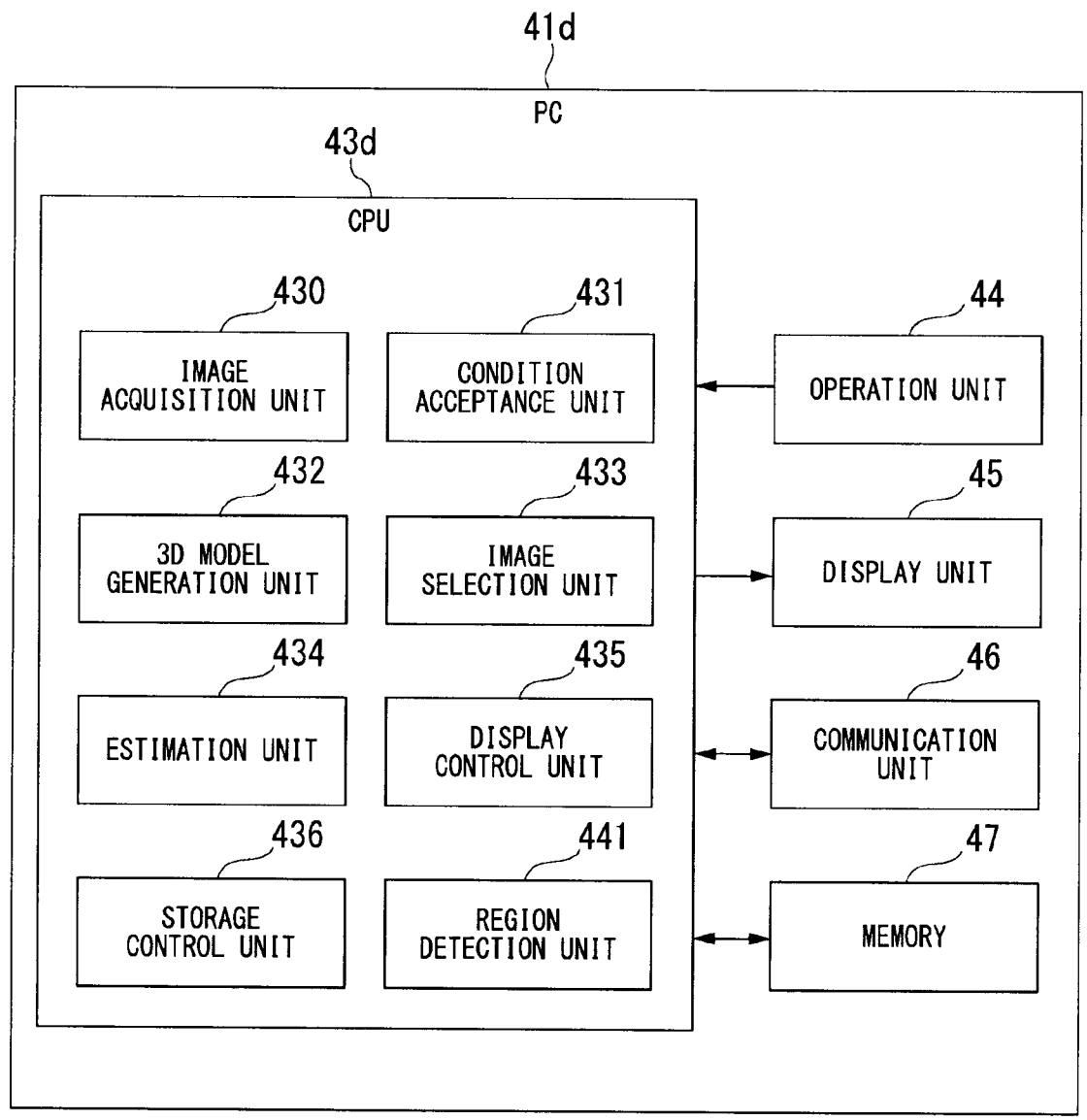
FIG. 30 is a block diagram showing a configuration of a PC according to a third embodiment of the present invention.

A third embodiment of the present invention will be described. The PC 41 shown in FIG. 1 is changed to a PC 41d shown in FIG. 30. FIG. 30 shows a configuration of the PC 41d. The PC 41d automatically sets a region of interest regardless of operations performed by a user. The same configuration as that shown in FIG. 1 will not be described.

The CPU43 shown in FIG. 1 is changed to a CPU 43d. The CPU 43d has functional units including an image acquisition unit 430, a condition acceptance unit 431, a 3D model generation unit 432, an image selection unit 433, an estimation unit 434, a display control unit 435, a storage control unit 436, and a region detection unit 441. At least one of the blocks in the CPU 43d shown in FIG. 30 may be constituted by a different circuit from the CPU 43d.

Each unit in the CPU 43d may be constituted by at least one of a processor and a logic circuit. Each unit in the CPU 43d may include one or a plurality of processors. Each unit in the CPU 43d may include one or a plurality of logic circuits.

The region detection unit 441 detects part of a region of a subject seen in an image as a region of interest. For example, the region of interest is a region (abnormal region) estimated to include an abnormality. The region of interest is not limited to an abnormal region. As long as the region of interest is set for the purpose of visualizing a position on a 3D model, the region of interest may be a region that is not an abnormal region. For example, the region of interest may be a welding mark of a subject in an inspection of a pipe or may be a junction, like an elbow, of the subject. The region of interest may be a reference blade in an inspection of a gas turbine. The region of interest may be a region that is a landmark in an inspection target.

Figure 31:
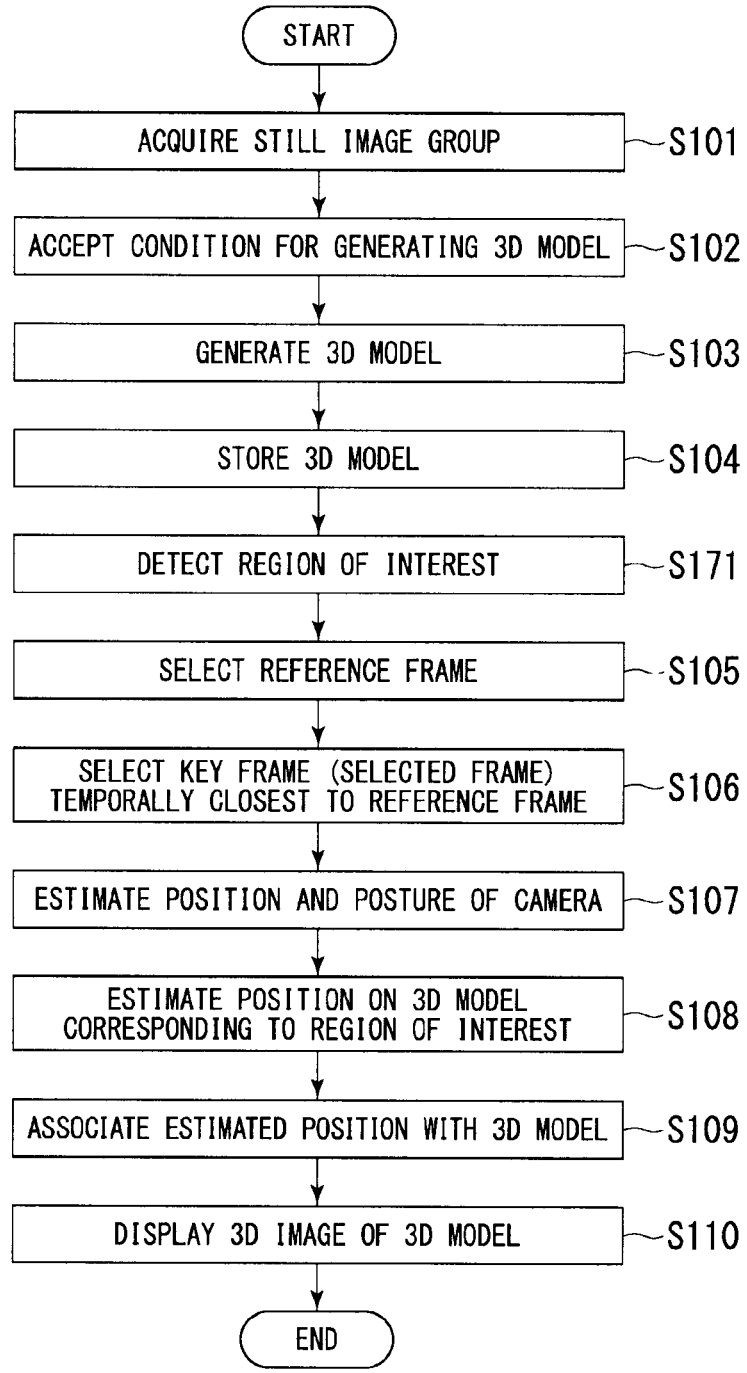
FIG. 31 is a flow chart showing a procedure of processing executed by the PC according to the third embodiment of the present invention.

FIG. 31 shows a procedure of processing executed by the PC 41d. The same processing as that shown in FIG. 2 will not be described.

After Step S104, the region detection unit 441 processes an image and detects a region of interest in the image (Step S171). After Step S171, Step S105 is executed.

Details of Step S171 will be described. Hereinafter, an example in which an abnormality in an inspection target is detected by using machine learning will be described. An abnormal region is distinguished from a region that is not abnormal in terms of a shape, a color, a pattern, or the like. A user classifies images (still images or videos) managed in previous inspections into two types of images in advance. The two types of images are images in which a known abnormality is seen and images in which a known abnormality is not seen. The region detection unit 441 uses these images as teacher data (teacher data with correct answers) of machine learning.

The region detection unit 441 performs learning in which the teacher data are input, thus generating learning data. The learning data indicate features of an abnormal region. The region detection unit 441 determines whether or not an abnormal region is included in any image on the basis of the learning data. When the region detection unit 441 determines that an abnormal region is included in an image, the region detection unit 441 detects the abnormal region as a region of interest. As long as the PC 41d can automatically detect a region of interest, a method of detecting a region of interest is not limited to the above-described methods.

For example, the region detection unit 441 determines whether or not a region of interest is included in a still image included in the still image group. Alternatively, the region detection unit 441 detects a region of interest in a still image acquired at a different timing from the timing at which the still image group is acquired. In this case, the region detection unit 441 determines whether or not a region of interest is included in a different still image from all the two or more still images included in the still image group.

The still image group includes two or more key frames used for generating a 3D model. The region detection unit 441 determines whether or not a region of interest is included in a key frame. Alternatively, the region detection unit 441 determines whether or not a region of interest is included in a still image that is not included in the two or more key frames. For example, in a case in which the still image group includes a still image that is not used for generating a 3D model, the region detection unit 441 determines whether or not a region of interest is included in the still image. A still image, which is not included in the still image group, is not used for generating a 3D model. The region detection unit 441 may determine whether or not a region of interest is included in the still image.

The image selection unit 433 selects one of the two or more still images included in the still image group as a reference frame in Step S105. When the region detection unit 441 detects a region of interest in a still image included in the still image group, the image selection unit 433 selects the still image as the reference frame. When the region detection unit 441 detects a region of interest in a different still image from all the two or more still images included in the still image group, the image selection unit 433 selects an image acquired in similar composition to that of the still image from the still image group as with the third modified example of the first embodiment. In this way, the image selection unit 433 selects the reference frame. The reference frame includes the region of interest detected in the still image.

When the region detection unit 441 detects a region of interest in a key frame used for generating a 3D model, the image selection unit 433 selects the key frame as the reference frame. When the region detection unit 441 detects a region of interest in a still image, which is not included in the two or more key frames, and the still image is included in the still image group, the image selection unit 433 selects the still image as the reference frame. When the region detection unit 441 detects a region of interest in a still image, which is not included in the two or more key frames, and the still image is not included in the still image group, the image selection unit 433 selects an image acquired in similar composition to that of the still image from the still image group as with the third modified example of the first embodiment. In this way, the image selection unit 433 selects the reference frame. The reference frame includes the region of interest detected in the still image.

A condition of the reference frame is stored on the memory 47 in advance. In the above-described example, the condition is indicated by the learning data. The image selection unit 433 selects one of the two or more still images included in the still image group in Step S105. The selected still image includes a region of interest that meets the condition. In the above-described example, the image selection unit 433 selects a reference frame including the region of interest detected by the region detection unit 441. Alternatively, the image selection unit 433 selects a reference frame corresponding to a still image including the region of interest. In this way, the image selection unit 433 selects a still image that meets the condition indicated by the learning data as the reference frame.

The estimation unit 434 detects a region of interest in the reference frame in Step S108. In a case in which the image selection unit 433 selects the same still image as that including the region of interest detected by the region detection unit 441 as the reference frame, the reference frame includes the region of interest. The estimation unit 434 detects the region of interest. In a case in which the image selection unit 433 selects a different still image from that including the region of interest detected by the region detection unit 441 as the reference frame, the estimation unit 434 extracts a similar region in the reference frame to the region of interest. The estimation unit 434 uses the extracted region as the region of interest.

The estimation unit 434 calculates 3D coordinates of a region of the 3D model corresponding to the region of interest in Step S108. In this way, the estimation unit 434 estimates a position on the 3D model corresponding to the region of interest. A method of estimating a position on the 3D model is the same as that in the first embodiment.

The display control unit 435 displays the 3D image of the 3D model on the display unit 45 in Step S110. At this time, the display control unit 435 displays the region of interest on the display unit 45.

The order of processing executed by the PC 41d is not limited to that shown in FIG. 31. For example, the region detection unit 441 may detect a region of interest before the 3D model generation unit 432 generates the 3D model. Accordingly, Step S171 may be executed at any timing between Step S101 and Step S104.

Steps S121 to S123 shown in FIG. 17 may be executed in addition to the processing shown in FIG. 31. For example, Steps S121 to S123 may be executed after Step S110 is executed.

Steps S131 to S133 shown in FIG. 20 may be executed in addition to the processing shown in FIG. 31. For example, Steps S131 to S133 may be executed after Step S110 is executed.

Step S141 and Step S142 shown in FIG. 22 may be executed in addition to the processing shown in FIG. 31. For example, Step S141 and Step S142 may be executed after Step S109 is executed. After Step S142 is executed, Step S110a shown in FIG. 22 may be executed instead of Step S110.

Steps S151 to S154 shown in FIG. 25 may be executed in addition to the processing shown in FIG. 31. For example, Step S151 may be executed between Step S102 and Step S103. Steps S152 to S154 may be executed instead of Step S109 and Step S110.

Steps S161 to S167 shown in FIG. 28 may be executed in addition to the processing shown in FIG. 31. For example, Steps S161 to S167 may be executed after Step S110 is executed.

The display control unit 435 may display the number of blades of a gas turbine in Step S110 by using the method shown in the second modified example of the first embodiment.

Figure 32:
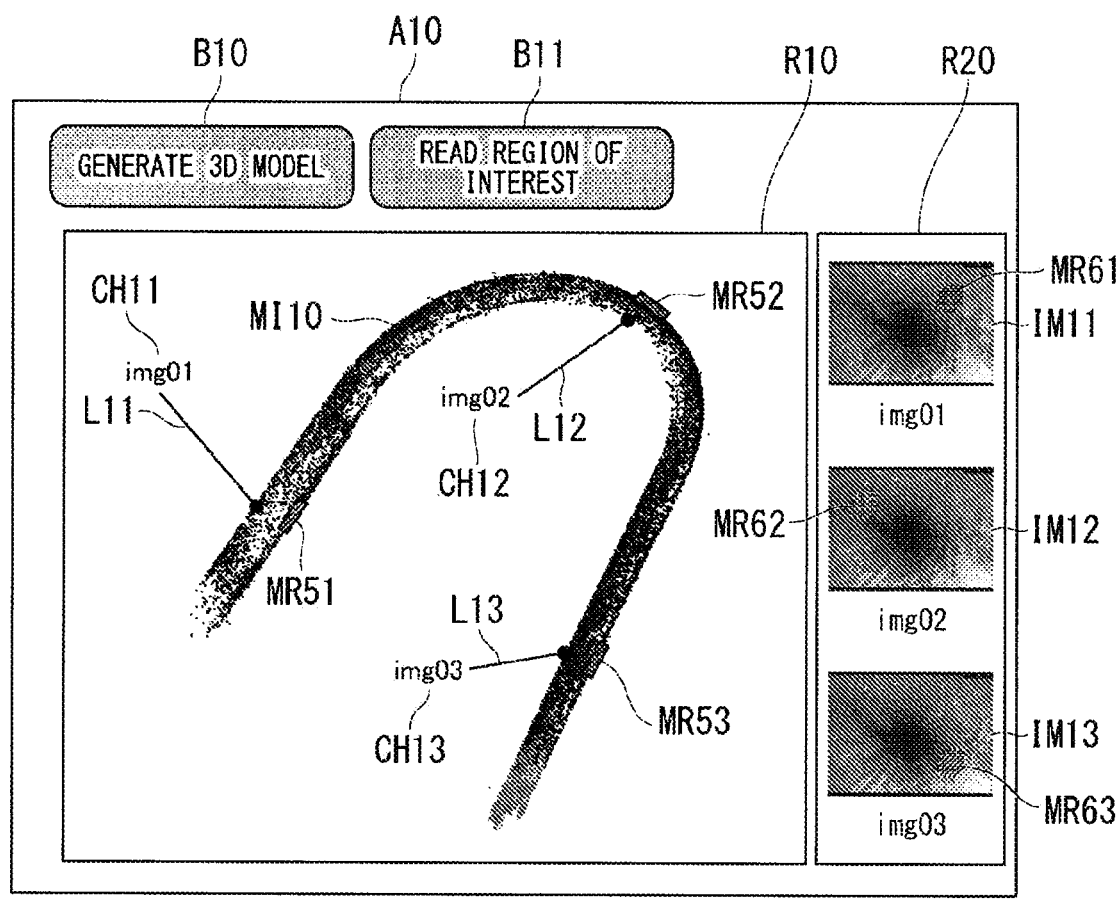
FIG. 32 is a diagram showing an example of a display screen of a display unit included in the PC according to the third embodiment of the present invention.

FIG. 32 shows an example of the display screen of the display unit 45. The same parts as those shown in FIG. 10 will not be described.

The display control unit 435 displays information indicating a position of a region of a 3D model on a 3D image M110 of the 3D model in Step S110. For example, the display control unit 435 displays a region MR51, a region MR52, and a region MR53 on the 3D image M110. The region MR51 is a region of the 3D model corresponding to a still image having a file name img01. The region MR52 is a region of the 3D model corresponding to a still image having a file name img02. The region MR53 is a region of the 3D model corresponding to a still image having a file name img03.

The display control unit 435 displays information indicating a position of the region of interest detected by the region detection unit 441 on the 3D image M110 in Step S110. For example, the display control unit 435 displays a region MR61 of interest, a region MR62 of interest, and a region MR63 of interest. The region MR61 of interest is displayed on a thumbnail image IM11, the region MR62 of interest is displayed on a thumbnail image IM12, and the region MR63 of interest is displayed on a thumbnail image IM13. The region MR51 corresponds to the region MR61 of interest, the region MR52 corresponds to the region MR62 of interest, and the region MR53 corresponds to the region MR63 of interest.

The display control unit 435 may perform processing (enhancement processing) for enhancing the visibility on an image of each of the region MR51, the region MR52, the region MR53, the region MR61 of interest, the region MR62 of interest, and the region MR63 of interest. For example, the display control unit 435 may display the outline of each of the regions by using a line. The display control unit 435 may display each of the regions in a predetermined color or a predetermined pattern. As long as a user can recognize each of the regions from the other regions of the still image or the regions of the 3D model, a method of displaying each of the regions is not limited to the above-described methods.

In the example shown in FIG. 32, the display control unit 435 displays the region of interest in each of the three still images and displays the region of the 3D model corresponding to each of the regions of interest. Since images acquired at various viewpoints are displayed, a user can easily confirm whether or not an abnormal region detected by the region detection unit 441 is really abnormal.

There is a possibility that the region detection unit 441 detects an abnormal region in many still images. In a case in which the display control unit 435 displays all the still images in which an abnormal region is detected, there is a possibility that it is difficult for a user to confirm the abnormal region. In such a case, the display control unit 435 may display only a typical still image in which an abnormal region is detected.

After the 3D image MI10 is displayed, the display control unit 435 may change the viewpoint of the 3D image MI10. For example, a user may designate any one of the region MR61 of interest, the region MR62 of interest, and the region MR63 of interest by operating the operation unit 44. Alternatively, a user may designate any one of the region MR51, the region MR52, and the region MR53 by operating the operation unit 44. At this time, the display control unit 435 identifies a still image corresponding to the region designated by the user. The display control unit 435 changes the viewpoint of the 3D image MI10 on the basis of the camera coordinate of the camera that acquires the identified still image. The display control unit 435 may magnify, reduce, or rotate the region of the 3D model corresponding to the identified still image. A method of changing the viewpoint of the 3D image MI10 is the same as that in the first embodiment. A method of magnifying, reducing, or rotating the region of the 3D model is the same as that in the first embodiment. A user can easily confirm an abnormal region by changing the viewpoint of the 3D image MI10.

Each aspect of the present invention may include the following modified example. The image selection unit 433 selects a reference frame (reference image) including a region (reference region) of interest that meets a condition set in advance in a first selection step (Step S105). The estimation unit 434 estimates 3D coordinates of one or more points of the region of interest in an estimation step (Step S108).

In the third embodiment, the PC 41d automatically sets a region of interest regardless of operations performed by a user. Since the amount of the operation performed by a user is reduced, the user can concentrate on predetermined work. For example, a user can confirm a relative position of the region of interest in the entire inspection target. In a case in which an abnormal region is detected as a region of interest, a user can confirm whether or not the abnormal region is really abnormal.

Fourth Embodiment

A fourth embodiment of the present invention will be described. In the fourth embodiment, the PC 41 shown in FIG. 1 is used.

There is a case in which a user confirms the state of unevenness of a region of interest, the size of an abnormality of a region of interest, or the like in detail by observing a 3D model. In the first to third embodiments, the 3D model indicates a sparse 3D shape of a subject. Since the 3D model is not high-definition, there is a possibility that a user cannot completely confirm the state of the region of the 3D model corresponding to the region of interest. In order to obtain a high-definition 3D model of a relatively wide range such as the entire inspection target, a long processing time is necessary.

A user can confirm the entire image of an inspection target by observing a 3D model constituted by sparse points. However, there is a possibility that sufficient accuracy is not secured for a user to confirm a minute structure such as a recessed portion and a projection portion at a specific position of a subject or to measure the size of the structure.

In the fourth embodiment, the PC 41 generates a high-definition 3D model of a region of a 3D model corresponding to a region of interest and displays a 3D image of the generated 3D model. In this way, the PC 41 solves the above-described problem.

Figure 33:
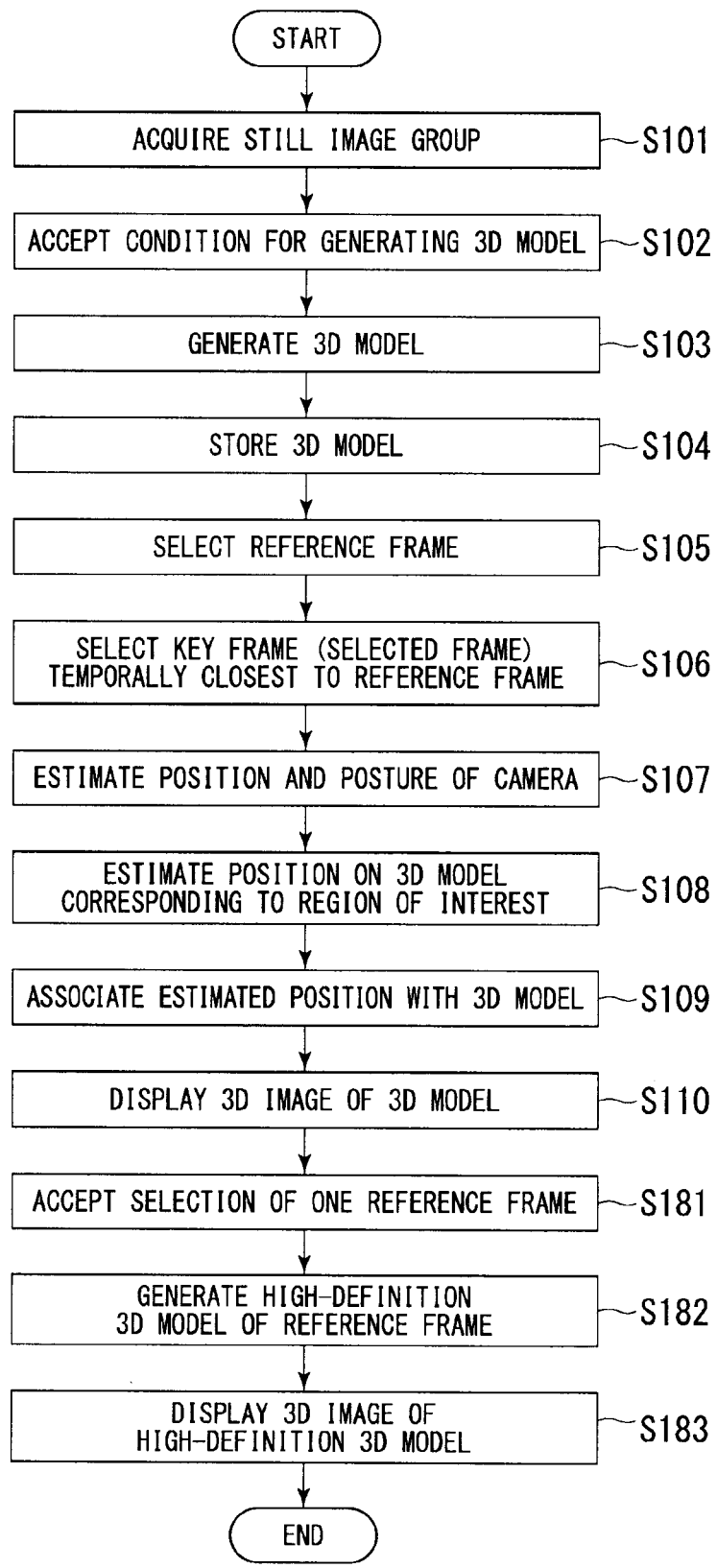
FIG. 33 is a flow chart showing a procedure of processing executed by a PC according to a fourth embodiment of the present invention.

FIG. 33 shows a procedure of processing executed by the PC 41. The same processing as that shown in FIG. 2 will not be described.

Step S103d shown in FIG. 4 is not executed in Step S103. Therefore, the 3D model generated in Step S103 does not include 3D coordinates of points on a subject other than feature points.

After the 3D image of the 3D model is displayed on the display unit 45 in Step S110, a user inputs information indicating a specific still image into the PC 41 by operating the operation unit 44. The still image is the reference frame selected in Step S105. In a case in which two or more reference frames are selected in Step S105, a user inputs information indicating one reference frame into the PC 41. The estimation unit 434 accepts a reference frame as a region of interest on the basis of the information input into the PC 41 by the user. The region of interest is the entire range seen in the reference frame. The estimation unit 434 may accept two or more reference frames (Step S181).

After Step S181, the estimation unit 434 calculates 3D coordinates of a region of the 3D model corresponding to the reference frame accepted in Step S181 and generates a 3D model including the 3D coordinates. The storage control unit 436 causes the memory 47 to store the 3D model generated by the estimation unit 434 (Step S182).

Details of Step S182 will be described. The estimation unit 434 calculates 3D coordinates of two or more points of the reference frame on the basis of the camera coordinate of the camera that acquires the reference frame, the posture information of the camera, and the selected frame. When Step S107d shown in FIG. 5 is executed, the estimation unit 434 acquires the camera coordinate and the posture information of the camera that acquires the reference frame. The estimation unit 434 uses the camera coordinate and the posture information in Step S182.

The two or more points of the reference frame include a point having the 2D coordinates identified in Step S107c shown in FIG. 5. In other words, the two or more points of the reference frame include one or more feature points. Alternatively, the two or more points of the reference frame include one or more points having 2D coordinates other than the 2D coordinates identified in Step S107c. In other words, the two or more points of the reference frame include one or more points other than the feature points. In a case in which the 3D model includes 3D coordinates of the feature points, the estimation unit 434 may acquire the 3D coordinates of the feature points from the 3D model.

For example, the estimation unit 434 calculates 3D coordinates by executing similar processing to Step S103d shown in FIG. 4. At this time, the estimation unit 434 uses the selected frame as the image $I_1$ shown in FIG. 3 and uses the reference frame as the image $I_2$ shown in FIG. 3. The estimation unit 434 calculates 3D coordinates of a subject included in the imaging view field of the camera that acquires the reference frame by executing the above-described processing. In addition, the estimation unit 434 executes similar processing to Step S103e shown in FIG. 4.

The estimation unit 434 may calculate 3D coordinates of a region around the range seen in the reference frame in addition to the 3D coordinates of the range. For example, the estimation unit 434 may detect, from the selected frame, a region (overlapping region) shared by the reference frame and the selected frame. The estimation unit 434 may calculate 3D coordinates of a region outside the overlapping region in the selected frame.

The estimation unit 434 generates a high-definition 3D model corresponding to the reference frame by executing Step S182. The density of points of the 3D model generated in Step S182 is higher than that of points included in the region corresponding to the reference frame among two or more points of the 3D model generated in Step S103. The density of points indicates the number of points included in a unit volume in the coordinate system of the 3D model.

After Step S182, the display control unit 435 displays a 3D image of the 3D model generated in Step S182 on the display unit 45. In this way, the display control unit 435 displays a region of the high-definition 3D model corresponding to the region of interest (Step S183). A user can recognize the high-definition 3D model corresponding to the reference frame that is the region of interest. When Step S183 is executed, the processing shown in FIG. 33 is completed.

When the estimation unit 434 accepts two or more reference frames in Step S181, the estimation unit 434 may generate a high-definition 3D model corresponding to each of the two or more reference frames in Step S182. The display control unit 435 may display a 3D image of the high-definition 3D model corresponding to each of the two or more reference frames on the display unit 45 in Step S183.

The order of processing executed by the PC 41 is not limited to that shown in FIG. 33. For example, the estimation unit 434 may accept a reference frame after the image selection unit 433 selects a reference frame and before the display control unit 435 displays a 3D image of a sparse 3D model. Accordingly, Step S181 may be executed at any timing between Step S105 and Step S110.

The estimation unit 434 may generate a high-definition 3D model after the estimation unit 434 acquires the camera coordinate and the posture information of the camera that acquires the reference frame and before the display control unit 435 displays a 3D image of a sparse 3D model. Accordingly, Step S182 may be executed at any timing between Step S107 and Step S110.

The display control unit 435 may display a 3D image of a high-definition 3D model after the estimation unit 434 acquires the camera coordinate and the posture information of the camera that acquires the reference frame and before the display control unit 435 displays a 3D image of a sparse 3D model. Accordingly, Step S183 may be executed at any timing between Step S107 and Step S110.

The estimation unit 434 may generate a high-definition 3D model corresponding to the reference frame selected in Step S105. Therefore, the estimation unit 434 does not need to execute Step S181.

Steps S121 to S123 shown in FIG. 17 may be executed in addition to the processing shown in FIG. 33. For example, Steps S121 to S123 may be executed after Step S183 is executed. Steps S121 to S123 may be executed before Step S181 is executed.

Steps S131 to S133 shown in FIG. 20 may be executed in addition to the processing shown in FIG. 33. For example, Steps S131 to S133 may be executed after Step S183 is executed. Steps S131 to S133 may be executed before Step S181 is executed.

Step S141, Step S142, and Step S110a shown in FIG. 22 may be executed in addition to the processing shown in FIG. 33. For example, Step S141, Step S142, and Step S110a may be executed after Step S183 is executed. Step S141, Step S142, and Step S110a may be executed before Step S181 is executed.

Steps S151 to S154 shown in FIG. 25 may be executed in addition to the processing shown in FIG. 33. For example, Step S151 may be executed between Step S102 and Step S103. Steps S152 to S154 may be executed instead of Step S109 and Step S110.

Steps S161 to S167 shown in FIG. 28 may be executed in addition to the processing shown in FIG. 33. For example, Steps S161 to S167 may be executed after Step S183 is executed. Steps S161 to S167 may be executed before Step S181 is executed.

Step S171 shown in FIG. 31 may be executed in addition to the processing shown in FIG. 33. For example, Step S171 may be executed between Step S104 and Step S105. The region detection unit 441 detects a region of interest in an image in Step S171. The estimation unit 434 does not need to execute Step S181. The estimation unit 434 may calculate 3D coordinates of a region of the 3D model corresponding to the region of interest and may generate a 3D model including the 3D coordinates in Step S182.

The display control unit 435 may display the number of blades of a gas turbine in Step S110 by using the method shown in the second modified example of the first embodiment.

Figure 34:
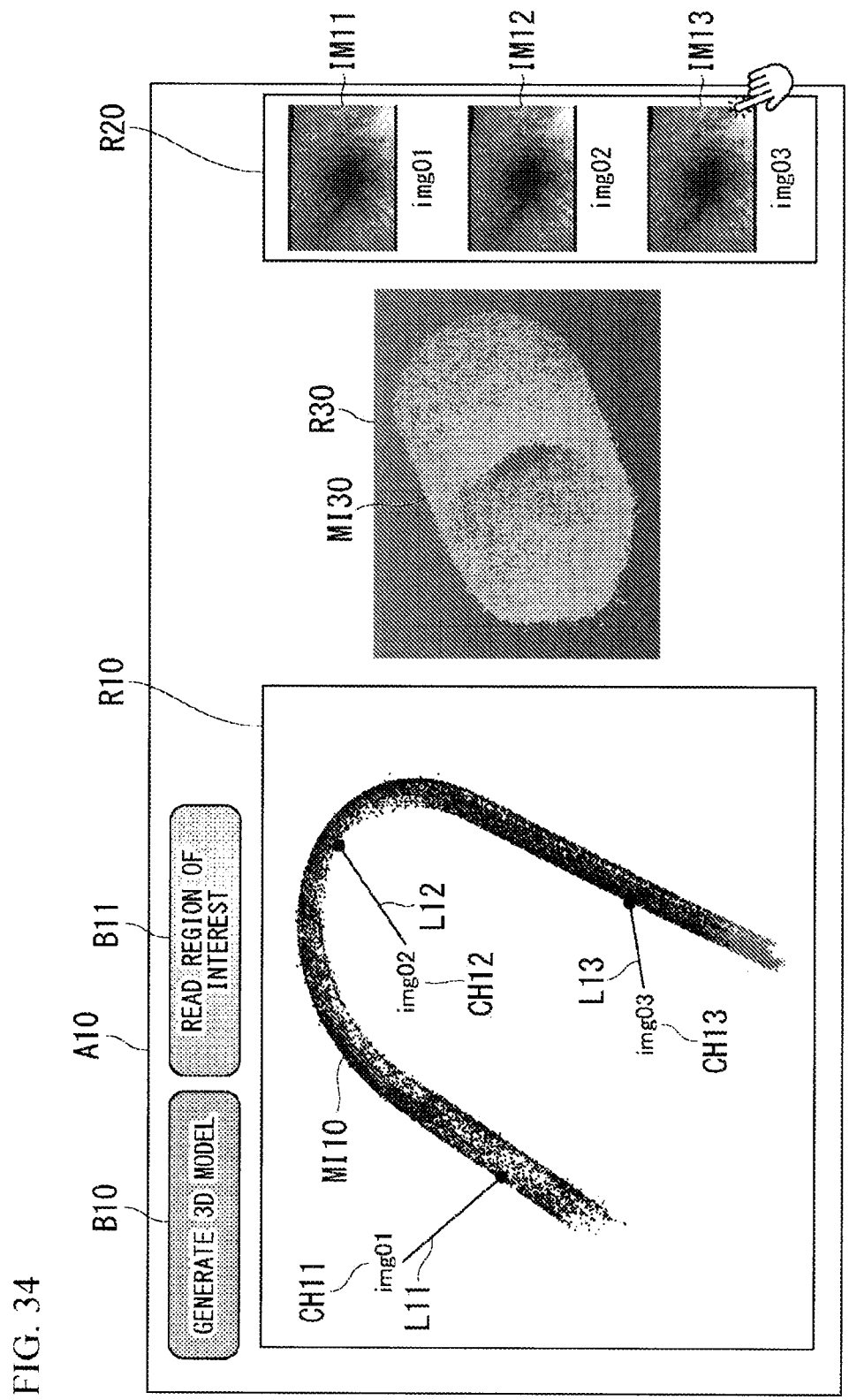
FIG. 34 is a diagram showing an example of a display screen of a display unit included in the PC according to the fourth embodiment of the present invention.

FIG. 34 shows an example of the display screen of the display unit 45. The same parts as those shown in FIG. 10 will not be described.

The display control unit 435 displays a thumbnail image IM11, a thumbnail image IM12, and a thumbnail image IM13 in a region R20 as with FIG. 10. For example, a user designates the thumbnail image IM13. At this time, the estimation unit 434 accepts a reference frame corresponding to the thumbnail image IM13 as a region of interest in Step S181. The estimation unit 434 generates a high-definition 3D model corresponding to the reference frame in Step S182. The display control unit 435 displays a 3D image M130 of the high-definition 3D model in a region R30 on a dialog box A10 in Step S183.

The display control unit 435 displays the 3D image M130 of the 3D model seen from a viewpoint set in advance and in a direction set in advance. The display control unit 435 may display the 3D image M130 of the 3D model seen from the camera coordinate of the camera that acquires the reference frame and in the direction indicated by the posture information of the camera. For example, the display control unit 435 displays the 3D image M130 between a region R10 in which a 3D image M110 of a sparse 3D model is displayed and a region R20 in which each of the thumbnail images is displayed.

In the example shown in FIG. 34, the region R10 in which the 3D image M110 is displayed and the region R30 in which the 3D image M130 is displayed are different from each other. The display control unit 435 may display the 3D image M110 and the 3D image M130 in one region.

The display control unit 435 may switch between a first display state and a second display state. The display control unit 435 displays the 3D image M110 without displaying the 3D image M130 in the first display state. The display control unit 435 displays the 3D image M130 without displaying the 3D image M110 in the second display state. A user may input information indicating one of the first display state and the second display state into the PC 41 by operating the operation unit 44. The display control unit 435 may realize a display state indicated by the information.

In the example shown in FIG. 34, the display control unit 435 displays the thumbnail image IM11, the thumbnail image IM12, and the thumbnail image IM13 in the region R20. The display control unit 435 may display a high-definition 3D model corresponding to each of the reference frames in the region R20 instead of each of the thumbnail images.

A user may input two or more measurement points of the 3D image M130 into the PC 41 by operating the operation unit 44. The CPU 43 may accept the two or more measurement points and may measure the size of the 3D model on the basis of the two or more measurement points.

Each aspect of the present invention may include the following modified example. The estimation unit 434 estimates 3D coordinates of one or more points of a region of a subject seen in a reference frame (reference image) on the basis of the second camera coordinate of the second camera, the second posture information of the second camera, and the selected frame (selected image) in an estimation step (Step S182). The second camera acquires the reference frame. The one or more points of the region are different from points having 3D coordinates included in the 3D model (3D data) stored on the memory 47 in Step S104. The 3D image M130 visualizes 3D coordinates of the one or more points of the region. In addition, the 3D image M130 visualizes 3D coordinates of one or more points included in the region among the 3D coordinates included in the 3D model. The density of points having the 3D coordinates visualized by the 3D image M130 is higher than the density of points included in the region among two or more points of the subject.

Each aspect of the present invention may include the following modified example. The image selection unit 433 selects a reference frame including a region (reference region) of interest that meets a condition set in advance in a first selection step (Step S105). The estimation unit 434 estimates 3D coordinates of one or more points of the region of interest on the basis of the second camera coordinate, the second posture information, and the selected frame (selected image) in an estimation step (Step S182). The one or more points of the region of interest are different from points having 3D coordinates included in the 3D model stored on the memory 47 in Step S104. The 3D image visualizes 3D coordinates of the one or more points of the region of interest. In addition, the 3D image visualizes 3D coordinates of one or more points included in the region of interest among the 3D coordinates included in the 3D model. The density of points having the 3D coordinates visualized by the 3D image is higher than the density of points included in the region of interest among two or more points of the subject.

In the fourth embodiment, the PC 41 generates a high-definition 3D model of a region of a 3D model corresponding to a region of interest. An increase of a processing time is restricted, compared to the case in which the PC 41 generates a high-definition 3D model of the entire inspection target. Since the PC 41 displays a 3D image of a high-definition 3D model, a user can confirm a position on the 3D model corresponding to the region of interest. In addition, a user can correctly confirm the state (the state of unevenness, the size of an abnormality, or the like) of a local abnormality of the region of interest.

Modified Example of Fourth Embodiment

A modified example of the fourth embodiment of the present invention will be described. In the modified example of the fourth embodiment, the PC 41 shown in FIG. 1 is used. The PC 41 does not need to display a 3D image of a sparse 3D model generated by the 3D model generation unit 432.

Figure 35:
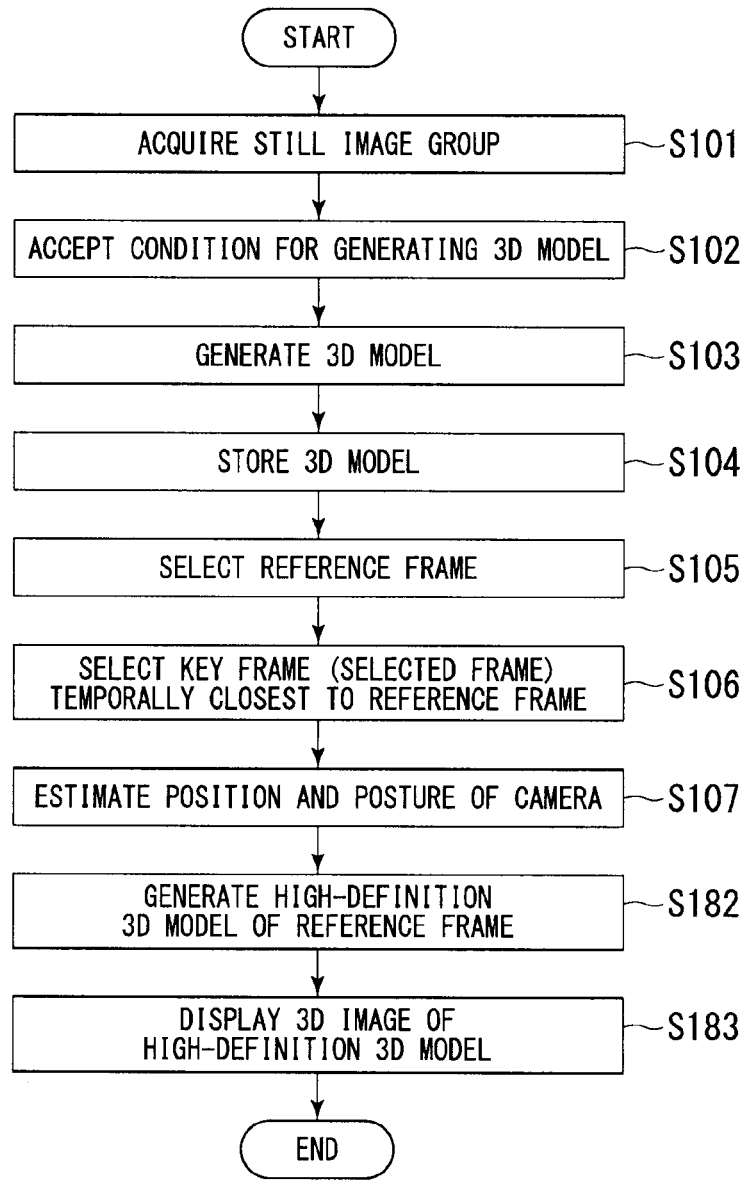
FIG. 35 is a flow chart showing a procedure of processing executed by a PC according to a modified example of the fourth embodiment of the present invention.

FIG. 35 shows a procedure of processing executed by the PC 41. The same processing as that shown in FIG. 33 will not be described.

After Step S107, the estimation unit 434 calculates 3D coordinates of a region of a 3D model corresponding to a reference frame in Step S182 and generates a 3D model including the 3D coordinates. At this time, the estimation unit 434 uses the reference frame selected in Step S105.

The 3D model generated by the 3D model generation unit 432 includes a camera coordinate and posture information of a camera that acquires two or more 2D images for generating the 3D model. In a case in which the 3D model generation unit 432 generates the 3D model without using the reference frame, the 3D model does not include a camera coordinate or posture information of a camera that acquires the reference frame. Therefore, the estimation unit 434 estimates a position and a posture of the camera that acquires the reference frame in Step S107.

In the above-described example, the image selection unit 433 selects a still image that is not included in two or more key frames used for generating the 3D model as the reference frame. The image selection unit 433 may select one of the two or more key frames as the reference frame. In such a case, the 3D model includes the camera coordinate and the posture information of the second camera that acquires the reference frame. The estimation unit 434 may acquire the camera coordinate and the posture information from the 3D model in Step S107.

Figure 36:
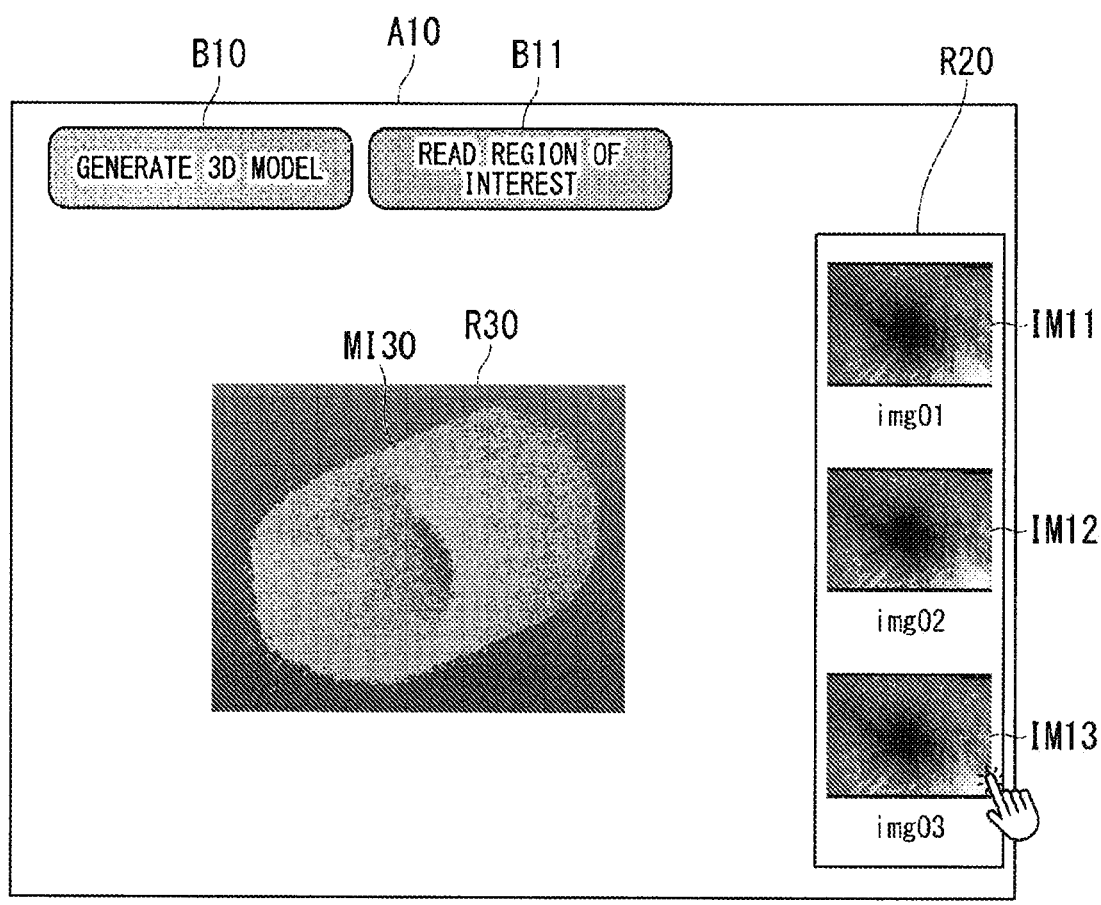
FIG. 36 is a diagram showing an example of a display screen of a display unit included in the PC according to the modified example of the fourth embodiment of the present invention.

FIG. 36 shows an example of the display screen of the display unit 45. The same parts as those shown in FIG. 34 will not be described.

The display control unit 435 does not display a region R10 for displaying a 3D image of a 3D model. The display control unit 435 displays a thumbnail image IM11, a thumbnail image IM12, and a thumbnail image IM13 in a region R20 as with FIG. 34. For example, a user designates the thumbnail image IM13. At this time, the image selection unit 433 selects a reference frame corresponding to the thumbnail image IM13 in Step S105. The estimation unit 434 generates a high-definition 3D model corresponding to the reference frame in Step S182. The display control unit 435 displays a 3D image M130 of the high-definition 3D model in a region R30 on a dialog box A10 in Step S183.

An image display method of each aspect of the present invention includes a storage step, a first selection step, a second selection step, an estimation step, and a display step. The storage control unit 436 causes the memory 47 (storage medium) to store a 3D model (3D data) generated on the basis of two or more 2D images of a subject in the storage step (Step S104). The 3D model includes 3D coordinates of two or more points of the subject and a first camera coordinate. The first camera coordinate indicates 3D coordinates of a first camera, which acquires each of the two or more 2D images, and is associated with each of the two or more 2D images. The image selection unit 433 selects a reference frame (reference image) that is a 2D image of the subject in the first selection step (Step S105). The image selection unit 433 selects at least one of the two or more 2D images as a selected frame (selected image) on the basis of the reference frame in the second selection step (Step S106). The estimation unit 434 estimates 3D coordinates of one or more points of a region of the subject seen in the reference frame on the basis of a second camera coordinate of a second camera, second posture information of the second camera, and the selected frame in the estimation step (Step S182). The second camera acquires the reference frame. The one or more points of the region are different from points having the 3D coordinates included in the 3D model. The display control unit 435 displays the 3D image M130 on the display unit 45 (display) in the display step (Step S183). The 3D image M130 visualizes the 3D coordinates of the one or more points of the region and visualizes 3D coordinates of one or more points included in the region among the 3D coordinates included in the 3D model. The density of points having the 3D coordinates visualized by the 3D image M130 is higher than the density of points included in the region among the two or more points of the subject.

In the modified example of the fourth embodiment, the PC 41 displays a high-definition 3D model of a region of a 3D model corresponding to a region of interest without displaying a sparse 3D model of the entire inspection target. Therefore, the PC 41 can efficiently use the display screen of the display unit 45 in order to display a high-definition 3D model, compared to the case in which a sparse 3D model and a high-definition 3D model are simultaneously displayed.

Fifth Embodiment

A fifth embodiment of the present invention will be described. In the fifth embodiment, the PC 41 shown in FIG. 1 is used.

In the fifth embodiment, the PC 41 generates a 3D model by using a reference frame including a region of interest as a key frame. The image selection unit 433 selects a reference frame before a 3D model is generated. When the 3D model generation unit 432 generates a 3D model, the 3D model generation unit 432 estimates a camera coordinate and a posture of a camera that acquires the reference frame.

Figure 37:
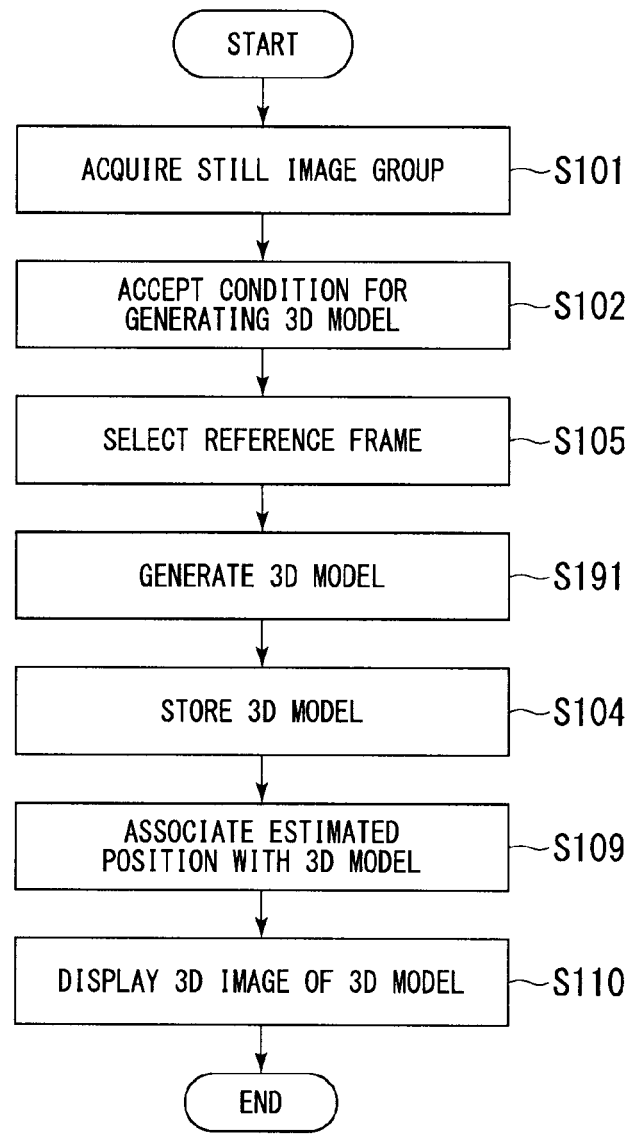
FIG. 37 is a flow chart showing a procedure of processing executed by a PC according to a fifth embodiment of the present invention.

FIG. 37 shows a procedure of processing executed by the PC 41. The same processing as that shown in FIG. 2 will not be described.

After Step S102, the image selection unit 433 selects one of two or more still images included in the still image group as a reference frame in Step S105. For example, the image selection unit 433 identifies a timing at which a still image is recorded by reading the header of the video file as with the first embodiment. The image selection unit 433 selects a still image recorded at the identified timing as a reference frame. In a case in which the PC 41 has a function of reproducing a video as with the PC 41c shown in FIG. 26, a user may designate a specific frame of a video while the video is reproduced. The image selection unit 433 may select the frame designated by the user as a reference frame.

After Step S105, the 3D model generation unit 432 generates a 3D model of a subject on the basis of the two or more still images included in the still image group and a condition for generating a 3D model (Step S191). The two or more still images used for generating the 3D model include the reference frame.

Figure 38:
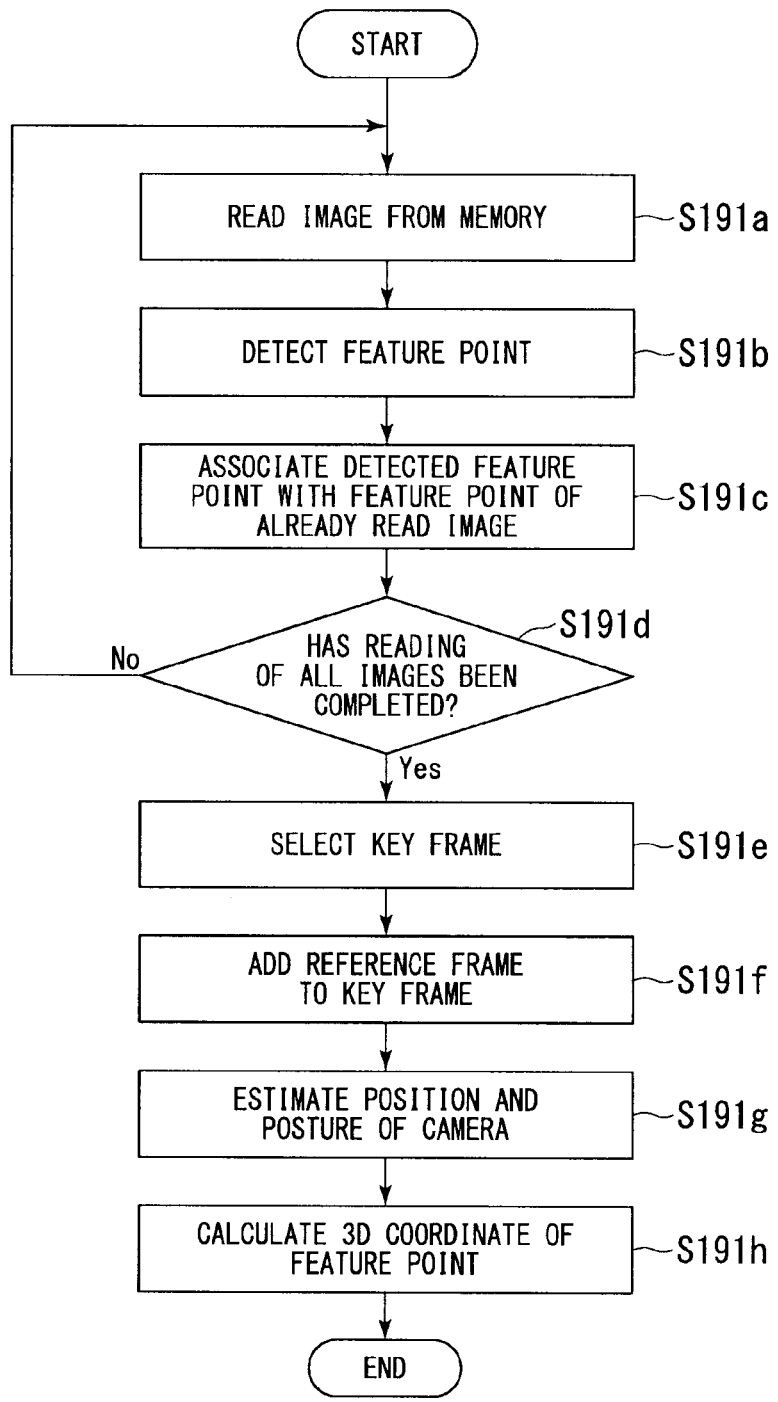
FIG. 38 is a flow chart showing a procedure of processing executed by the PC according to the fifth embodiment of the present invention.

A procedure of specific processing executed by the 3D model generation unit 432 will be described. FIG. 38 shows a procedure of processing executed by the 3D model generation unit 432.

The 3D model generation unit 432 reads one still image included in the still image group from the memory 47 (Step S191a). Step S191a is executed the same number of times as that of still images included in the still image group. The 3D model generation unit 432 reads a different still image from the already read still image from the memory 47 in Step S191a. The two or more still images included in the still image group may be arranged in order in accordance with time stamps or the like in advance. The 3D model generation unit 432 may read a still image from the memory 47 in accordance with the order in Step S191a.

After Step S191a, the 3D model generation unit 432 detects a feature point of the still image read in Step S191a (Step S191b).

After Step S191b, the 3D model generation unit 432 associates a feature point of each still image that has already been read and the feature point detected in Step S191b with each other (Step S191c). When Step S191a is executed once, Step S191c is not executed.

After Step S191c, the 3D model generation unit 432 determines whether or not all the images included in the still image group have been read (Step S191d). When the 3D model generation unit 432 determines that some of the images have not been read in Step S191d, Step S191a is executed. Steps S191a to S191d are repetitively executed until all the images included in the still image group are processed.

When the 3D model generation unit 432 determines that all the images included in the still image group have been read in Step S191d, the 3D model generation unit 432 selects one or more key frames for generating a 3D model from the still image group (Step S191e).

Details of Step S191e will be described. The 3D model generation unit 432 selects a key frame that meets a predetermined condition. For example, the 3D model generation unit 432 selects an image not including blurring or a bright image as a key frame. In addition, the 3D model generation unit 432 confirms that the amount of movement between two key frames is greater than or equal to a predetermined amount. When the reference frame selected in Step S105 meets a condition of the key frame, the 3D model generation unit 432 may select two or more key frames including the reference frame in Step S191e.

After Step S191e, the 3D model generation unit 432 adds the reference frame selected in Step S105 to the key frames (Step S191f). In a case in which two or more key frames including the reference frame are selected in Step S191e, Step S191f is not executed.

After Step S191f, the 3D model generation unit 432 estimates a camera coordinate and a posture of a camera that acquires each of the two or more key frames on the basis of 2D coordinates of feature points of the two or more key frames (Step S191g).

After Step S191g, the 3D model generation unit 432 calculates 3D coordinates of each of the feature points (Step S191h). Step S191g and Step S191h are similar to Step S103c shown in FIG. 4. When Step S191h is executed, the processing shown in FIG. 38 is completed.

A procedure of processing executed after the 3D model is generated will be described by referring to FIG. 37 again. After Step S191, Step S104 is executed. After Step S104, Step S109 is executed.

The 3D model generation unit 432 calculates 3D coordinates of a region of the 3D model corresponding to the reference frame in Step S191h shown in FIG. 38. In this way, the 3D model generation unit 432 estimates a position on the 3D model corresponding to the region of interest. The estimation unit 434 associates the 3D coordinates of the region with the 3D model in Step S109.

Steps S121 to S123 shown in FIG. 17 may be executed in addition to the processing shown in FIG. 37. For example, Steps S121 to S123 may be executed after Step S110 is executed.

Steps S131 to S133 shown in FIG. 20 may be executed in addition to the processing shown in FIG. 37. For example, Steps S131 to S133 may be executed after Step S110 is executed.

Step S141 and Step S142 shown in FIG. 22 may be executed in addition to the processing shown in FIG. 37. For example, Step S141 and Step S142 may be executed after Step S109 is executed. After Step S142 is executed, Step S110a shown in FIG. 22 may be executed instead of Step S110.

Steps S151 to S154 shown in FIG. 25 may be executed in addition to the processing shown in FIG. 37. For example, Step S151 may be executed between Step S102 and Step S103. Steps S152 to S154 may be executed instead of Step S109 and Step S110.

Steps S161 to S167 shown in FIG. 28 may be executed in addition to the processing shown in FIG. 37. For example, Steps S161 to S167 may be executed after Step S110 is executed.

Step S171 shown in FIG. 31 may be executed in addition to the processing shown in FIG. 37. For example, Step S171 may be executed between Step S101 and Step S102. Alternatively, Step S171 may be executed between Step S102 and Step S105. The region detection unit 441 detects a region of interest in an image in Step S171. The image selection unit 433 may select, in Step S105, a reference frame including the region of interest detected by the region detection unit 441.

Steps S181 to S183 shown in FIG. 33 may be executed in addition to the processing shown in FIG. 37. For example, Steps S181 to S183 may be executed after Step S110 is executed.

The display control unit 435 may display the number of blades of a gas turbine in Step S110 by using the method shown in the second modified example of the first embodiment.

An image display method according to each aspect of the present invention includes a selection step, an estimation step, and a display step. The image selection unit 433 selects a reference frame (reference image) that is a 2D image of a subject in the selection step (Step S105). The 3D model generation unit 432 estimates 3D coordinates of two or more points of the subject and a camera coordinate on the basis of two or more 2D images of the subject including the reference frame in the estimation step (Step S191). The camera coordinate indicates 3D coordinates of a camera, which acquires each of the two or more 2D images, and is associated with each of the two or more 2D images. The display control unit 435 displays a 3D image on the display unit 45 (display) in the display step (Step S110). The 3D image visualizes at least one of a camera coordinate of a camera, which acquires the reference frame, and a set of 3D coordinates of one or more points of the subject calculated on the basis of the camera coordinate. The 3D image also visualizes 3D coordinates of one or more of the two or more points of the subject.

In the fifth embodiment, the PC 41 adds a reference frame including a region of interest to the key frame before generating a 3D model. The PC 41 generates a 3D model by using two or more key frames including the reference frame. When the PC 41 completes generation of the 3D model, the PC 41 can obtain 3D coordinates of a region of the 3D model corresponding to the reference frame.

Sixth Embodiment

A sixth embodiment of the present invention will be described. In the sixth embodiment, two devices cooperate with each other. A first device accepts an instruction from a user, executes processing, and notifies the user of results of the processing. The first device executes processing related to display of an image and the like. A second device executes processing related to generation of a 3D model and the like. For example, portability of the first device is excellent, but the calculation resource of the first device is small. Portability of the second device is not excellent, but the calculation resource of the second device is abundant. In the sixth embodiment, advantages of the two devices are utilized. There is a situation in which processing using an image is required in a scene that makes it difficult to carry a large device or the like. In such a situation, the sixth embodiment is effective.

Figure 39:
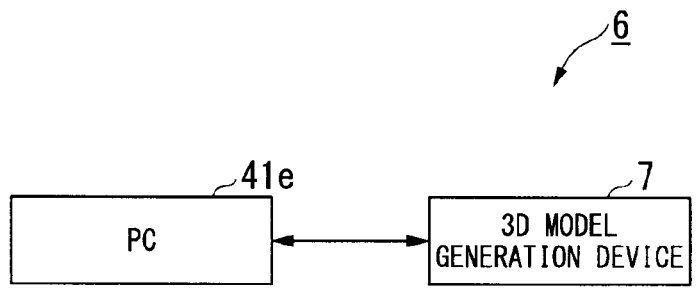
FIG. 39 is a block diagram showing a configuration of an image display system according to a sixth embodiment of the present invention.

FIG. 39 shows a configuration of an image display system 6 according to the sixth embodiment. The image display system 6 shown in FIG. 39 includes a PC 41e and a 3D model generation device 7.

Figure 40:
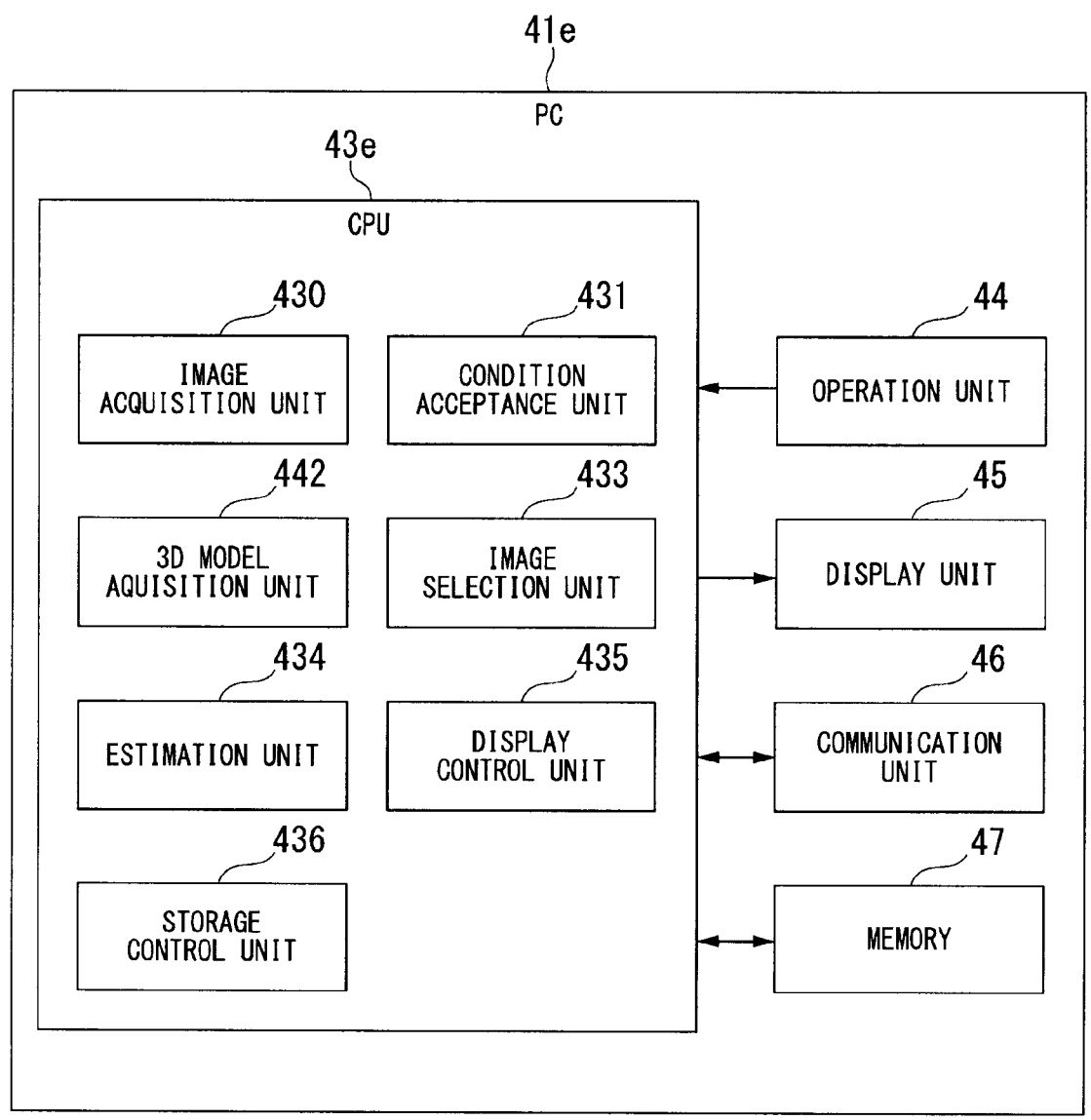
FIG. 40 is a block diagram showing a configuration of a PC according to the sixth embodiment of the present invention.

The PC 41 shown in FIG. 1 is changed to a PC 41e shown in FIG. 40. FIG. 40 shows a configuration of the PC 41e. The same configuration as that shown in FIG. 1 will not be described.

The communication unit 46 performs communication with the 3D model generation device 7. For example, the communication unit 46 is connected to the 3D model generation device 7 through a cable or by radio. Communication between the communication unit 46 and the 3D model generation device 7 may be performed via a local area network (LAN) or the Internet.

The CPU 43 shown in FIG. 1 is changed to a CPU 43e. The CPU 43e has functional units including an image acquisition unit 430, a condition acceptance unit 431, an image selection unit 433, an estimation unit 434, a display control unit 435, a storage control unit 436, and a 3D model acquisition unit 442. At least one of the blocks in the CPU 43e shown in FIG. 40 may be constituted by a different circuit from the CPU 43e.

Each unit in the CPU 43e may be constituted by at least one of a processor and a logic circuit. Each unit in the CPU 43e may include one or a plurality of processors. Each unit in the CPU 43e may include one or a plurality of logic circuits.

The 3D model generation unit 432 shown in FIG. 1 is changed to the 3D model acquisition unit 442. The 3D model acquisition unit 442 performs communication with the 3D model generation device 7 by controlling the communication unit 46. The 3D model acquisition unit 442 transmits a still image group for generating a 3D model and a condition for generating a 3D model to the 3D model generation device 7. The 3D model acquisition unit 442 acquires a 3D model by receiving the 3D model from the 3D model generation device 7.

The 3D model generation device 7 receives the still image group for generating a 3D model and the condition for generating a 3D model from the PC 41e. The 3D model generation device 7 generates a 3D model of a subject on the basis of two or more still images included in the still image group and the condition for generating a 3D model. The 3D model generation device 7 transmits the generated 3D model to the PC 41e.

Figure 41:
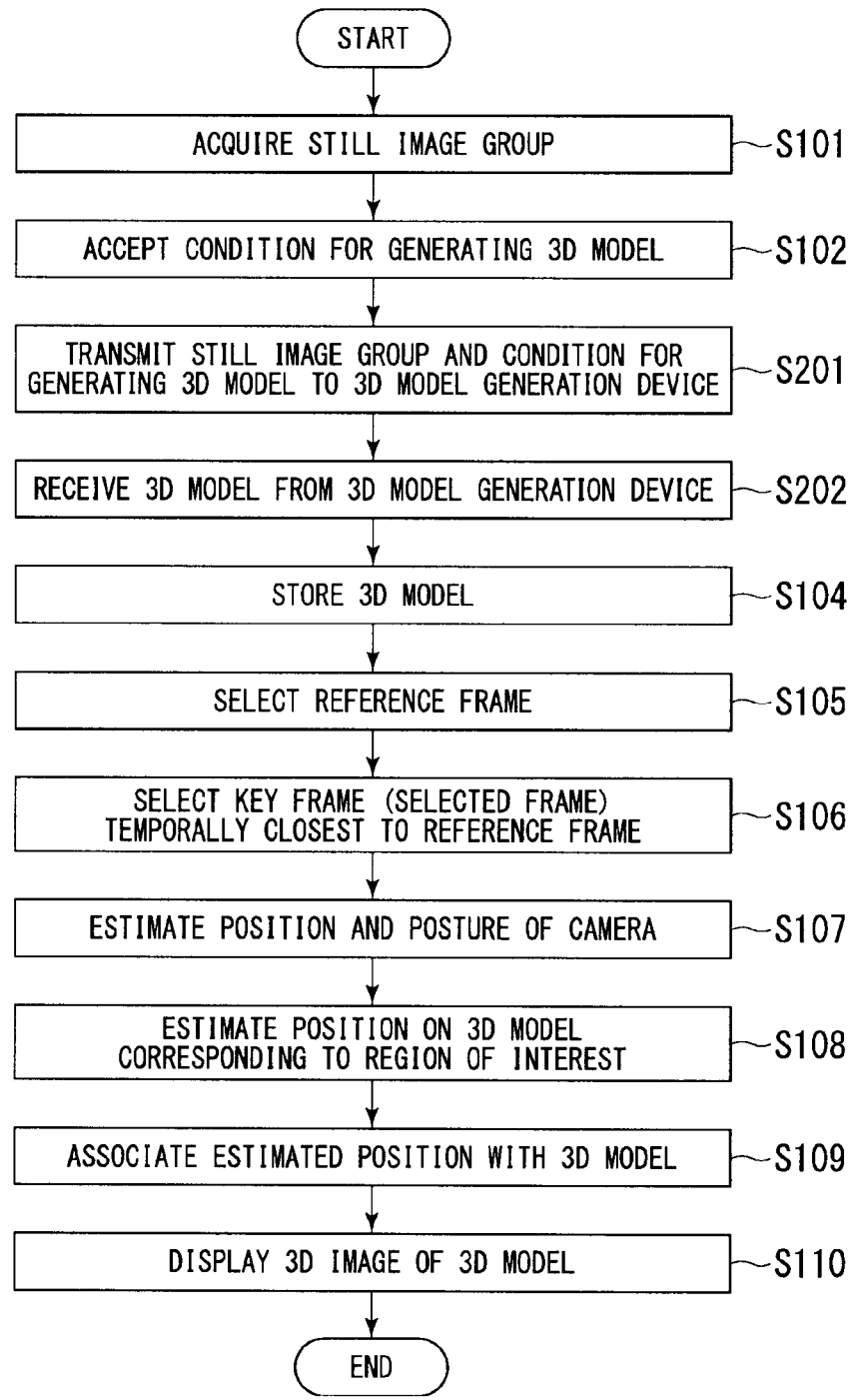
FIG. 41 is a flow chart showing a procedure of processing executed by the PC according to the sixth embodiment of the present invention.

FIG. 41 shows a procedure of processing executed by the PC 41e. The same processing as that shown in FIG. 2 will not be described.

After Step S102, the 3D model acquisition unit 442 transmits the still image group acquired in Step S101 and the condition accepted in Step S102 to the 3D model generation device 7 by controlling the communication unit 46 (Step S201).

After Step S201, the 3D model acquisition unit 442 receives a 3D model from the 3D model generation device 7 by controlling the communication unit 46 (Step S202). After Step S202, Step S104 is executed.

In the above-described example, multiple types of processing are distributed in two devices. There are no limitations to the number of devices and there are no limitations to the processing executed by each device. For example, a plurality of 3D model generation devices 7 may execute time-consuming processing.

For example, the PC 41e may execute Step S105 without executing Step S202 and Step S104 after Step S201 is executed. The PC 41e may transmit the reference frame selected in Step S105 and the selected frame selected in Step S106 to the 3D model generation device 7 after Step S105 is executed. The 3D model generation device 7 may receive the reference frame and the selected frame from the PC 41e and may execute similar processing to Step S107, Step S108, and Step S109. The 3D model generation device 7 may transmit the 3D model to the PC 41e and the PC 41e may receive the 3D model from the 3D model generation device 7. The PC 41e may display a 3D image of the 3D model on the display unit 45 and may display a region including a point having the 3D coordinates calculated by the 3D model generation device 7 on the 3D image in Step S110.

In the sixth embodiment, a plurality of devices execute processing in cooperation with each other. At least one of the plurality of devices has a feature that portability is excellent but a calculation resource is small. At least one of the plurality of devices has a feature that portability is not excellent but a calculation resource is abundant. The image display system 6 can display a 3D model by taking advantage of the plurality of devices.

Seventh Embodiment

A seventh embodiment of the present invention will be described. There is a case in which some noise is included in an image used for generating a 3D model. Because of the influence of the noise, a 3D model that does not accurately match an original shape of a subject may be generated. The noise results from blurring of an image, improper brightness of an image, motion blur, or the like. When an image is too bright or too dark, the brightness of an image is improper. Accordingly, in a case in which an image of reference data generated by using CAD or the like is displayed, a user can easily confirm the shape of a subject, compared to a case in which a 3D model itself is displayed.

Reference data are not associated with the range of a subject seen in a still image recorded during an inspection. Therefore, in a case in which only reference data are displayed, a user cannot confirm the range of a subject seen in a still image recorded during an inspection. The seventh embodiment resolves this problem. An example in which 3D design data of 3DCAD or the like are used corresponds to the sixth modified example of the first embodiment described above. Hereinafter, an example in which 2D design data of 2DCAD or the like are used as reference data will be described.

Figure 42:
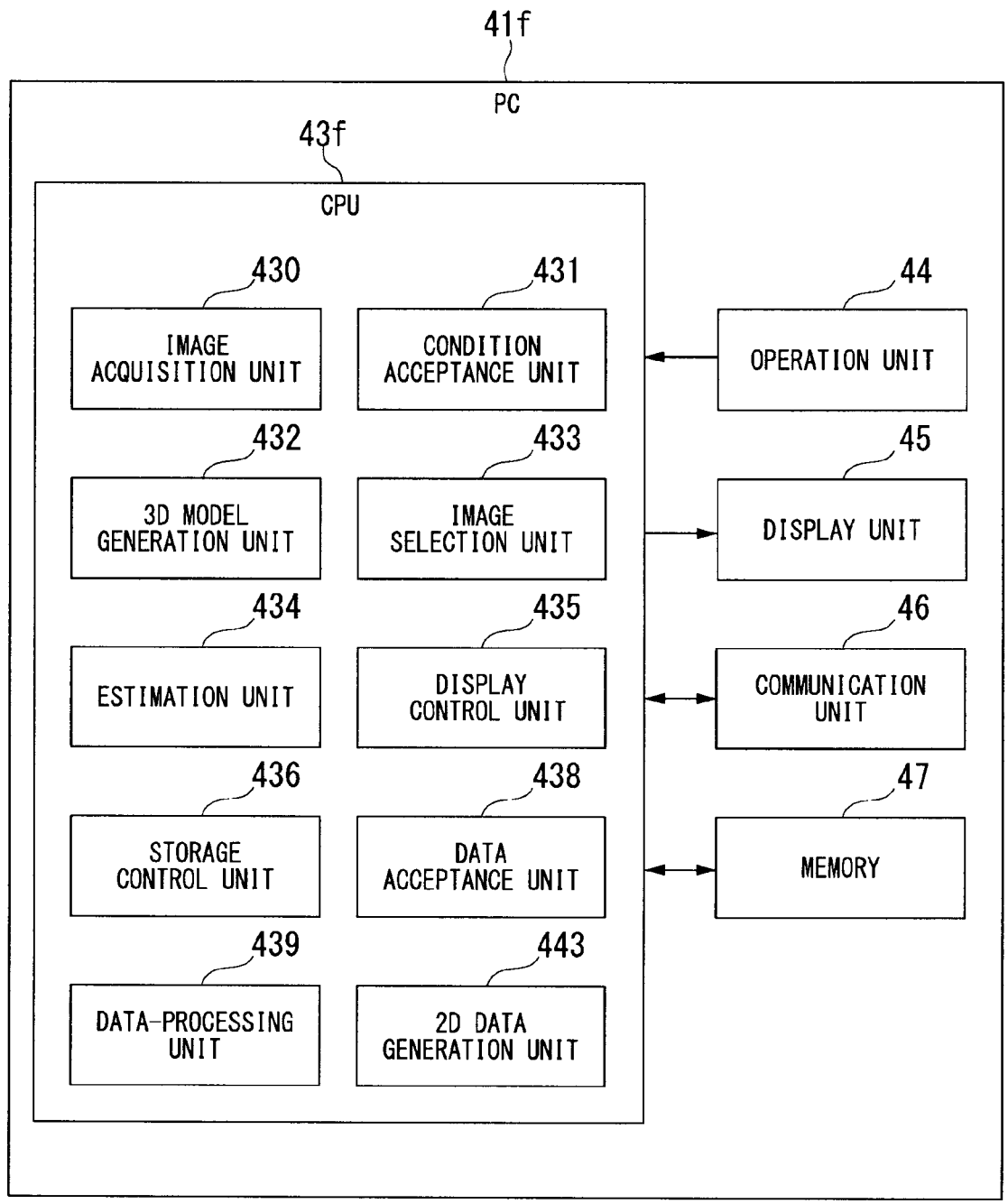
FIG. 42 is a block diagram showing a configuration of a PC according to a seventh embodiment of the present invention.

The PC 41 shown in FIG. 1 is changed to a PC 41f shown in FIG. 42. FIG. 42 shows a configuration of the PC 41f. The PC 41f displays a 2D image of the reference data instead of a 3D image of a 3D model. The same configuration as that shown in FIG. 1 will not be described.

The CPU 43 shown in FIG. 1 is changed to a CPU 43f. The CPU 43f has functional units including an image acquisition unit 430, a condition acceptance unit 431, a 3D model generation unit 432, an image selection unit 433, an estimation unit 434, a display control unit 435, a storage control unit 436, a data acceptance unit 438, a data-processing unit 439, and a 2D data generation unit 443. At least one of the blocks in the CPU 43f shown in FIG. 42 may be constituted by a different circuit from the CPU 43f.

Each unit in the CPU 43f may be constituted by at least one of a processor and a logic circuit. Each unit in the CPU 43f may include one or a plurality of processors. Each unit in the CPU 43f may include one or a plurality of logic circuits.

The memory 47 stores reference data generated by the PC 41f or an external device. The reference data indicate a two-dimensional shape (2D shape) of a subject. A user inputs information for designating the reference data into the PC 41f by operating the operation unit 44. The data acceptance unit 438 accepts the information from the operation unit 44.

The 2D data generation unit 443 converts a 3D model into 2D data. The 2D data include 2D coordinates corresponding to 3D coordinates of two or more points of the subject. In addition, the 2D data include 2D coordinates corresponding to a camera coordinate (first camera coordinate). The camera coordinate indicates 3D coordinates of a camera (first camera), which acquires each of the two or more 2D images for generating the 3D model, and is associated with each of the two or more 2D images. The 2D data generation unit 443 calculates 2D coordinates of a point having 3D coordinates included in the 3D model. The 2D data generation unit 443 generates 2D data (2D image) including the calculated 2D coordinates.

The data-processing unit 439 associates the 2D coordinates in the 2D data with the 2D shape indicated by the reference data. In this way, the data-processing unit 439 associates the position of the 2D data and the position of the reference data with each other.

Figure 43:
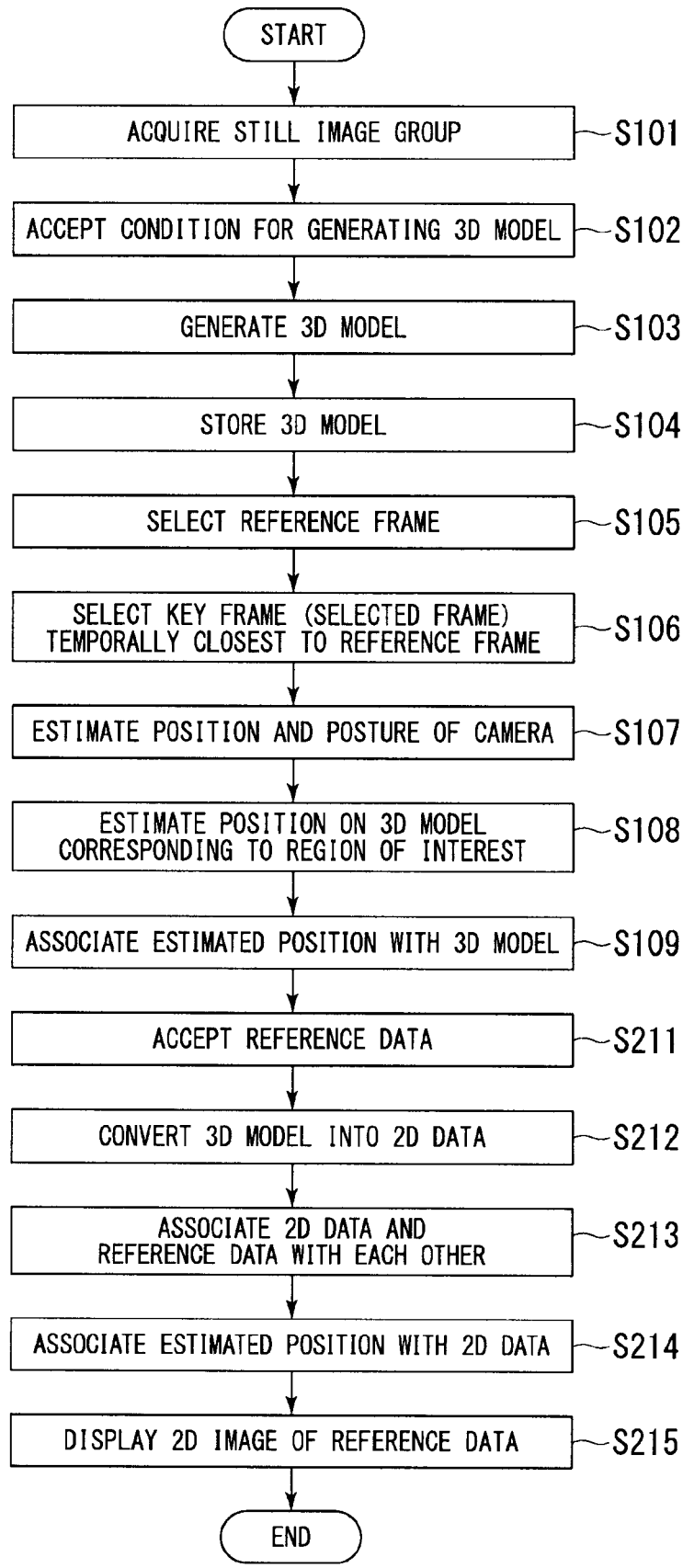
FIG. 43 is a flow chart showing a procedure of processing executed by the PC according to the seventh embodiment of the present invention.

FIG. 43 shows a procedure of processing executed by the PC 41f. The same processing as that shown in FIG. 2 will not be described.

After Step S109, a user inputs information for designating the reference data into the PC 41f by operating the operation unit 44. The data acceptance unit 438 accepts the information from the operation unit 44 (Step S211).

After Step S211, the 2D data generation unit 443 converts the 3D model into 2D data of the subject seen from a specific viewpoint (Step S212). At this time, a known technique for converting the 3D model into 2D data can be applied. The technique is perspective projection, parallel projection, or the like. A technique used for converting the 3D model into 2D data is not limited to the above-described techniques. The CPU 43f may select the above-described viewpoint in accordance with setting information stored on the memory 47 in advance. Alternatively, a user may select the above-described viewpoint by operating the operation unit 44.

The 3D coordinates of each of the two or more points of the subject are converted into 2D coordinates in Step S212. In addition, the camera coordinate is converted into 2D coordinates in Step S212. The 2D data generation unit 443 associates the 3D coordinates of each of the two or more points of the subject and the camera coordinate with the 2D coordinates in the 2D data. The storage control unit 436 causes the memory 47 to store the 2D data generated by the 2D data generation unit 443.

The 3D coordinates calculated in Step S108 are associated with the 3D model in Step S109. When Step S212 is executed, the 3D coordinates calculated in Step S108 are associated with the 2D data. In other words, the 3D coordinates calculated in Step S108 are associated with the 2D coordinates in the 2D data.

After Step S212, the data-processing unit 439 reads the 2D data generated in Step S212 and the reference data indicated by the information accepted in Step S211 from the memory 47. The data-processing unit 439 associates the position of the 2D data and the position of the reference data with each other (Step S213).

Details of Step S213 will be described. In a case in which the data format of the 2D data and the data format of the reference data are different from each other, the data-processing unit 439 executes processing of matching the data format of the 2D data and the data format of the reference data with each other.

Thereafter, the data-processing unit 439 associates the position of the 2D data and the position of the reference data with each other by using a known position-alignment technique. The data-processing unit 439 may associate the position of the 2D data and the position of the reference data with each other by detecting a position of a unique shape in the 2D shape of the subject.

After Step S213, the estimation unit 434 associates the 3D coordinates calculated in Step S108 with the reference data (Step S214). The 3D coordinates calculated in Step S108 are associated with the 2D coordinates in the 2D data. The position of the 2D data and the position of the reference data are associated with each other. The estimation unit 434 associates the 3D coordinates with the reference data by using this relationship in Step S214.

After Step S214, the display control unit 435 displays a 2D image of the reference data on the display unit 45. At this time, the display control unit 435 displays a region including a point having the 3D coordinates calculated in Step S108 on the 2D image. In this way, the display control unit 435 displays, on the 2D image, a region of the 3D model corresponding to a region of interest (Step S215). A user can confirm the position on the 3D model corresponding to the reference frame that is the region of interest by confirming the 2D image of the reference data. The display control unit 435 may display, on the 2D image, the region of the 3D model corresponding to the region of interest and may display the 2D coordinates corresponding to the camera coordinate on the 2D image. Alternatively, the display control unit 435 may display the 2D coordinates corresponding to the camera coordinate on the 2D image without displaying, on the 2D image, the region of the 3D model corresponding to the region of interest. When Step S215 is executed, the processing shown in FIG. 43 is completed.

Figure 44:
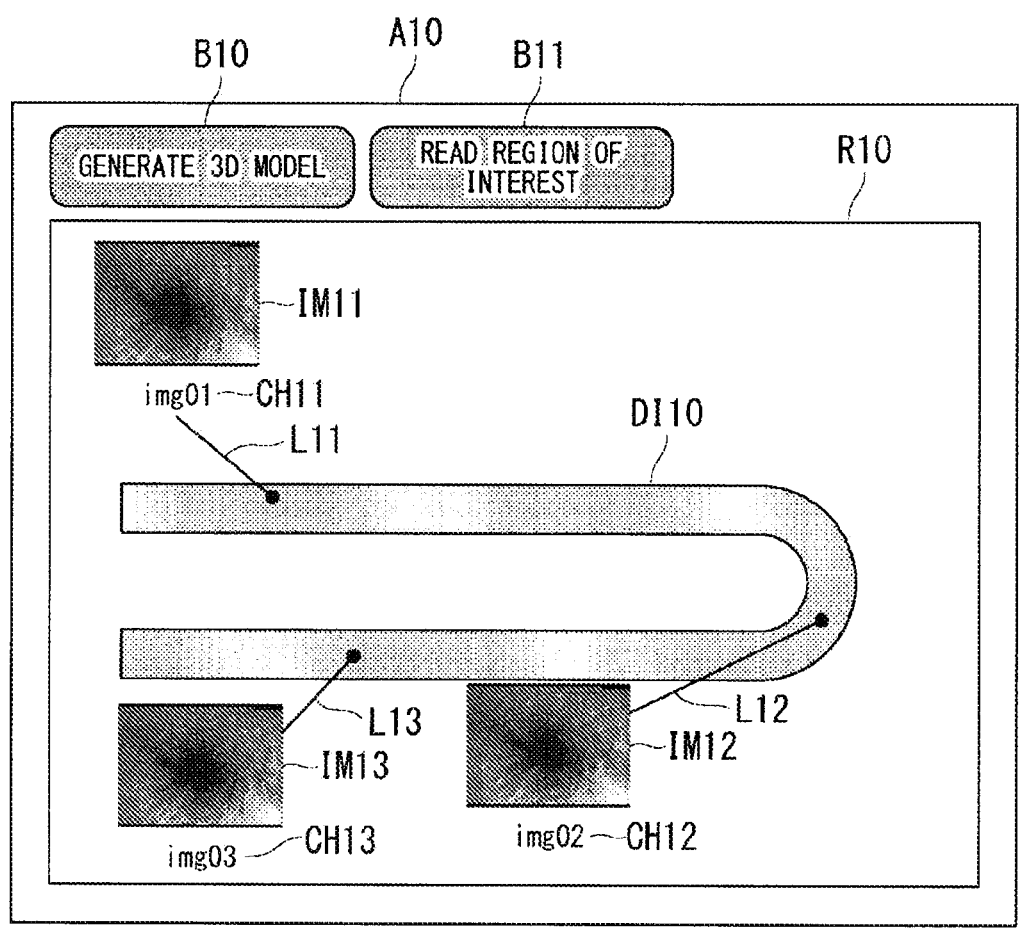
FIG. 44 is a diagram showing an example of a display screen of a display unit included in the PC according to the seventh embodiment of the present invention.

FIG. 44 shows an example of the display screen of the display unit 45. The same parts as those shown in FIG. 10 will not be described.

The 2D data generation unit 443 generates 2D data of the 3D shape seen in a predetermined direction from a first viewpoint in the coordinate system of the 3D model in Step S212. The display control unit 435 displays a 2D image D110 of the 2D data in the region R10 in Step S215.

The display control unit 435 displays information, which indicates positions on the 3D model corresponding to the still images, on the 2D image D110 in Step S215. Specifically, the display control unit 435 displays a character string CH11, a character string CH12, and a character string CH13 on the 2D image D110 and displays a line 11, a line L12, and a line L13 on the 2D image D110. In addition, the display control unit 435 displays a thumbnail image IM11, a thumbnail image IM12, and a thumbnail image IM13 on the 2D image D110.

Figure 45:
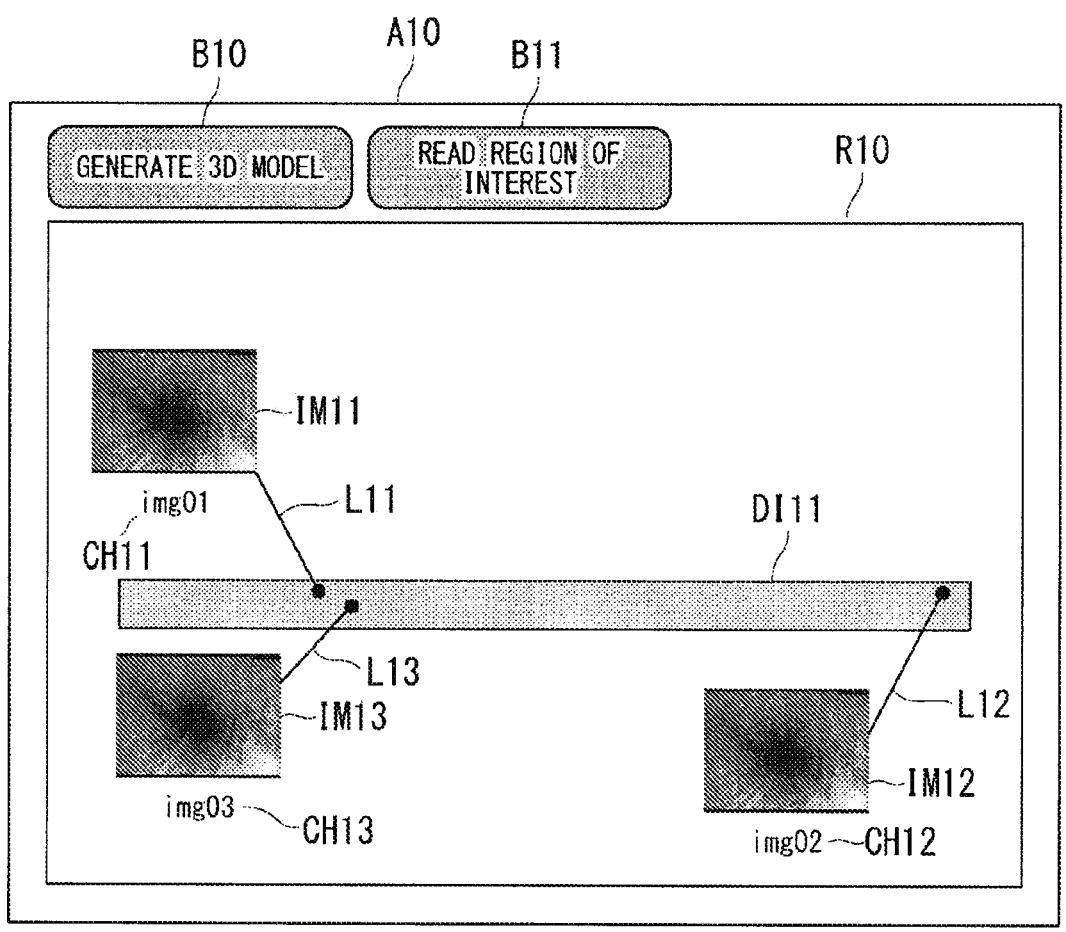
FIG. 45 is a diagram showing an example of the display screen of the display unit included in the PC according to the seventh embodiment of the present invention.

FIG. 45 shows another example of the display screen of the display unit 45. The same parts as those shown in FIG. 10 will not be described.

The 2D data generation unit 443 generates 2D data of the 3D shape seen in a predetermined direction from a second viewpoint in the coordinate system of the 3D model in Step S212. The second viewpoint is different from the above-described first viewpoint. The display control unit 435 displays a 2D image D111 of the 2D data in the region R10 in Step S215. The display control unit 435 displays information, which indicates positions on the 3D model corresponding to the still images, on the 2D image D111 in Step S215. The information includes a character string CH11, a character string CH12, a character string CH13, a line L11, a line L12, a line L13, a thumbnail image IM11, a thumbnail image IM12, and a thumbnail image IM13.

The 2D data generation unit 443 may generate 2D data of the 3D shape seen from the first viewpoint and 2D data of the 3D shape seen from the second viewpoint in Step S212. The display control unit 435 may display the 2D image D110 and the 2D image D111 on the display unit 45 in Step S215. The display control unit 435 may display information, which indicates positions on the 3D model corresponding to the still images, on the 2D image D110 and the 2D image D111 in Step S215.

Even when a first position and a second position different from each other overlap each other in the 3D shape seen from the first viewpoint, the first position and the second position do not overlap each other in the 3D shape seen from the second viewpoint. A user can easily confirm a position on the 3D model corresponding to the reference frame.

An example in which a 3D model acquired in a gas turbine inspection is used will be described. A gas turbine includes two or more blades and two or more fuel injection nozzles. The two or more blades and the two or more fuel injection nozzles are arranged in a circular shape. The 2D data generation unit 443 generates 2D data of the 3D shape of the gas turbine seen from a specific viewpoint in a parallel direction with the rotation axis of the gas turbine in Step S212. The 2D data generation unit 443 may use data of a 3D model in a cross-section perpendicular to the rotation axis of the gas turbine and may generate 2D data of the cross-section.

In the following example, a 3D model having a structure including two or more blades is used. The following example may be applied to a 3D model having a structure including two or more fuel injection nozzles.

Figure 46:
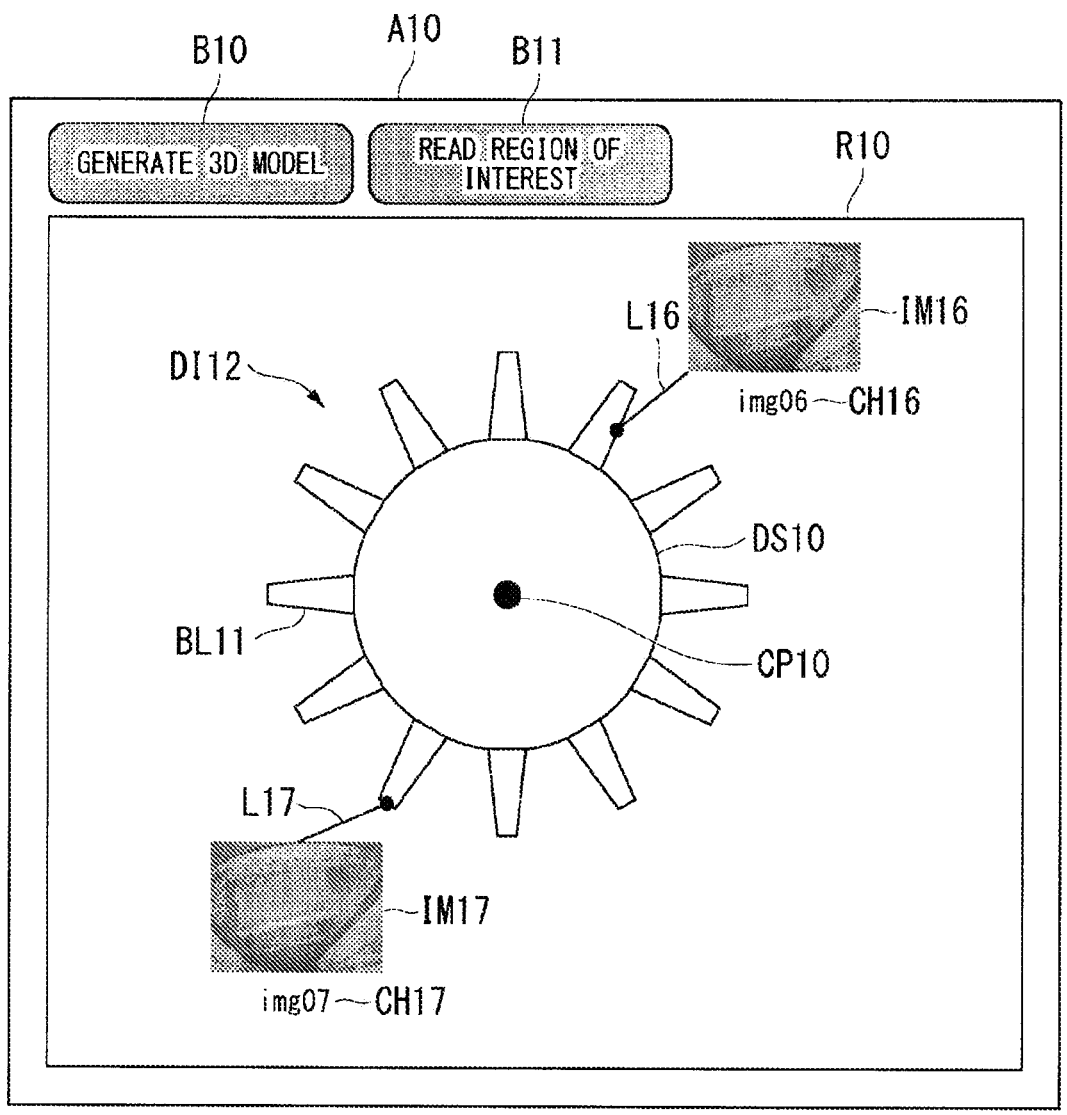
FIG. 46 is a diagram showing an example of the display screen of the display unit included in the PC according to the seventh embodiment of the present invention.

FIG. 46 shows an example of the display screen of the display unit 45. The same parts as those shown in FIG. 10 will not be described.

The display control unit 435 displays a 2D image D112 of the 2D data in the region R10 in Step S215. Twelve blades BL11 are arranged in a disk DS10. In fact, several tens of blades or more than one hundred blades are arranged in one disk. A central position CP10 indicates the center of the disk DS10 in a plane perpendicular to the rotation axis.

The display control unit 435 displays information, which indicates positions on the 3D model corresponding to the still images, on the 2D image D112 in Step S215. Specifically, the display control unit 435 displays a character string CH16 and a character string CH17 on the 2D image D112 and displays a line L16 and a line L17 on the 2D image D112. In addition, the display control unit 435 displays a thumbnail image IM16 and a thumbnail image IM17 on the 2D image D112.

Each of the character strings indicates a file name of each of the still images. The character string CH16 indicates a file name img06. The character string CH17 indicates a file name img07. Each of the lines indicates a position corresponding to each of the still images. The line L16 indicates a position corresponding to the still image having the file name img06. The line L17 indicates a position corresponding to the still image having the file name img07. Each of the positions corresponds to the 3D coordinates calculated in Step S108 on the basis of the camera coordinate and the posture information of the camera that acquires the reference frame. The thumbnail image IM16 corresponds to a thumbnail image of a still image having the file name img06. The thumbnail image IM17 corresponds to a thumbnail image of a still image having the file name img07.

The 2D data generation unit 443 may generate 2D data of the 3D shape of the gas turbine seen from a viewpoint different from that described above in Step S212. The display control unit 435 may display two 2D images of two pieces of 2D data on the display unit 45 in Step S215. The display control unit 435 may display information, which indicates positions on the 3D model corresponding to the still images, on the two 2D images in Step S215.

The order of processing executed by the PC 41*f* is not limited to that shown in FIG. 43. For example, the data acceptance unit 438 may accept information for designating the reference data at any timing before the data-processing unit 439 processes the reference data. Accordingly, Step S211 may be executed at any timing before Step S213 is executed.

In a case in which a condition to use predetermined reference data is set in the PC 41*f* in advance, the data acceptance unit 438 does not need to accept the information for designating the reference data. Therefore, the CPU 43*f* does not need to include the data acceptance unit 438, and Step S211 is not necessary.

The estimation unit 434 does not need to execute Step S108 and Step S109, and the data-processing unit 439 does not need to execute Step S214. The display control unit 435 may display the 2D coordinates corresponding to the camera coordinate on the 2D image of the reference data. Since the camera coordinate is displayed on the 2D image, a user can confirm the position of the viewpoint of the reference frame. Therefore, Step S108, Step S109, and Step S214 are not necessary.

In the first to sixth embodiments including various modified examples, the display control unit 435 may display the 2D image of the reference data on the display unit 45 instead of displaying the 3D image of the 3D model.

Each aspect of the present invention may include the following modified example. The display control unit 435 displays the 2D image on the display unit 45 in the display step (Step S215). The 2D image visualizes 2D coordinates corresponding to at least one of the second camera coordinate and a set of 3D coordinates of one or more points of the subject calculated on the basis of the second camera coordinate and visualizes 2D coordinates corresponding to 3D coordinates of one or more of the two or more points of the subject.

Each aspect of the present invention may include the following modified example. The 3D data further include first posture information indicating a posture of the first camera. The first posture information is associated with each of the two or more 2D images. The estimation unit 434 further estimates a posture of the second camera on the basis of the first posture information associated with the selected frame and generates second posture information indicating the estimated posture in the estimation step (Step S107). The estimation unit 434 further estimates 3D coordinates of one or more points of a region of the subject seen in the reference frame on the basis of the second camera coordinate and the second posture information in the estimation step (Step S108). The 2D image visualizes 2D coordinates corresponding to the 3D coordinates of the one or more points of the region of the subject seen in the reference frame.

Each aspect of the present invention may include the following modified example. The display control unit 435 further superimposes information indicating the position of the region seen in the reference frame on the 2D image in the display step (Step S215).

Each aspect of the present invention may include the following modified example. The 2D data generation unit 443 generates a 2D image by using the 3D model in a generation step (Step S212).

Each aspect of the present invention may include the following modified example. The 2D data generation unit 443 generates a first image that is a 2D image of the subject seen from a first viewpoint and generates a second image that is a 2D image of the subject seen from a second viewpoint different from the first viewpoint in the generation step (Step S212). The display control unit 435 displays the first image and the second image on the display unit 45 in the display step (Step S215).

Each aspect of the present invention may include the following modified example. The 2D image is an image of shape data indicating the 2D shape of the subject. The data-processing unit 439 associates 2D coordinates corresponding to 3D coordinates of two or more points of the subject with the 2D shape indicated by the shape data in an association step (Step S214).

In the seventh embodiment, the PC 41*f* displays the 2D image of the subject on the display unit 45. The 2D image visualizes 2D coordinates corresponding to at least one of the second camera coordinate of the camera, which acquires the reference frame, and a set of 3D coordinates calculated on the basis of the camera coordinate and visualizes 2D coordinates corresponding to 3D coordinates of one or more of the two or more points of the subject. In this way, the PC 41*f* can visualize a position having 3D coordinates related to at least part of the 2D image (reference frame) of the subject.

A user can confirm the position on the 3D model corresponding to the region of interest. Since the 2D image is an image of the reference data of 2D-CAD or the like, a user can confirm the original shape of the subject.

Modified Example of Seventh Embodiment

A modified example of the seventh embodiment of the present invention will be described. In the modified example of the seventh embodiment, the PC 41f shown in FIG. 42 is used. The PC 41f does not use the reference data, converts the 3D model into 2D data, and displays an image of the 2D data. In the modified example of the seventh embodiment, the PC 41f does not need to include the data acceptance unit 438 shown in FIG. 42.

In the modified example of the seventh embodiment, an example in which an inspection report is used will be described. After an inspection is completed, a user prepares an inspection report. For example, information indicating the positional relationship of the entire inspection target is attached to the inspection report. Since the amount of data of the 3D model is great and a method of handling the 3D model is complicated, the 3D model does not need to be attached to the inspection report. The amount of data of the 2D data is less than that of the 3D model, and a method of handling the 2D data is simple. Therefore, the 2D data are suitable for information attached to the inspection report. In addition, there is a case in which the reference data are not available. In such a case, the modified example of the seventh embodiment is effective.

In the following example, a region of interest is the entire region of a reference frame. A region of interest may be a region of a specific subject seen in a specific image.

Figure 47:
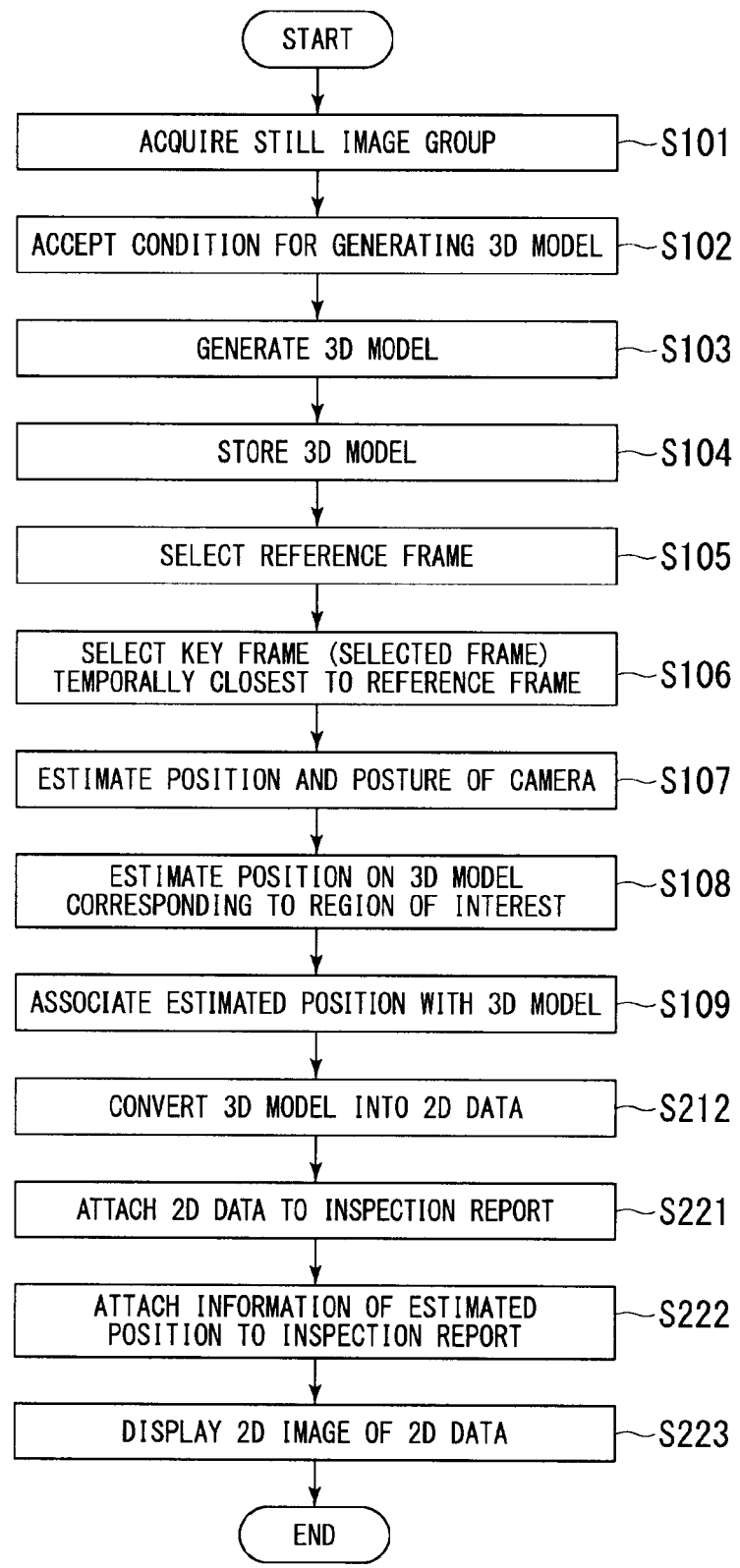
FIG. 47 is a flow chart showing a procedure of processing executed by a PC according to a modified example of the seventh embodiment of the present invention.

FIG. 47 shows a procedure of processing executed by the PC 41f. The same processing as that shown in FIG. 43 will not be described.

After Step S109, the 2D data generation unit 443 converts the 3D model into 2D data of the subject seen from a specific viewpoint in Step S212.

After Step S212, the data-processing unit 439 attaches the 2D data to an inspection report (Step S221). The storage control unit 436 causes the memory 47 to store the inspection report to which the 2D data are attached.

After Step S221, the data-processing unit 439 attaches information indicating the 3D coordinates calculated in Step S108 to the inspection report. In other words, the data-processing unit 439 attaches information of the position on the 3D model corresponding to the region of interest to the inspection report (Step S222).

Step S221 and Step S222 may be executed in any order. Accordingly, Step S222 may be executed, and then Step S221 may be executed.

After Step S222, the display control unit 435 displays a 2D image of the 2D data on the display unit 45. At this time, the display control unit 435 displays a region including a point having the 3D coordinates calculated in Step S108 on the 2D image. In this way, the display control unit 435 displays, on the 2D image, a region of the 3D model corresponding to the region of interest (Step S223). A user can confirm the position on the 3D model corresponding to the reference frame that is the region of interest by confirming the 2D image of the 2D data. The display control unit 435 may display, on the 2D image, the region of the 3D model corresponding to the region of interest and may display the 2D coordinates corresponding to the camera coordinate on the 2D image. Alternatively, the display control unit 435 may display the 2D coordinates corresponding to the camera coordinate on the 2D image without displaying, on the 2D image, the region of the 3D model corresponding to the region of interest. When Step S223 is executed, the processing shown in FIG. 47 is completed.

Figure 48:
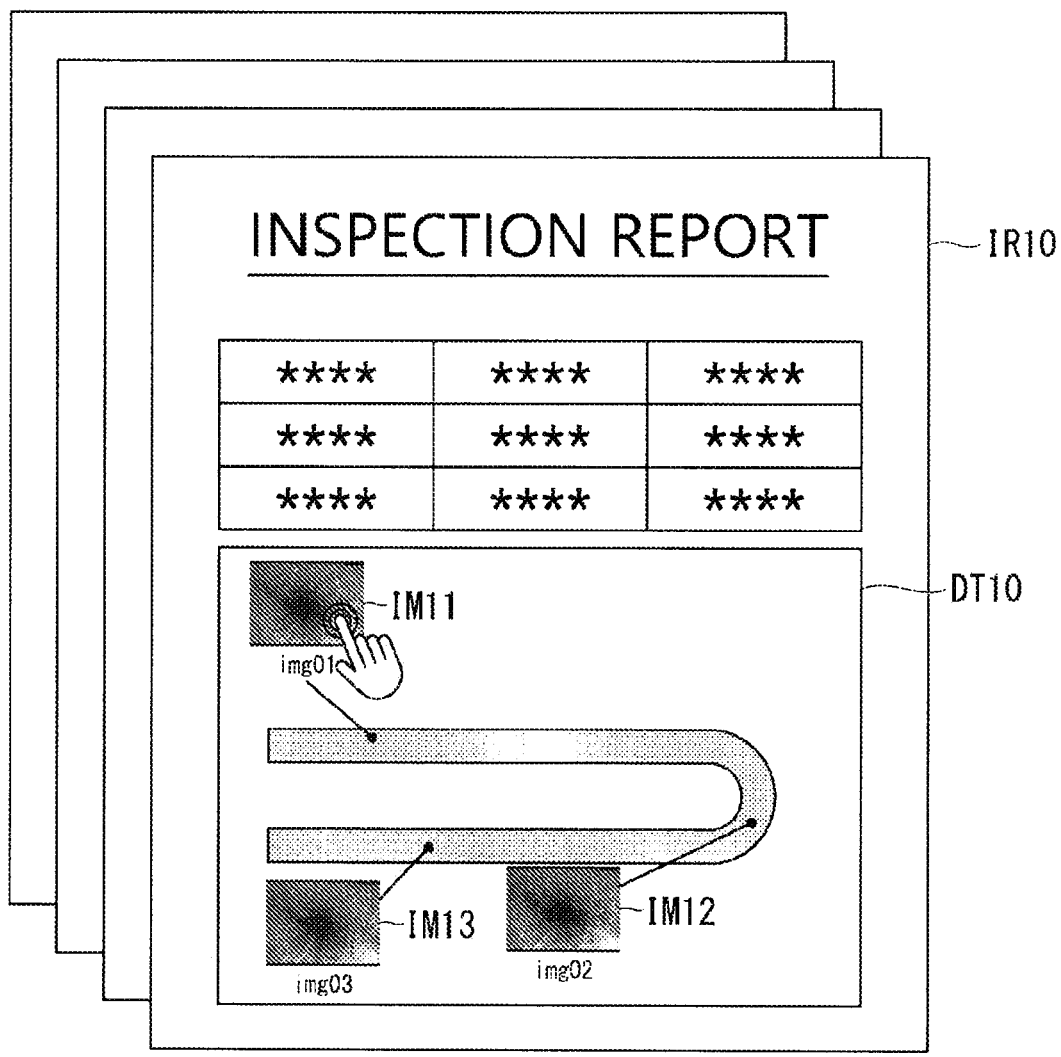
FIG. 48 is a diagram showing an example of an inspection report in the modified example of the seventh embodiment of the present invention.

FIG. 48 shows an example of the inspection report. An inspection report IR10 shown in FIG. 48 includes 2D data DT10. The 2D data DT10 include similar information to that displayed in the region R10 shown in FIG. 44. The 2D data DT10 include a thumbnail image IM11, a thumbnail image IM12, and a thumbnail image IM13.

Figure 49:
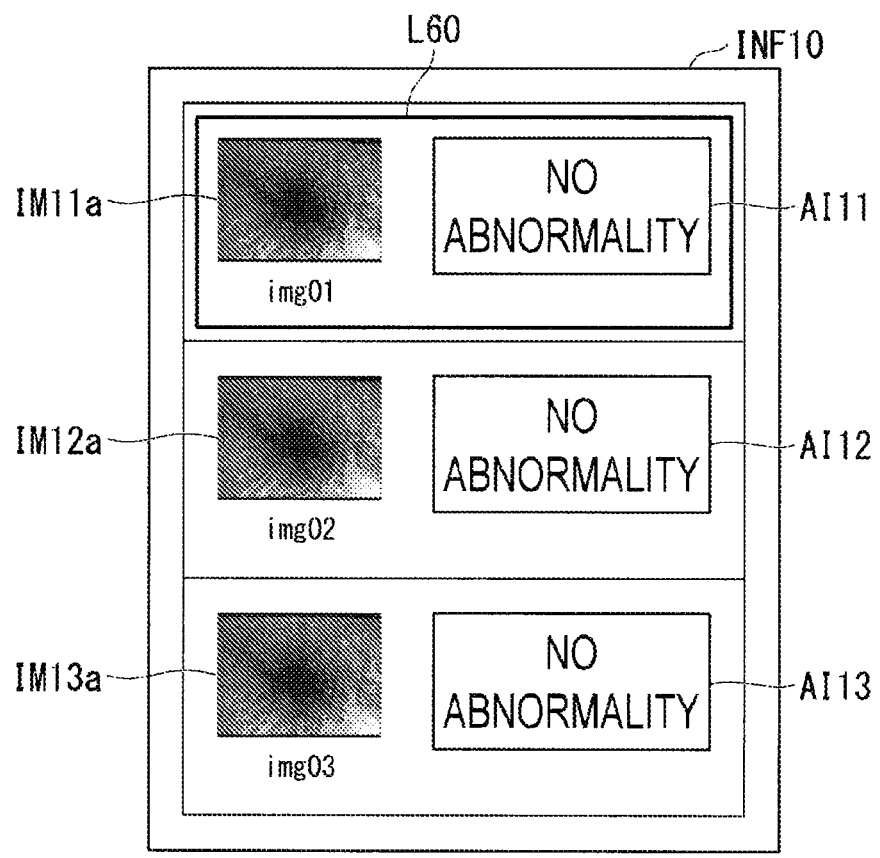
FIG. 49 is a diagram showing an example of information of a region of interest attached to the inspection report in the modified example of the seventh embodiment of the present invention.

FIG. 49 shows an example of information of the region of interest attached to the inspection report. Information INF10 shown in FIG. 49 includes information of three regions of interest. Information of each region of interest includes a thumbnail image of the region of interest and includes abnormal information regarding an abnormality in the region of interest. The abnormal information indicates an inspection result and indicates whether or not there is an abnormality in the region of interest. In a case in which there is an abnormality in the region of interest, the abnormal information indicates the severity of the abnormality.

In the example shown in FIG. 49, the thumbnail image IM11a and the abnormal information A111 are associated with each other, the thumbnail image IM12a and the abnormal information A112 are associated with each other, and the thumbnail image IM13a and the abnormal information A113 are associated with each other. The thumbnail image IM11a is the same as the thumbnail image IM11. The thumbnail image IM12a is the same as the thumbnail image IM12. The thumbnail image IM13a is the same as the thumbnail image IM13. The scale of the thumbnail images included in the 2D data DT10 and the scale of the thumbnail images included in the information of the region of interest may be different from each other. The aspect ratio of the thumbnail images included in the 2D data DT10 and the aspect ratio of the thumbnail images included in the information of the region of interest may be different from each other.

Each still image (reference frame) and each piece of the abnormal information are associated with each other in advance. The data-processing unit 439 attaches the thumbnail image IM11a, the thumbnail image IM12a, and the thumbnail image IM13a to the inspection report in Step S222. At this time the data-processing unit 439 associates the thumbnail image IM11a with the abnormal information A111, associates the thumbnail image IM12a with the abnormal information A112, and associates the thumbnail image IM13a with the abnormal information A113. In addition, the data-processing unit 439 associates the thumbnail image IM11a with the thumbnail image IM11, associates the thumbnail image IM12a with the thumbnail image IM12, and associates the thumbnail image IM13a with the thumbnail image IM13.

For example, the display control unit 435 displays the inspection report IR10 on the display unit 45 in Step S223. In this way, the display control unit 435 displays a 2D image of the 2D data DT10 on the display unit 45. For example, a user operates the operation unit 44 in order to confirm whether or not an abnormality is seen in the still image or confirm the severity of an abnormality seen in the still image. In this way, a user inputs an instruction to select the thumbnail image IM11 into the PC 41f. The CPU 43f accepts the instruction from the operation unit 44. Each thumbnail image corresponds to the still image (reference frame) that is the region of interest. The above-described instruction indicates the reference frame corresponding to the thumbnail image IM11.

The display control unit 435 displays the information INF10 on the display unit 45 on the basis of the above-described instruction. At this time, the display control unit 435 puts a line L60 around the thumbnail image IM11a and the abnormal information A111. In this way, the display control unit 435 highlights the information associated with the reference frame indicated by the instruction input into the PC 41f. A user can confirm whether or not an abnormality is seen in the still image or can confirm the severity of the abnormality. As long as a user can easily confirm information corresponding to the selected thumbnail image, any method may be used in order to highlight the information.

When the information INF10 is displayed, the display control unit 435 may hide the inspection report IR10. The display control unit 435 may display the inspection report IR10 and the information INF10 on the display unit 45. When the instruction to select the thumbnail image IM11 is input into the PC 41f, the display control unit 435 may extract the thumbnail image IM11a and the abnormal information A111 from the information INF10 and may display the thumbnail image IM11a and the abnormal information A111 on the display unit 45.

While the information INF10 is displayed, a user may select a thumbnail image. For example, a user inputs an instruction to select the thumbnail image IM11a into the PC 41f by operating the operation unit 44. The CPU 43f accepts the instruction from the operation unit 44. The display control unit 435 displays the inspection report IR10 on the display unit 45 on the basis of the instruction and highlights the thumbnail image IM11.

Information selected by a user is not limited to a thumbnail image. For example, a user may select the file name (img01 or the like) of the still image.

The estimation unit 434 does not need to execute Step S108 and Step S109, and the data-processing unit 439 does not need to execute Step S222. The display control unit 435 may display the 2D coordinates corresponding to the camera coordinate on the 2D image of the 2D data. Since the camera coordinate is displayed on the 2D image, a user can confirm the position of the viewpoint of the reference frame. Therefore, Step S108, Step S109, and Step S222 are not necessary.

The 2D data do not need to be attached to the inspection report. Therefore, Step S221 and Step S222 are not necessary.

In the first to sixth embodiments including various modified examples, the display control unit 435 may display the 2D image of the 2D data on the display unit 45 instead of displaying the 3D image of the 3D model.

Each aspect of the present invention may include the following modified example. The reference frame is associated with information (abnormal information A111) of the subject in advance. When the display step (Step S223) is executed and an instruction to select the reference frame is input, the display control unit 435 displays the information (abnormal information A111) associated with the reference frame indicated by the instruction on the display unit 45 in an information display step (Step S223).

In the modified example of the seventh embodiment, the PC 41f can convert the 3D model into 2D data having a suitable format for being attached to an inspection report. Therefore, the PC 41f can reduce the workload necessary for preparing an inspection report.

The information included in the 2D data DT10 shown in FIG. 48 and the information INF10 shown in FIG. 49 are associated with each other. A user and an approver of an inspection report can confirm both the position on the 3D model corresponding to the region of interest and information of the subject at the position. Therefore, a user and an approver of an inspection report can easily confirm the status of an inspection.

SUPPLEMENT

In each aspect of the present invention, the display control unit 435 displays an image of a subject on the display unit 45 (display). The image of the subject visualizes a position indicated by at least one of the second camera coordinate and a set of 3D coordinates of one or more points of the subject calculated on the basis of the second camera coordinate. The image of the subject is a three-dimensional image or a two-dimensional image.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image display method comprising:
    a selection step in which a processor selects two or more two-dimensional images of a subject from an image group including a plurality of two-dimensional images of the subject;
    an estimation step in which the processor estimates a camera coordinate indicating three-dimensional coordinates of a camera that acquired each of the two or more two-dimensional images on the basis of the two or more two-dimensional images and estimates three-dimensional coordinates of two or more points of the subject on the basis of the camera coordinate;
    a generation step in which the processor generates a three-dimensional model on the basis of the three-dimensional coordinates of the two or more points of the subject; and
    a display step in which the processor displays a three-dimensional image on a display,
    wherein the three-dimensional image visualizes a position indicated by at least one of the camera coordinate and a set of three-dimensional coordinates of one or more points of the subject calculated on the basis of the camera coordinate,
    wherein, in the display step, the processor:
        projects two-dimensional coordinates of one or more points of a region of the subject seen in a reference image onto the three-dimensional model to estimate corresponding one or more coordinates on the three-dimensional model; and
        displays a shape image showing the three-dimensional model seen from a viewpoint different from the camera coordinate, the one or more coordinates on the three-dimensional model estimated from the two-dimensional coordinates of the one or more points of the region of the subject seen in the reference image projected onto the three dimensional model.

2. The image display method according to claim 1,
    wherein the three-dimensional model further includes posture information indicating a posture of the camera that acquired each of the two or more two-dimensional images,
    wherein the posture information is associated with each of the two or more two-dimensional images, and
    wherein, in the display step, generating, by the processor, the shape image that is seen from a viewpoint different from the camera coordinate and is seen with a posture different from the posture of the camera that acquired each of the two or more two-dimensional images.

3. The image display method according to claim 2,
wherein, in the display step, superimposing, by the processor, information indicating a position of the region on the three-dimensional model.

4. The image display method according to claim 2, further comprising a viewpoint change step in which the processor changes a viewpoint of the three-dimensional model after the shape image is displayed on the display.

5. The image display method according to claim 2,
wherein, in the selection step, selecting, by the processor, two or more of the reference image as part of the two or more two-dimensional images of the subject from the image group, and
wherein, in the display step, further displaying, by the processor, information indicating a position of a region shared by the two or more of the reference image on the display.

6. The image display method according to claim 2, further comprising an association step in which the processor associates the three-dimensional coordinates of the two or more points of the subject with the three-dimensional model.

7. The image display method according to claim 2,
wherein, in the display step, further displaying, by the processor, field angle information indicating a field angle of the reference image on the display.

8. The image display method according to claim 2,
wherein, in the display step, further displaying, by the processor, a three-dimensional distance between the region and a reference point included in the two or more points of the subject on the display.

9. The image display method according to claim 2,
wherein the subject includes two or more partial regions that are periodically disposed,
wherein, in the display step, displaying, by the processor, the number of at least some of the partial regions from a reference part to a part of interest on the display,
wherein the reference part is one of the two or more partial regions,
wherein the part of interest is different from the reference part and is one of the two or more partial regions, and
wherein the part of interest corresponds to the region.

10. The image display method according to claim 2,
wherein the region is the entire range seen in the reference image.

11. The image display method according to claim 2,
wherein the region is part of a range seen in the reference image.

12. The image display method according to claim 2,
wherein in the display step, estimating, by the processor, the corresponding one or more coordinates on the three-dimensional model on the basis of the camera coordinate and the posture information,
wherein the one or more points of the region are different from the two or more points having the three-dimensional coordinates included in the three-dimensional model,
wherein the shape image visualizes three-dimensional coordinates of the one or more points of the region and visualizes three-dimensional coordinates of at least one point included in the region among the three-dimensional coordinates included in the three-dimensional model, and
wherein density of points of the three-dimensional model is higher than density of points included in the region among the two or more points of the subject.

13. The image display method according to claim 2,
wherein, in the selection step, selecting, by the processor, the reference image including a reference region that meets a condition set in advance, and
wherein, in the display step, projecting, by the processor, two-dimensional coordinates of one or more points of the reference region of the subject seen in the reference image onto the three-dimensional model of the subject to estimate the corresponding one or more coordinates on the three-dimensional model.

14. The image display method according to claim 13,
wherein the processor estimates the corresponding one or more coordinates on the three-dimensional model of the one or more points of the reference region on the basis of the camera coordinate and the posture information,
wherein the one or more points of the reference region are different from points having the three-dimensional coordinates included in the three-dimensional model,
wherein the shape image visualizes the three-dimensional coordinates of the one or more points of the reference region and visualizes three-dimensional coordinates of at least one point included in the reference region among the three-dimensional coordinates included in the three-dimensional model, and
wherein density of points having the three-dimensional coordinates visualized by the three-dimensional image is higher than density of points included in the reference region among the two or more points of the subject.

15. The image display method according to claim 2,
wherein the processor selects one of one or more selection target images as the reference image in the selection step, and
wherein the one or more selection target images are two-dimensional images of the subject and are not included in the two or more two-dimensional images.

16. The image display method according to claim 2,
wherein each of the two or more two-dimensional images is temporally associated with another of the two or more two-dimensional images.

17. The image display method according to claim 16,
wherein the camera that acquires each of the two or more two-dimensional images is a single-eye camera.

18. The image display method according to claim 1,
wherein the shape image of the subject is a two-dimensional image, and
wherein the shape image of the subject visualizes two-dimensional coordinates corresponding to at least one of the camera coordinate and the set of the three-dimensional coordinates of the one or more points of the subject calculated on the basis of the camera coordinate and visualizes two-dimensional coordinates corresponding to the three-dimensional coordinates of one or more of the two or more points.

19. The image display method according to claim 18,
wherein the three-dimensional model further includes posture information indicating a posture of the camera that acquired each of the two or more two-dimensional images,
wherein the posture information is associated with each of the two or more two-dimensional images,
wherein the processor further estimates three-dimensional coordinates of one or more points of a region of the subject seen in the reference image on the basis of the camera coordinate and the posture information in the estimation step, and wherein the shape image of the subject visualizes two-dimensional coordinates corresponding to the three-dimensional coordinates of the one or more points of the region.

20. The image display method according to claim 19, wherein the processor further superimposes information indicating a position of the region on the shape image of the subject in the display step.

21. The image display method according to claim 18, wherein the processor generates the shape image of the subject by using the three-dimensional model in the generation step.

22. The image display method according to claim 21, wherein the processor generates a first image that is the shape image of the subject seen from a first viewpoint and generates a second image that is the shape image of the subject seen from a second viewpoint different from the first viewpoint in the generation step, and
wherein the processor displays the first image and the second image on the display in the display step.

23. The image display method according to claim 18, wherein the reference image is associated with information of the subject in advance, and
wherein the image display method further comprises an information display step in which, when the display step is executed and an instruction to select the reference image is input, the processor displays the information associated with the reference image indicated by the instruction on the display.

24. The image display method according to claim 18, wherein the shape image of the subject is an image of shape data indicating a two-dimensional shape of the subject, and
wherein the image display method further comprises an association step in which the processor associates two-dimensional coordinates corresponding to the three-dimensional coordinates of the two or more points of the subject with the two-dimensional shape indicated by the shape data.

25. The image display method according to claim 1, wherein, in the selection step, selecting, by the processor, the reference image and a selected image in addition to the reference image as the two or more two-dimensional images selected,
wherein the selected image meets a predetermined condition, and
wherein, in the estimation step, estimating, by the processor, the three-dimensional coordinates of the two or more points of the subject and the camera coordinate on the basis of the two or more two-dimensional images including both the reference image and the selected image.

26. The image display method according to claim 25, wherein, in the selection step, selecting, by the processor, at least one of the two or more two-dimensional images as the selected image by using time information that temporally associates the two or more two-dimensional images with each other.

27. The image display method according to claim 1, wherein, in the selection step, the processor detects a region of interest in images in the image group and selects, as the reference image, an image including the region of interest from the image group as one of the two or more two-dimensional images.

28. The image display method according to claim 1, wherein, in the estimation step, transforming, by the processor, the camera coordinate to a shape image camera coordinate in a coordinate system of the three-dimensional model where a region of the subject seen in the reference image and a region of the subject other than the region seen in the reference image are seen from the viewpoint different from the camera coordinate, and
wherein, in the display step:
projecting, by the processor, based on the shape image camera coordinate, two-dimensional coordinates of one or more points of the region of the subject seen in the reference image onto the three-dimensional model of the subject to estimate the corresponding one or more coordinates on the three-dimensional model; and
generating, by the processor, the shape image showing the three-dimensional model of the subject seen from the viewpoint different from the camera coordinate, the one or more coordinates on the three-dimensional model estimated from the two-dimensional coordinates of the one or more points of the region of the subject seen in the reference image projected onto the three-dimensional model and the shape image camera coordinate.

29. The image display method according to claim 1, wherein in the image display method comprises:
in the display step, displaying, by the processor, the camera coordinate on the shape image.

30. The image display method according to claim 1, wherein, in the selection step, the two or more two-dimensional images of the subject includes the reference image.

31. The image display method according to claim 1, further comprising:
a reference frame selection step in which the processor selects the reference frame after the generation step.

32. A display control device comprising a processor configured to:
select two or more two-dimensional images of a subject from an image group including a plurality of two-dimensional images of the subject;
estimate a camera coordinate indicating three-dimensional coordinates of a camera that acquired each of the two or more two-dimensional images on the basis of the two or more two-dimensional images and estimate three-dimensional coordinates of two or more points of the subject on the basis of the camera coordinate;
generate a three-dimensional model on the basis of the three-dimensional coordinates of the two or more points of the subject;
display a three-dimensional image on a display,
wherein the three-dimensional image visualizes a position indicated by at least one of the camera coordinate and a set of three-dimensional coordinates of one or more points of the subject calculated on the basis of the camera coordinate,
project two-dimensional coordinates of one or more points of a region of the subject seen in a reference image onto the three-dimensional model to estimate corresponding one or more coordinates on the three-dimensional model; and
display a shape image showing the three-dimensional model seen from a viewpoint different from the camera coordinate, the one or more coordinates on the three-dimensional model estimated from the two-dimensional coordinates of the one or more points of the region of the subject seen in the reference image projected onto the three dimensional model.

33. A non-transitory computer-readable recording medium storing a program that causes a computer to execute:
- a selection step of selecting two or more two-dimensional images of a subject from an image group including a plurality of two-dimensional images of the subject;
- an estimation step of estimating a camera coordinate indicating three-dimensional coordinates of a camera that acquired each of the two or more two-dimensional images on the basis of the two or more two-dimensional images and estimating three-dimensional coordinates of two or more points of the subject on the basis of the camera coordinate;
- a generation step of generating a three-dimensional model on the basis of the three-dimensional coordinates of the two or more points of the subject;
- a display step of displaying a three-dimensional image on a display,
- wherein the three-dimensional image visualizes a position indicated by at least one of the camera coordinate and a set of three-dimensional coordinates of one or more points of the subject calculated on the basis of the camera coordinate, wherein the display step comprises:
- projecting two-dimensional coordinates of one or more points of a region of the subject seen in a reference image onto the three-dimensional model to estimate corresponding one or more coordinates on the three-dimensional model; and
- displaying a shape image showing the three-dimensional model seen from a viewpoint different from the camera coordinate, the one or more coordinates on the three-dimensional model estimated from the two-dimensional coordinates of the one or more points of the region of the subject seen in the reference image projected onto the three dimensional model.

* * * * *